US009447905B2

(12) United States Patent
Nagaya

(10) Patent No.: US 9,447,905 B2
(45) Date of Patent: Sep. 20, 2016

(54) PIPE CONNECTOR

(75) Inventor: Takanori Nagaya, Aichi (JP)

(73) Assignee: TOGO SEISAKUSYO CORPORATION, Aichi (JP)

( * ) Notice: Subject to any disclaimer, the term of this patent is extended or adjusted under 35 U.S.C. 154(b) by 357 days.

(21) Appl. No.: 14/117,324

(22) PCT Filed: Jun. 8, 2012

(86) PCT No.: PCT/JP2012/064792

§ 371 (c)(1),
(2), (4) Date: Nov. 12, 2013

(87) PCT Pub. No.: WO2012/173058

PCT Pub. Date: Dec. 20, 2012

(65) Prior Publication Data

US 2015/0159793 A1 Jun. 11, 2015

(30) Foreign Application Priority Data

Jun. 16, 2011 (JP) ................................ 2011-134060

(51) Int. Cl.
*F16L 37/08* (2006.01)
*F16L 37/088* (2006.01)

(52) U.S. Cl.
CPC .......... *F16L 37/088* (2013.01); *F16L 2201/10* (2013.01)

(58) Field of Classification Search
CPC . F16L 37/088; F16L 37/0841; F16L 37/086; F16L 37/098
USPC .................................................. 285/93, 305
See application file for complete search history.

(56) References Cited

U.S. PATENT DOCUMENTS 6,869,110 B2 * 3/2005 Okada .................. F16L 37/144 285/93
7,014,220 B2 * 3/2006 Szabo .................. F16L 37/144 285/305

(Continued)

FOREIGN PATENT DOCUMENTS

CN 1676982 10/2005
CN 101400937 4/2009

(Continued)

OTHER PUBLICATIONS

International Search Report for PCT/JP2012/064792 mailed Jul. 17, 2012 (In English).

(Continued)

*Primary Examiner* — David E Bochna
(74) *Attorney, Agent, or Firm* — Smith, Gambrell & Russell, LLP

(57) ABSTRACT

A pipe connector includes a connector body, a retainer having a pair of locking legs and a release operation portion, and a checker. The connector body has an insertion hole into which a pipe is insertable. The locking legs are deformable to be spread and closed and are moved into the insertion hole. The release operation portion being operable to displace the locking legs in a direction such that the pipe is releasable from a retained state. The checker is formed separately from the retainer and lockable to the connector body and releasable from a locked state to be movable to a detection position when the pipe is inserted into the insertion hole. The checker is formed with pressing pieces located rearward relative to the locking legs when the checker assumes the detection position, to thereby prevent the locking legs from being flexed rearward.

17 Claims, 59 Drawing Sheets

1 2 3 4 6 7 8 9 10 11 12 13 26 28 33 34 36 37 38 41 42 44 45 P

(56) References Cited

U.S. PATENT DOCUMENTS 7,128,347 B2 * 10/2006 Kerin .................... F16L 37/088 285/305
7,390,025 B2 * 6/2008 Pepe .................... F16L 37/088 285/305
7,464,970 B2 * 12/2008 Yamada .............. F16L 37/0982 285/305
7,497,480 B2 * 3/2009 Kerin .................... F16L 37/088 285/305
7,527,303 B2 * 5/2009 Furuya ................ F16L 37/1225 285/305
7,566,077 B2 * 7/2009 Tsurumi ................ F16L 37/144 285/305
7,677,608 B2 * 3/2010 Takayanagi ........... F16L 37/144 285/305
7,823,930 B2 * 11/2010 Feger .................... F16L 37/144 285/307
8,033,575 B2 * 10/2011 Tsurumi ................ F16L 37/144 285/305
8,113,549 B2 * 2/2012 Bokuhn ................ F16L 37/144 285/305
8,240,716 B2 * 8/2012 Kerin .................... F16L 37/144 285/93
8,292,333 B2 * 10/2012 Ogawa .................. F16L 37/144 285/305
8,336,919 B2 * 12/2012 Gillet .................... F16L 37/088 285/93
8,408,604 B2 * 4/2013 Yamada ................ F16L 37/133 285/305
8,944,473 B2 * 2/2015 Lutzke .................. F16L 37/098 285/305
9,212,773 B2 * 12/2015 Okazaki ................ F16L 37/088
2005/0189764 A1 9/2005 Ono
2008/0315576 A1 12/2008 Moretti et al.
2012/0211977 A1 * 8/2012 Callahan ............... F16L 37/144 285/313

FOREIGN PATENT DOCUMENTS

FR 2910109 6/2008
JP 2001-289381 A 10/2001
JP 2007/178003 A 7/2007
JP 2009-121668 A 6/2009
JP 2010-078077 A 4/2010
JP 2004-251319 9/2014

OTHER PUBLICATIONS

European Search Report for EP 12 799.949.8 dated Feb. 3, 2015.

* cited by examiner

W
11
12
16
19
20
21
27
C
B
A
22
23
24
13
1
4
5

P
10
3
36
45
12
11
38
44
41
33
26
6
34
42
2
28
13
37
9
8
7
1
4

P
11
3
38
34
37
13
10
1
4

12
11
P
30
34
28
2
10
3
1

P
10
60
36
45
12
11
41
51
62
64
61
54
13
42
1
4

PIPE CONNECTOR

TECHNICAL FIELD

The present invention relates to a pipe connector.

BACKGROUND ART

Connectors made of resin have conventionally been used to connect fuel pipes of an automobile to each other. The undermentioned patent document 1 discloses an example of the connectors. The connector disclosed in the document includes a housing for connecting ends of two pipes to be connected, a retainer which retains one of the pipes inserted through the housing and a checker for detecting the one pipe inserted thereby to assume a normal position.

When the pipe is inserted into the housing to assume the normal position, in patent document 1, the retainer is moved to a lock position by pushing the checker thereby to retain the pipe in a locked state. Furthermore, when the retainer turns to a locking state, the checker is allowed to be detached from the retainer, whereby the worker can confirm completion of pipe connection.

PRIOR ART DOCUMENT

Patent Documents

Patent Document 1: Japanese Patent Application Publication No. JP-A-2010-78077

SUMMARY OF THE INVENTION

Problem to be Overcome by the Invention

Since the checker is detached after completion of the pipe connecting work as described above, the retainer is attached to the housing so as to be exposed on an outer surface of the housing. Accordingly, when the retainer is subjected to an unexpected external force, for example, when the exposed part of the retainer is inadvertently operated, there is a possibility that the locking function of the retainer is reduced. Aside from this, the function of the checker is completely lost when the completion of the pipe connecting work has been confirmed. Accordingly, there is a problem that the checker must become waste.

The present invention was made in view of the above-described circumstances and an object thereof is to provide a pipe connector in which the checker can be prevented from becoming waste even after fulfillment of the detecting function thereof and which can stably maintain the retainer in the locking state.

Means for Overcoming the Problem

A pipe connector comprises a connector body having an insertion hole into which a pipe is insertable, the pipe having an outer periphery having an end side formed with a flange; a retainer having a locking portion configured to be attached to the connector body, a pair of locking legs which are deformable to be spread and closed and are moved into the insertion hole of the connector body in a direction intersecting an axial direction of the connector body, the locking legs being positioned in the insertion hole so as to protrude, before insertion of the pipe, into an approach path of the pipe, the locking legs being elastically flexible so as to retreat outward from the insertion hole upon passage of the flange thereby to allow the flange to pass through the insertion hole, the locking legs being elastically returned to lock a rear part of the flange, thereby retaining the pipe, and a release operation portion being operable to displace the locking legs in a direction such that the pipe is releasable from a retained state; and a checker which is formed separately from the retainer and is lockable to the connector body so as to assume a preliminary holding position, the checker being releasable from a locked state at the preliminary holding position to thereby be movable to a detection position when the pipe is inserted into the insertion hole to a normal position. In the pipe connector, the checker is provided with a cover configured to cover the release operation portion of the retainer when the checker assumes the detection position. The checker is formed with pressing pieces located rearward, in the insertion direction of the pipe, relative to the locking legs when the checker assumes the detection position, to thereby prevent the locking legs from being flexed rearward.

Effect of the Invention

According to the invention, when the checker assumes the detection position, the release operation portion of the retainer is covered with the cover so that the release operation portion cannot be externally viewed. This can visually detect whether or not the pipe has been normally inserted. Furthermore, since the release operation portion is covered with the cover, the release operation portion can be prevented from being erroneously operated, and the pipe can be prevented from being inadvertently removed.

Furthermore, since the checker remains attached to the connector body side while covering the release operation portion even after having fulfilled a function, the checker can be reused without becoming waste.

MODE FOR CARRYING OUT THE INVENTION

Figure 1:
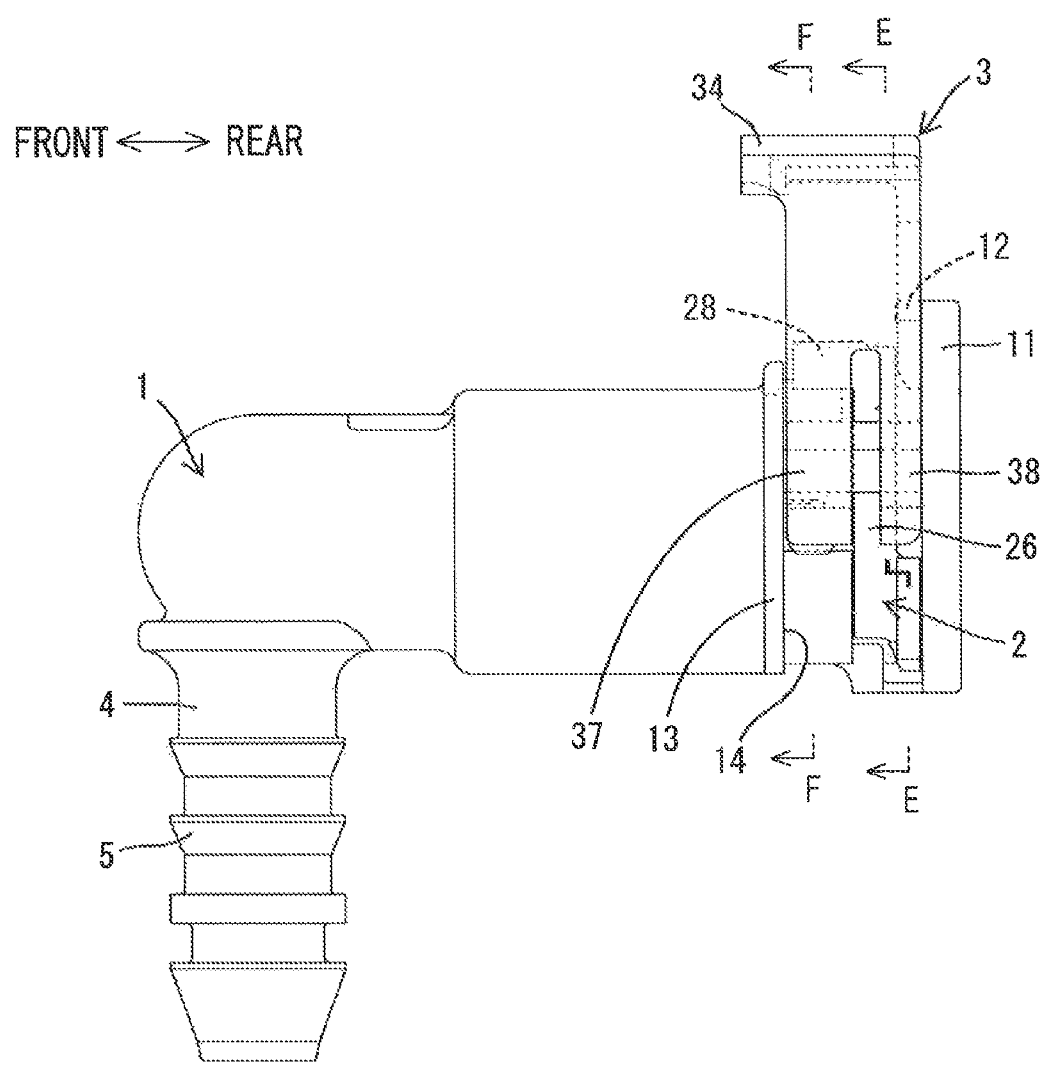
FIG. 1 is a side view of a pipe connector according to embodiment 1.

Preferred forms of the present invention will now be described.

(1) In the pipe connector according to the invention, the connector body may have two sides formed with a pair of open regions communicating with the insertion hole, respectively. The checker may be provided with a pair of legs which are formed so as to straddle the connector body from two side edges of the cover, the legs being flexible in a spreading direction, and the legs may have distal ends which are formed with detection portions bent inward. When the checker assumes the preliminary holding position, the detection portions may protrude from the open regions into the insertion hole thereby to be locked by an opening edge of the open region with a result that the checker is rendered immovable from the preliminary holding position to the detection position. When the pipe is inserted into the insertion hole so as to reach a normal depth, the detection portions may be retreated outward from the open regions while slidingly contacting with the flange and deforming the legs so that the legs are spread, thereby being released from a locked state to the opening edge of the open region, whereby the checker is rendered movable from the preliminary holding position to the detection position.

According to the above-described construction, the detection portion is locked to the opening edge of the open region when the pipe has not been inserted into the insertion hole to the normal depth. Accordingly, the checker cannot be moved to the detection position. However, when the pipe is inserted into the insertion hole to reach the normal depth, the flange slidingly contacts with the detection portion. With the sliding contact of the flange, the legs are spread with the result that the detection portion is retreated from the open region out of the connector body. As a result, since the detection portion is released from the locked state to the opening edge of the open region, the checker can be moved to the detection position, whereby the worker can find that the pipe has been inserted to the normal depth.

(2) When the checker assumes the detection position, the detection portion may be locked to the connector body, thereby holding the checker at the detection position.

According to the above-described construction, the detection portion is locked to the connector body, whereby the checker is held at the detection position. Consequently, the release operation portion is kept covered with the cover.

(3) The connector body may have a retainer insertion hole which communicates with the insertion hole and into which the locking legs are insertable. Both locking legs may have respective ends connected to each other by the release operation portion, and the retainer is displaceable in a depressing direction by pressing the release operation portion. The connector body may be formed with an inclined surface which slidingly contacts with distal ends of the locking legs with depression of the retainer to deform the locking legs so that the locking legs are spread, thereby releasing the locking legs from the locked state to the flange.

According to the above-described construction, both locking legs slidingly contact with the inclined surface of the connector body thereby to be deformed so as to be spread when the release operation portion of the retainer is pressed after the checker has been moved from the detection position to the preliminary holding position. As a result, since the locking legs are released from the locked state to the flange of the pipe, the pipe can be removed from the connector body. Thus, the pipe is removable without removal of the retainer from the connector body and accordingly, the pipe connector is advantageously effective in the work of removing the pipe.

(4) The checker may protrude from the connector body radially outward when assuming the preliminary holding position, and a direction in which the checker is displaced between the preliminary holding position and the detection position may intersect the axial direction of the connector body.

According to the above-described construction, the release operation portion can be covered with the cover by one-way movement of the checker from the preliminary holding position to the detection position. Furthermore, since the checker protrudes radially outward from the connector body when the checker assumes the preliminary holding position, failure to move the checker to the detection position can easily be confirmed visually.

(5) The cover may be formed with a cover wall which covers a front edge of the release operation portion from a front side when the checker assumes the detection position.

According to the above-described construction, since the front edge of the release operation portion is covered with the cover wall from the front side when the checker assumes the detection position, the release operation portion cannot be viewed even by an aslant sight line. Accordingly, accuracy in the function of detecting normal insertion of the pipe can be improved, and the release operation portion can be prevented from being inadvertently released from the front side.

(6) The connector body may have a flange which is formed so as to overhang and has such a height as to cover a rear edge of the release operation portion from a rear side.

According to the above-described construction, since the rear edge of the release operation portion is covered with the flange from the rear side, the release operation portion can be prevented from being inadvertently released from the rear side.

(7) The leg of the checker may be bifurcated to a front leg and a rear leg in a front-back direction with respect to an insertion direction of the pipe; the front leg may have a distal end formed with the detection portion, and the rear leg may have a distal end formed with an abutment portion which passes through the open region and protrudes into the insertion hole, the distal end of the rear leg being bent inward; and the abutment portion may abut against an outer surface of the locking leg of the retainer when the checker assumes the preliminary holding position, whereby the rear leg is flexible in conjunction with a spreading action of the locking leg.

According to the above-described construction, when the flange flexes the locking legs of the retainer by insertion of the pipe, the rear leg of the checker is flexed in conjunction with the locking leg by the abutment of the abutment portion against the locking leg. In this case, since an elastic reaction force of the rear leg is also added in addition to an elastic reaction force of the locking leg, resistance to insertion is increased. On the contrary, immediately after the flange has passed the locking leg, both locking leg and rear leg are elastically returned with the result that the resistance to insertion suddenly drops. Accordingly, the pipe can reliably be inserted to the normal insertion position by inertia. Furthermore, the drop in the resistance to insertion in this while can impart a feeling of click in the case of normal insertion.

(8) The connector body may have a side surface formed with a resistance imparting surface having a top located midway along a movement direction of the checker; the detection portion of the checker may be configured to slidingly contact with the resistance imparting surface during movement of the checker from the preliminary holding position to the detection position; and the resistance imparting surface may increase a spreading angle of the legs until the detection portion reaches the top of the resistance imparting surface, thereby increasing resistance to press against the checker, the legs being elastically returned thereby to decrease the resistance to press against the checker until the detection portion passes the top of the resistance imparting surface to reach the detection position.

According to the above-described construction, the resistance to pressing is increased by the resistance imparting surface until the detection portion reaches the top of the resistance imparting surface while the checker is moved to the detection position. However, the leg is elastically returned while the detection portion passes the top of the resistance imparting surface to reach the detection position, with the result that the resistance to pressing is decreased. The drop of the resistance to pressing can serve as a feeling of click suggesting that the checker has reached the detection position.

(9) The release operation portion and the cover may be colored different colors.

According to the above-described construction, the color of the release operation portion is concealed by the cover of the checker when the checker has reached the detection position. Accordingly, arrival of the checker at the detection position can visually be grasped.

(10) The checker may be formed with a pressing piece which is located rearward in the insertion direction of the pipe relative to the locking legs when the checker assumes the detection position, thereby preventing the locking legs from being flexed rearward.

According to the above-described construction, the pressing piece prevents rearward flexure of locking legs when the checker assumes the detection position. Consequently, the function of preventing the pipe from drop can further be improved. Furthermore, the checker is rendered multifunctional by providing such a function to the checker, whereupon the number of components can be prevented from being increased.

Embodiment 1

Embodiments 1 and 2 each embodying the pipe connector of the invention will be described with reference to the drawings.

Figure 2:
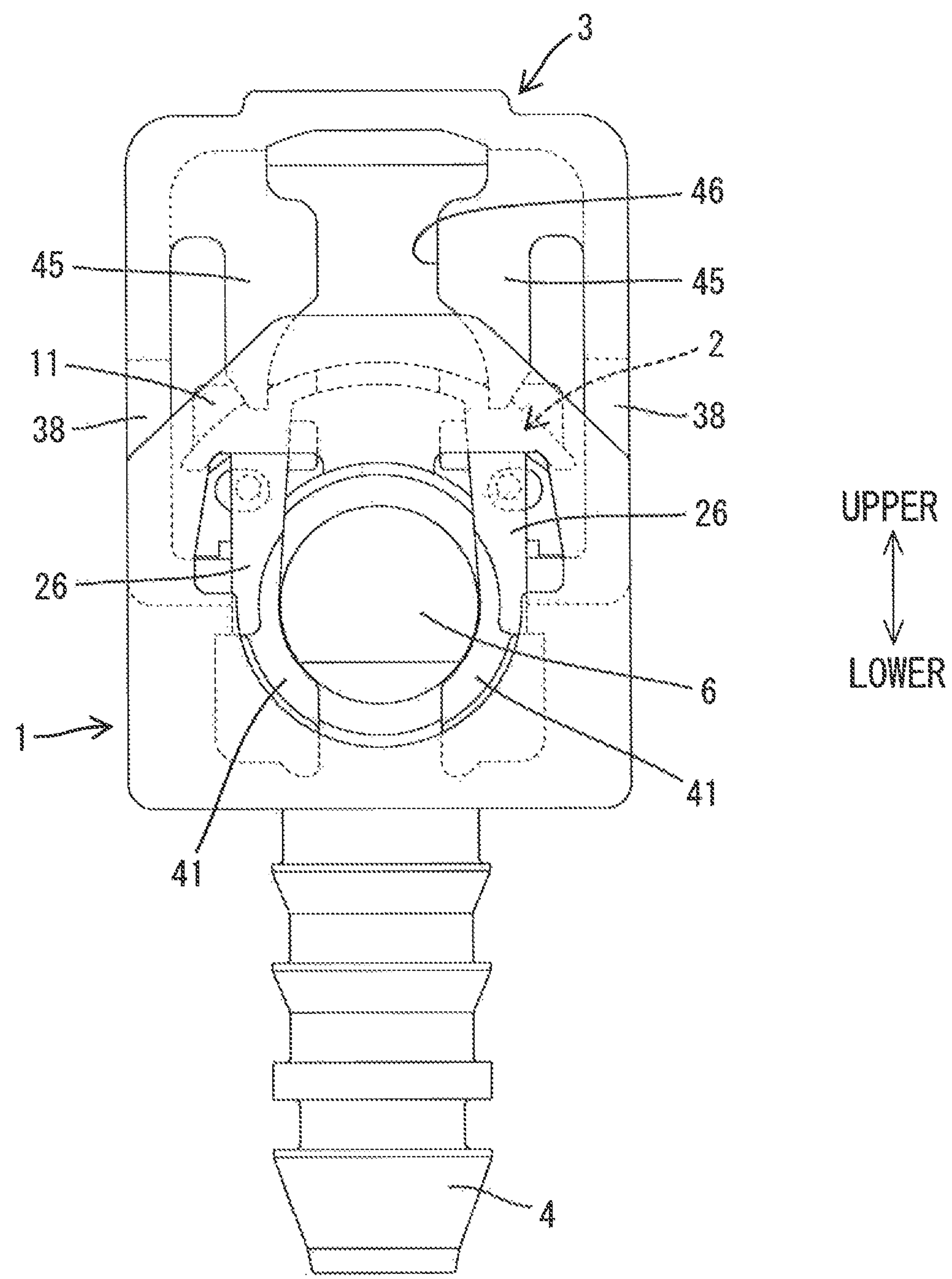
FIG. 2 is a rear view of the pipe connector.

FIGS. 1 to 35 illustrate embodiment 1 of the invention. In the following description, a left side in FIG. 1 is referred to as “front” and a right side is referred to as “rear.” A right-left direction is based on FIG. 2 and an up-down direction is based on FIGS. 1 and 2.

The connector of the embodiment includes a connector body 1, a retainer 2 and a checker 3, each of which is integrally formed of a synthetic resin material. In the embodiment, these components are colored different colors. For example, the connector body 1 is colored black, the retainer 2 is colored white and the checker 3 is colored red.

(Connector Body 1: Mainly See FIGS. 3 to 9)

The connector body 1 is formed so as to be hollow and has both ends to which two pipes are connected although only one of the two pipes P is shown. One of the ends of the connector body 1 is bent to a substantially right angle to be formed into a connecting cylindrical portion 4. The connecting cylindrical portion 4 is insertable into an end of the pipe (not shown) and has an outer periphery formed with a plurality of axially extending concavo-convex portions 5 to strengthen catches to the pipe (not shown).

Figure 17:
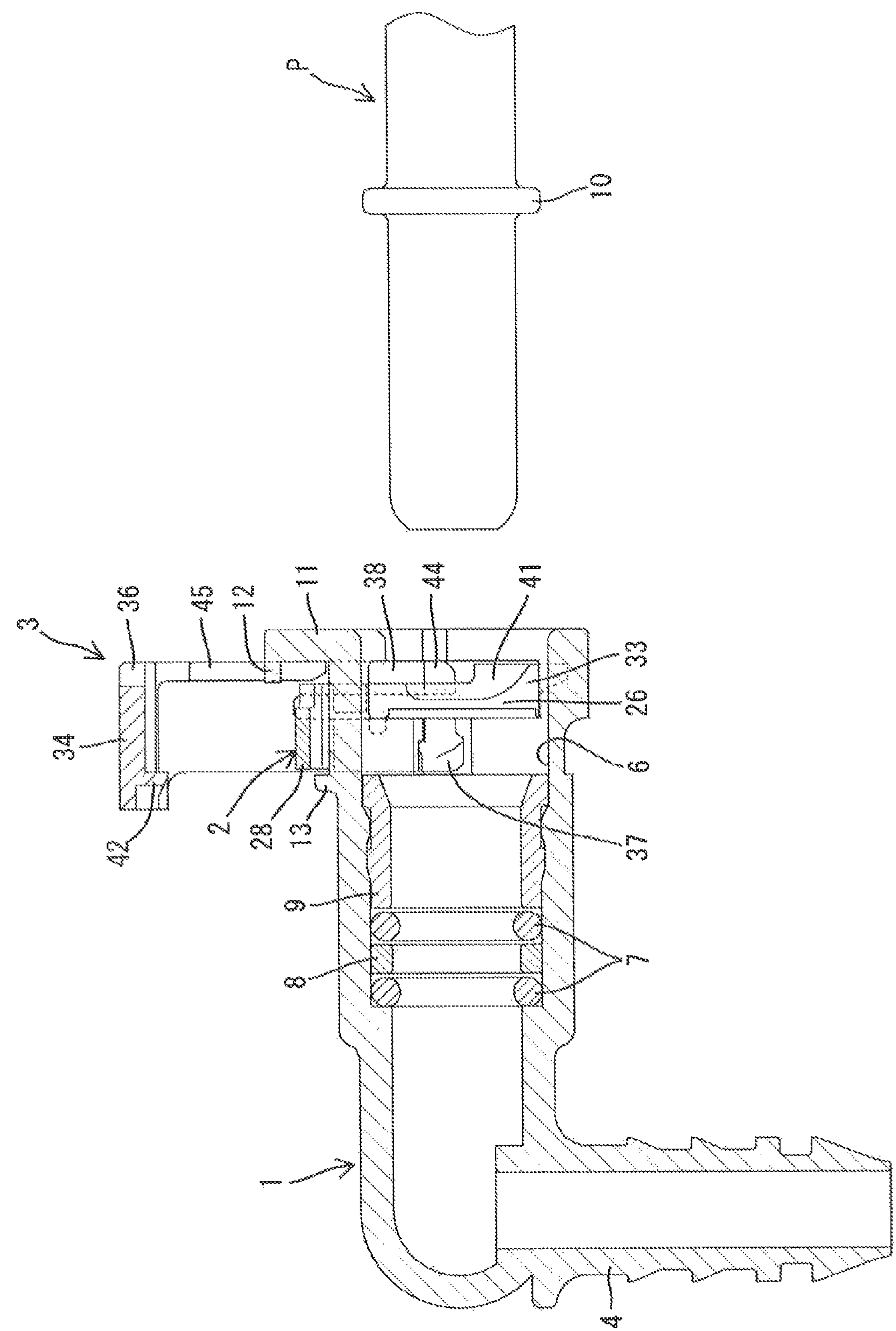
FIG. 17 is a sectional view of the pipe connector when the checker assumes a preliminary holding position.

An insertion hole 6 is axially formed in the other end side of the connector body 1 so that the other pipe P is insertable thereinto. Two O-rings 7 are disposed in the back of the insertion hole 6 as shown in FIG. 17 and the like. A spacer 8 is interposed between the O-rings 7. The O-rings 7 and the spacer 8 are retained in the insertion hole 6 by a cylindrical retaining member 9 attached in the insertion hole 6.

Figure 23:
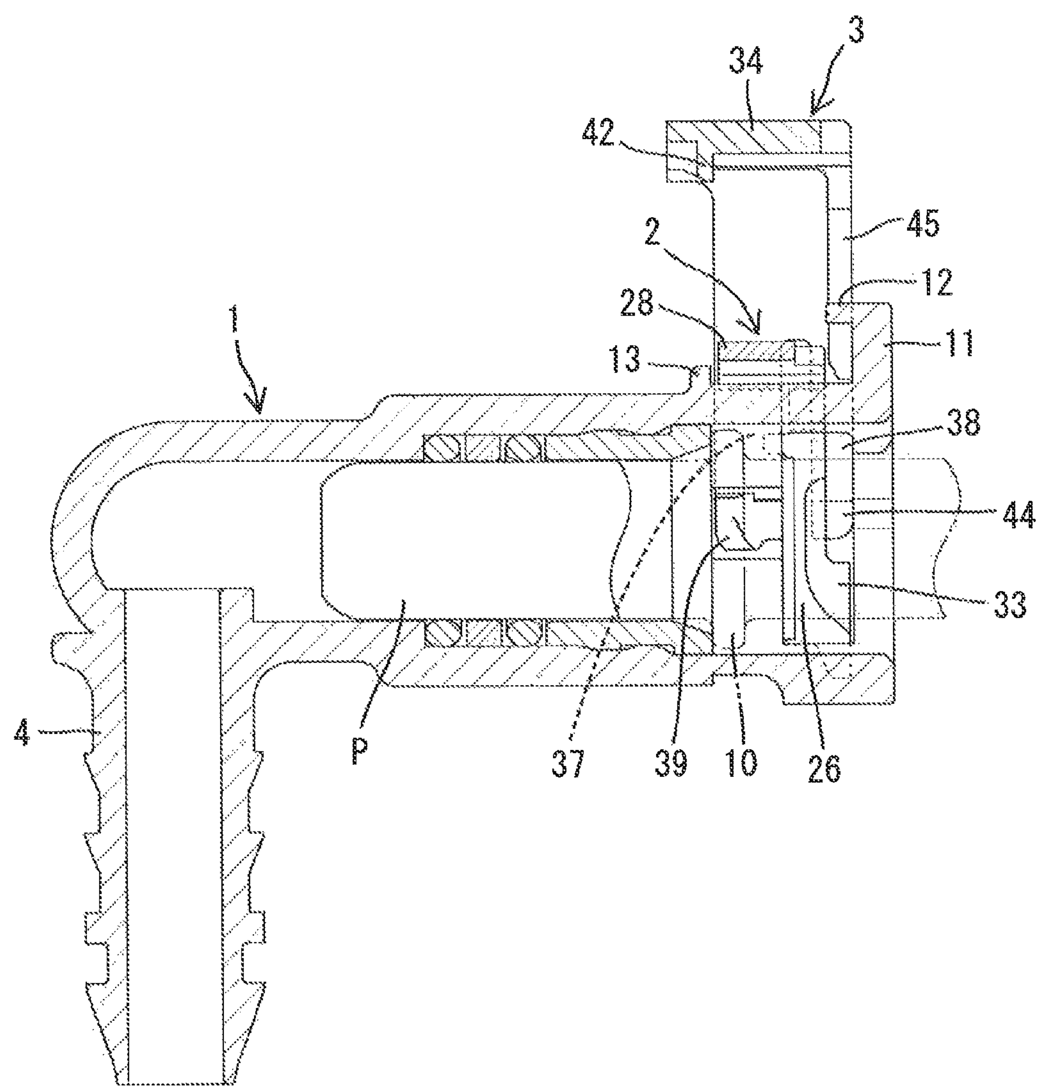
FIG. 23 is a sectional view of the pipe connector when the pipe has been inserted into the normal position.

The other pipe P has a flange 10 which is formed on the outer periphery thereof near one end of the pipe P. The pipe P has a distal end which is insertable through the insertion hole 6 and the retaining member 9 and the O-rings 7, as shown in FIG. 23 and the like. When the flange 10 abuts against a rear end of the retaining member 9, the pipe P is prevented from further insertion.

Figure 3:
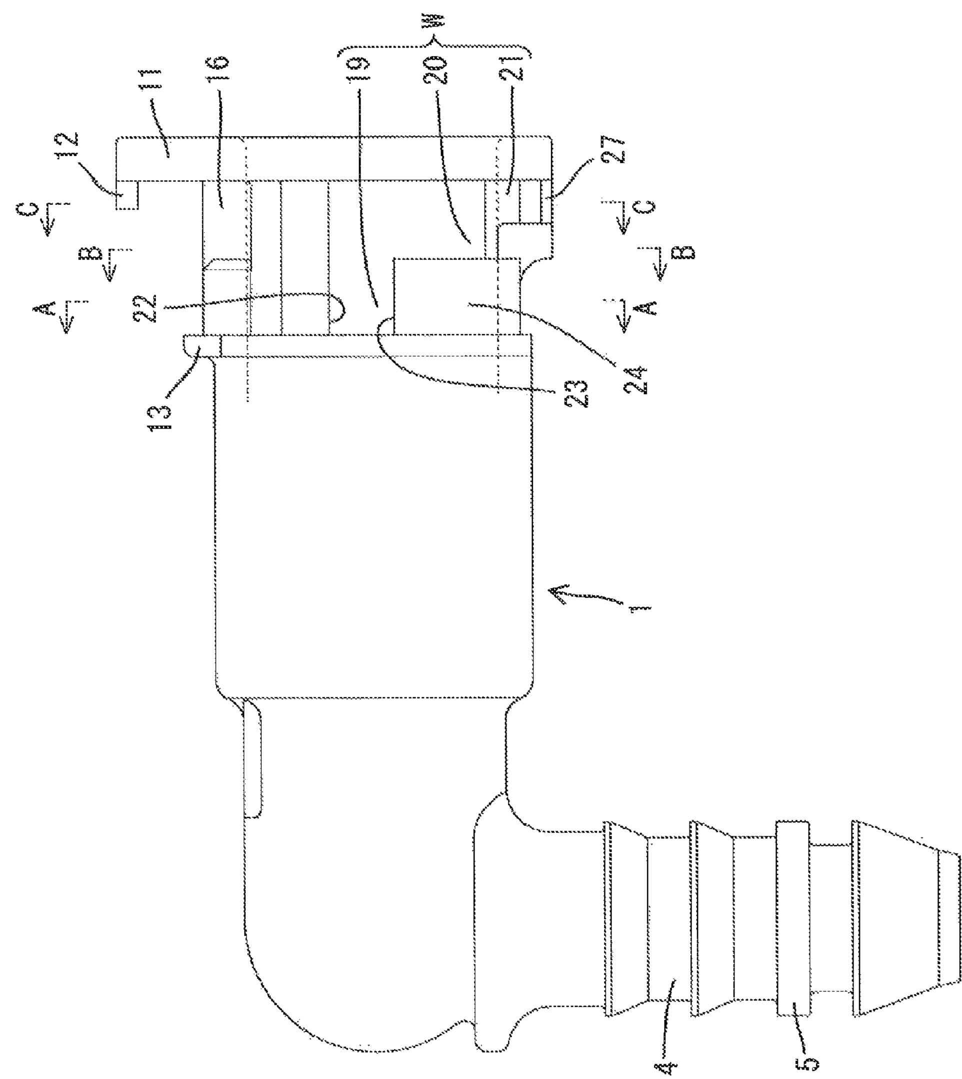
FIG. 3 is a side view of a connector body.
Figure 4:
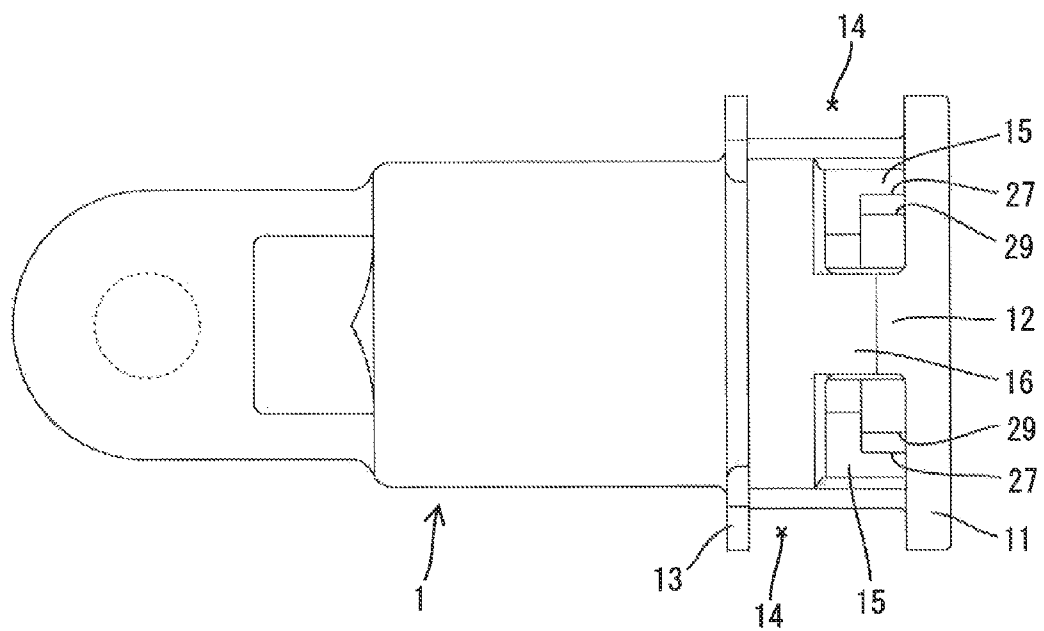
FIG. 4 is a plan view of the connector body.
Figure 5:
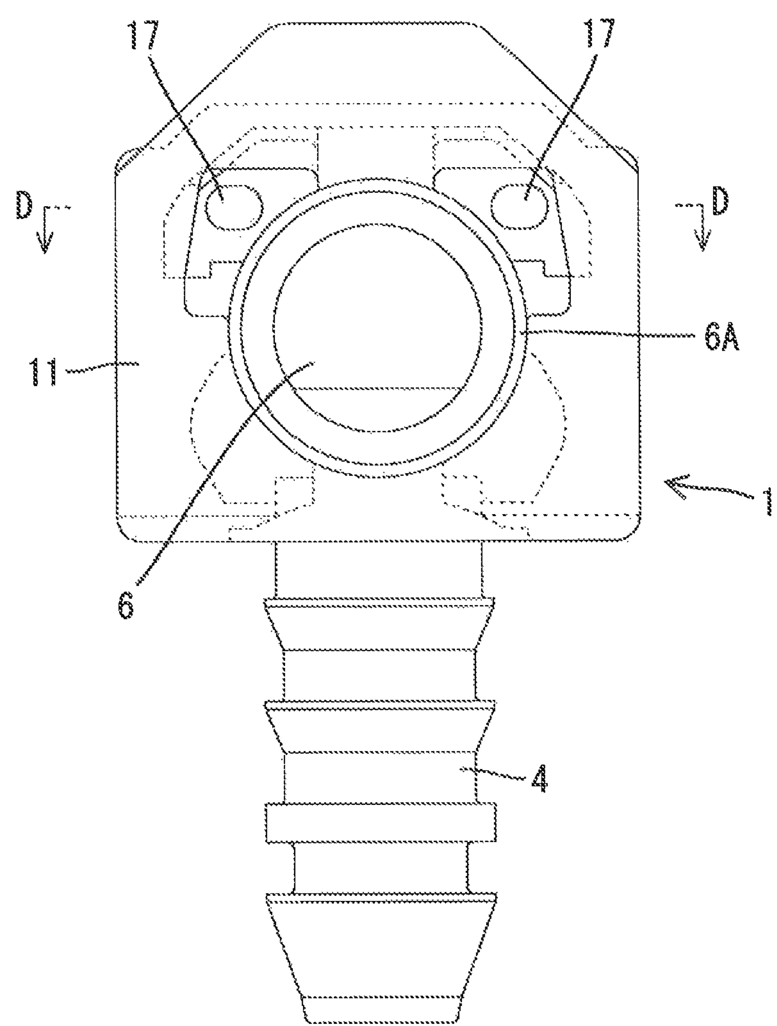
FIG. 5 is a rear view of the connector body.

A first flange 11 is formed on a rear end of the outer periphery of the connector body 1 as shown in FIGS. 3 and 4. The first flange 11 has a shape formed by obliquely cutting right and left ends of an upper edge of the connector body 1 as viewed in FIG. 5. The first flange 11 is formed so that both side edges and the upper edge thereof overhang outward relative to the outer periphery of the connector body 1 except for a lower edge thereof. A postural maintenance piece 12 horizontally protrudes frontward from the central upper edge of the first flange 11 at the front surface side of the first flange 11 (see FIGS. 3 and 4). The postural maintenance piece 12 serves to maintain the posture of the checker 3 when the checker 3 is moved between a preliminary holding position and a detection position both of which will be described later.

A second flange 13 is formed so as to protrude from a location axially spaced away a predetermined distance from the first flange 11 on the outer periphery of the connector body 1 and so as to be arranged parallel to the first flange 11. The second flange 13 is formed so as to be thinner than the first flange 11 and has an outer peripheral edge formed into a square shape. The second flange 13 is formed so as to overhang in the right-left direction from the outer periphery of the connector body 1. The second flange 13 overhangs in the right-left direction by substantially the same length as the first flange 11. When both flanges 11 and 13 overhang in the right-left direction, a guide groove 14 guiding the movement of the checker 3 is defined between the flanges 11 and 13 as will be described later.

Retainer insertion holes 15 are open in an upper surface of the connector body 1 between the first and second flanges 11 and 13. The retainer insertion holes 15 are provided for assembling a retainer 2 and communicate with the insertion hole 6. The retainer insertion holes 15 are open while being partitioned by a centrally formed partition piece 16 as shown in FIG. 4. The partition piece 16 has substantially the same width as the postural maintenance piece 12 with respect to the right-left direction. Walls defining both retainer insertion holes 15 include wall surfaces located at the front side respectively. A pair of locking recesses 17 are formed in the wall surfaces with the partition piece 16 being interposed therebetween (see FIGS. 5 to 9). When positioning protrusions 18, which will be described later, of the retainer 2 are fitted in both locking recesses 17 respectively, the recesses 17 serve to hold the retainer 2 mounted to the connector body 1.

A pair of windows W are open in an inner region of the guide groove 14 in the right and left side surfaces of the connector body 1 as shown in FIG. 3. The windows W include first to third open regions 19 to 21 communicating with one another. The open regions 19 to 21 have uniform height locations of upper edges, whereby the upper edges serve as retaining edges 22 for the checker 3.

Figure 6:
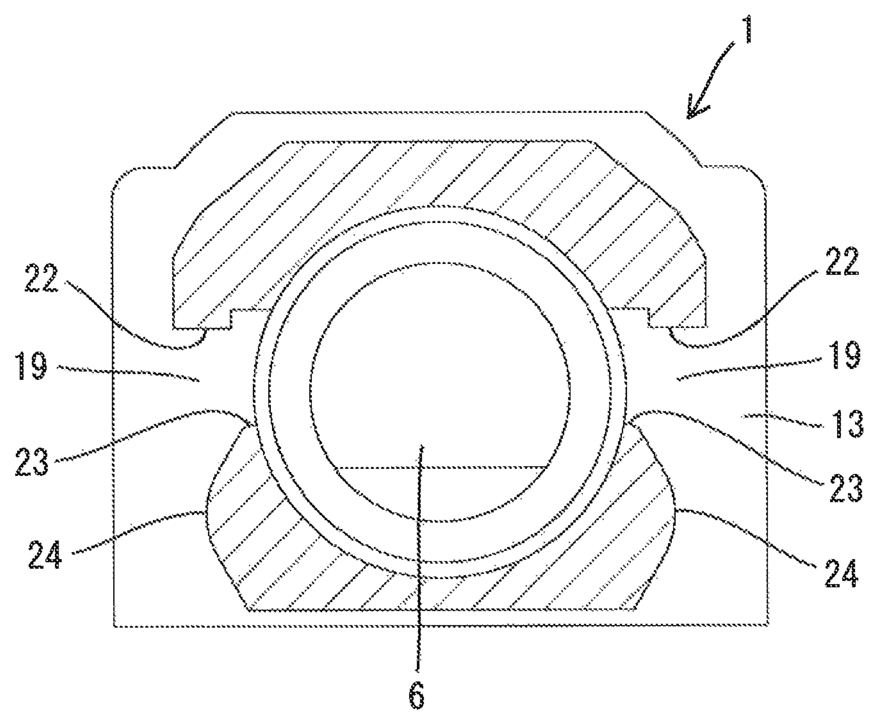
FIG. 6 is a sectional view taken along line A-A in FIG. 3.
Figure 7:
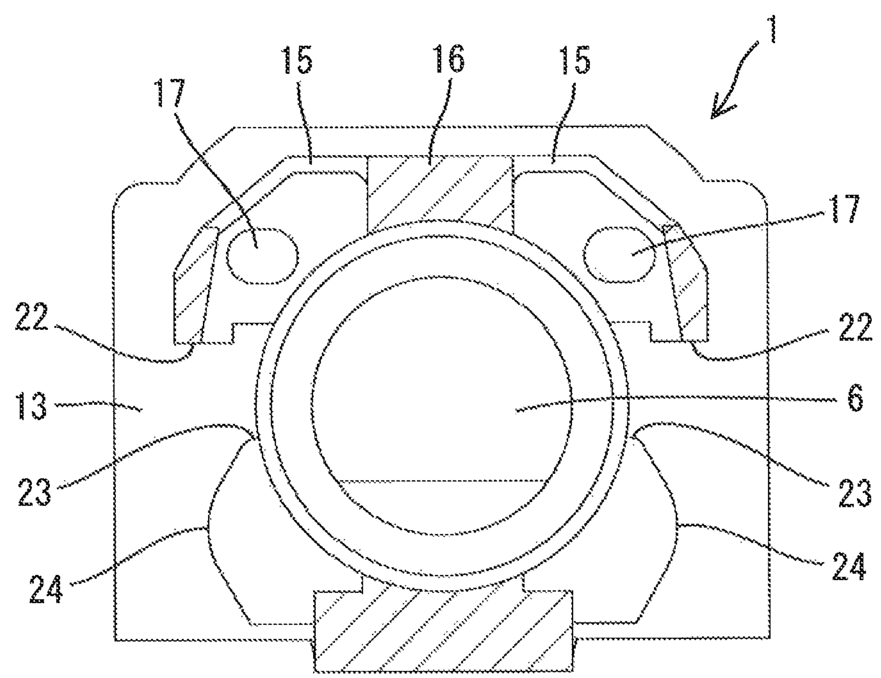
FIG. 7 is a sectional view taken along line B-B in FIG. 3.

Lower edges of the first open regions 19 are located highest and serve as drop preventing edges 23 which prevent the checker 3 from moving downward from the preliminary holding position. The drop preventing edges 23 are formed so as to be sharpened, whereby the connector body 1 has an outer surface which is located lower than the drop preventing edges 23 and formed so as to have an arc section with the result that resistance imparting surfaces 24 are formed, as shown in FIG. 6 and the like. The resistance imparting surfaces 24 are curved into an arc shape so as to have tops (outermost protruding part) located midway in the up-down direction (a movement direction of the checker 3) respectively. The resistance imparting surfaces 24 impart a predetermined resistance to the checker 3 and serve to open legs smoothly when, the checker 3 is pushed from the preliminary holding position to the detection position.

Figure 9:
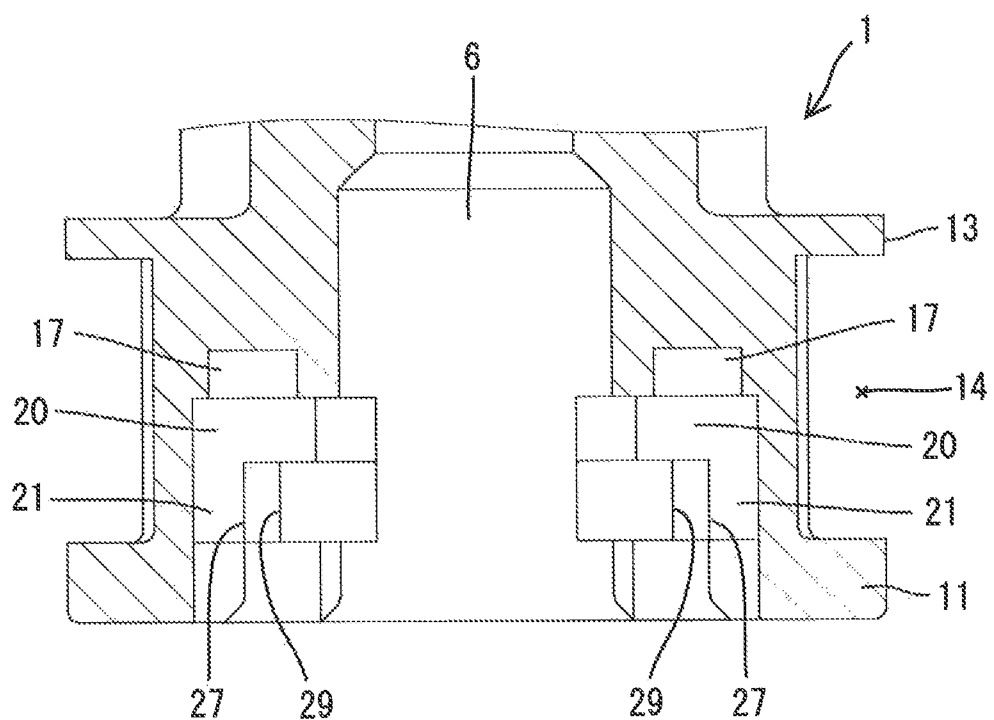
FIG. 9 is a sectional view taken along line D-D in FIG. 5.

The second open regions 20 are formed so as to cover the widest angular range of the three open regions (see FIG. 9). The open edges of the second open regions 20 include lower edges formed so as to rise substantially vertically, respectively. Open regions formed by the second and third open regions 20 and 21 are sized so that the locking legs 26 of the retainer 2 are moved into and out of the connector body 1 respectively.

Figure 8:
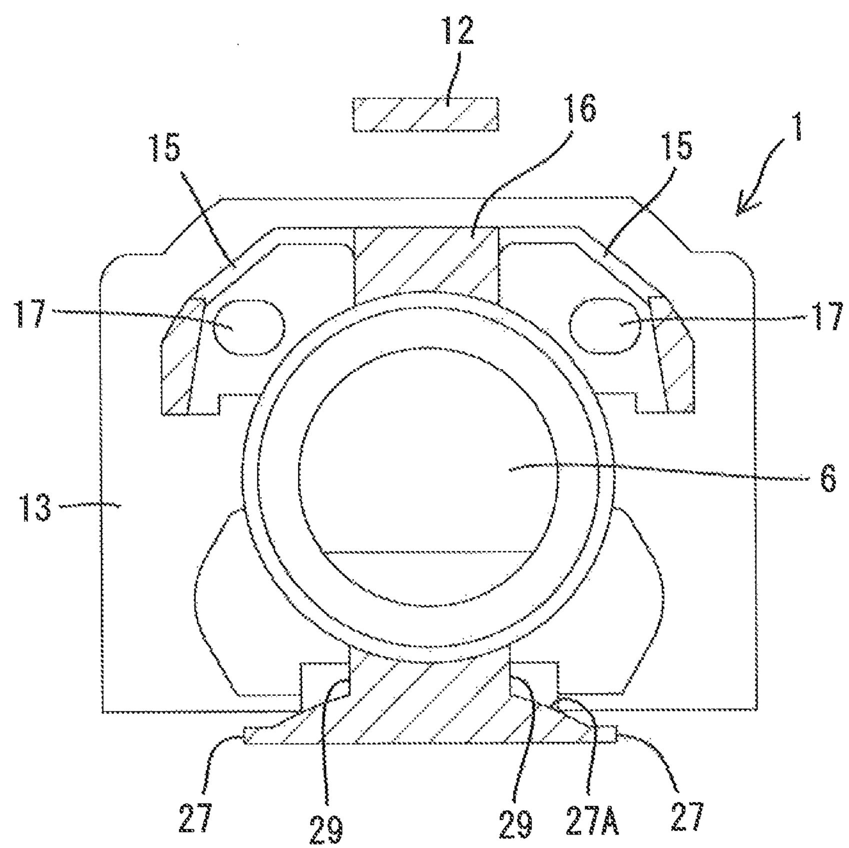
FIG. 8 is a sectional view taken along line C-C in FIG. 3.

The open edges of the third open regions 21 have lower edges formed with thin checker lock receiving surfaces 27 respectively as shown in FIG. 8 and the like. When the checker 3 reaches the detection position, rear legs 38 of the checker 3 are elastically returned thereby to abut against the respective checker lock receiving surfaces 27. The checker lock receiving surfaces 27 have upper edges to which inclined surfaces 27A with a slope gradually rising to an inner side are continuous. The inclined surfaces 27A further have upper edges on which retainer lock receiving surfaces 29 are formed so as to rise steeply. The receiving surfaces 29 abut against the inner sides of lower ends of the locking legs 26 respectively when the locking legs 26 of the retainer 2 have elastically been returned from the spread state.

(Retainer 2: Mainly See FIGS. 10 to 13)

Figure 18:
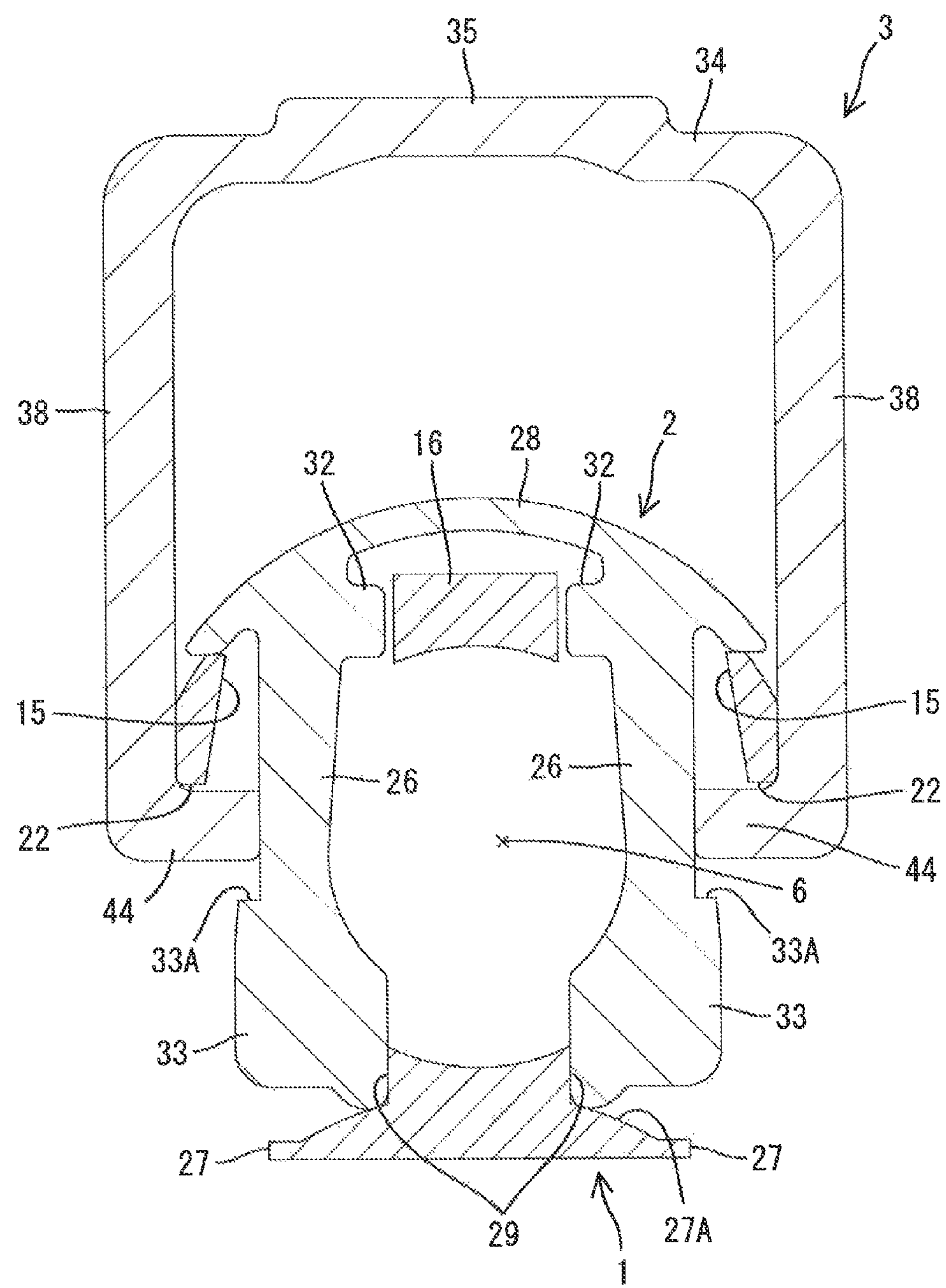
FIG. 18 is a sectional view taken along line E-E in FIG. 1.
Figure 19:
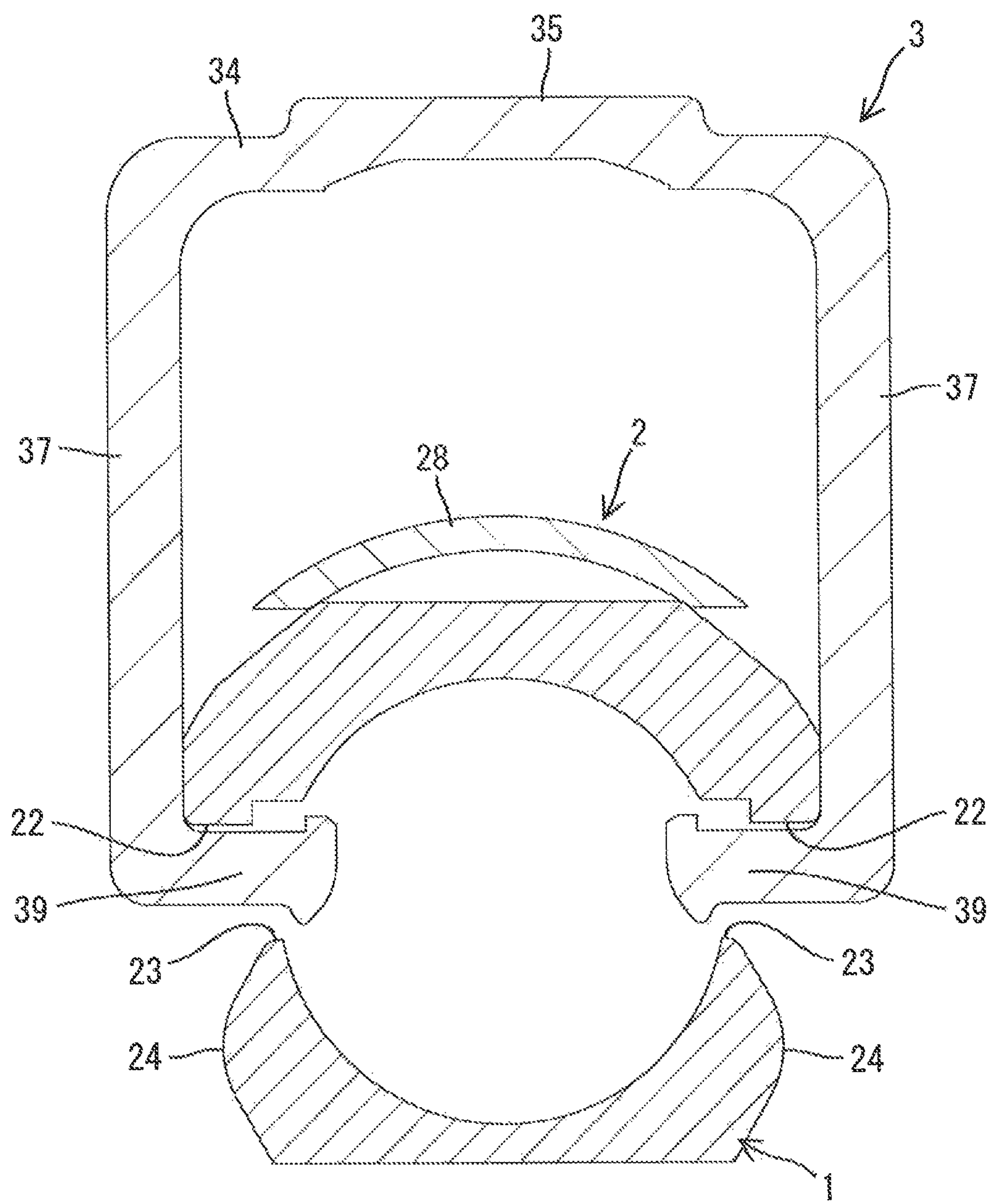
FIG. 19 is a sectional view taken along line F-F in FIG. 1.

The retainer 2 has the release operation portion 28 on an upper part thereof. The release operation portion 28 releases the pipe P from the retained state by the retainer 2 when the checker 3 assumes the preliminary holding position. The release operation portion 28 has a front-back width smaller than a front-back width of the connector body 1 between the first and second flanges 11 and 13 and is formed into the shape of arc fitting substantially into the configuration of the outer periphery of the connector body 1. In the state where the retainer 2 is attached to the connector body 1, an underside of the top of the release operation portion 28 is spaced away from the partition piece 16 as shown in FIG. 18 and the like. As a result, the top of the release operation portion 28 is flexible in the up-down direction by the pressing operation. With flexure of the release operation portion 28, the locking legs 26 are elastically deformed in the spreading direction, whereupon the pipe P is rendered detachable. In the embodiment, the pipe P can be released from the retained state by the retainer 2 in two manners, that is, by the above-described pressing operation of the release operation portion 28 and in a manner that the release operation portion 28 is raised by a releasing jig. Explaining the latter case, the release operation portion 28 is disposed so as to protrude slightly from the upper edge of the second flange 13, as shown in FIG. 17 and the like. In the state where the checker 3 is detached (or assumes the preliminary holding position), the retainer 2 can be detached from the connector body 1 by the releasing jig (not shown) inserted and raised at the underside of the top of the release operation portion 28.

Figure 13:
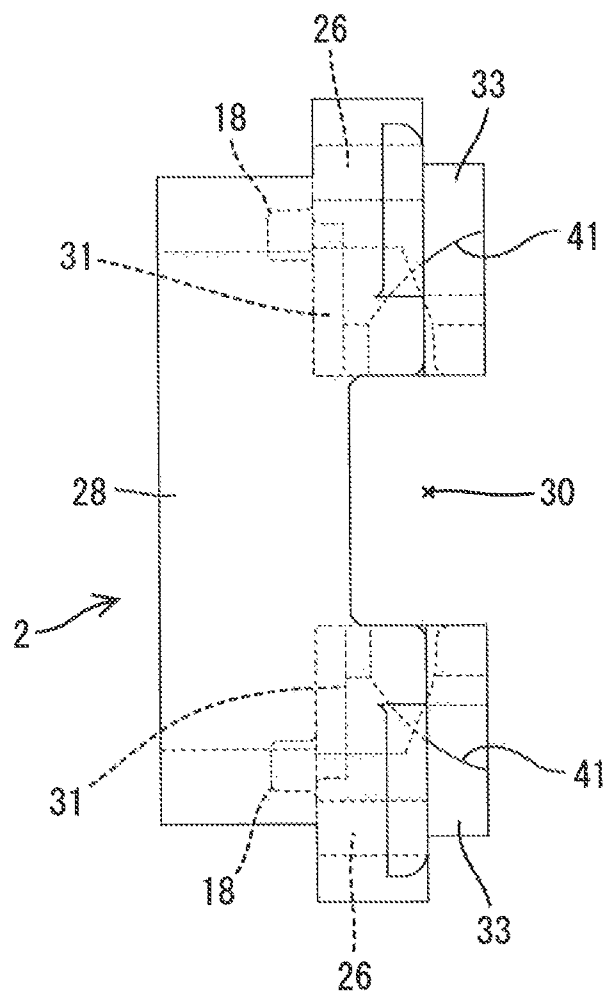
FIG. 13 is a plan view of the retainer.

As shown in FIGS. 13, 18 and the like, the release operation portion 28 includes both ends in the right-left direction, and the ends are formed so as to have lengths allowing the ends to be locked, to outer ends of the open edges of the retainer insertion holes 15 respectively. The release operation portion 28 has an escape recess 30 formed, by notching a horizontally central part of the rear side of the upper surface thereof, so that the retainer 2 is avoided from interference with the postural maintenance piece 12 when the retainer 2 is radially attached to the connector body 1.

The paired locking legs 26 are formed on part of the underside of the release operation portion 28 located near the rear of the release operation portion 28. The locking legs 26 are directed downward. The locking legs 26 are formed so as to be insertable through the respective retainer insertion holes 15 into the interior of the connector body 1 and so as to be flexible in the spreading direction. In the state where the retainer 2 is attached to the connector body 1, the locking legs 26 protrude into the insertion hole 6, that is, into an approach pass of the pipe P, standing by there, as shown in FIG. 18 and the like. Furthermore, shallow thin portions 31 are formed on the front sides of the locking legs 26 for the purpose of avoiding interference with rounded portions formed on the base of the flange 10 of the pipe P.

Figure 10:
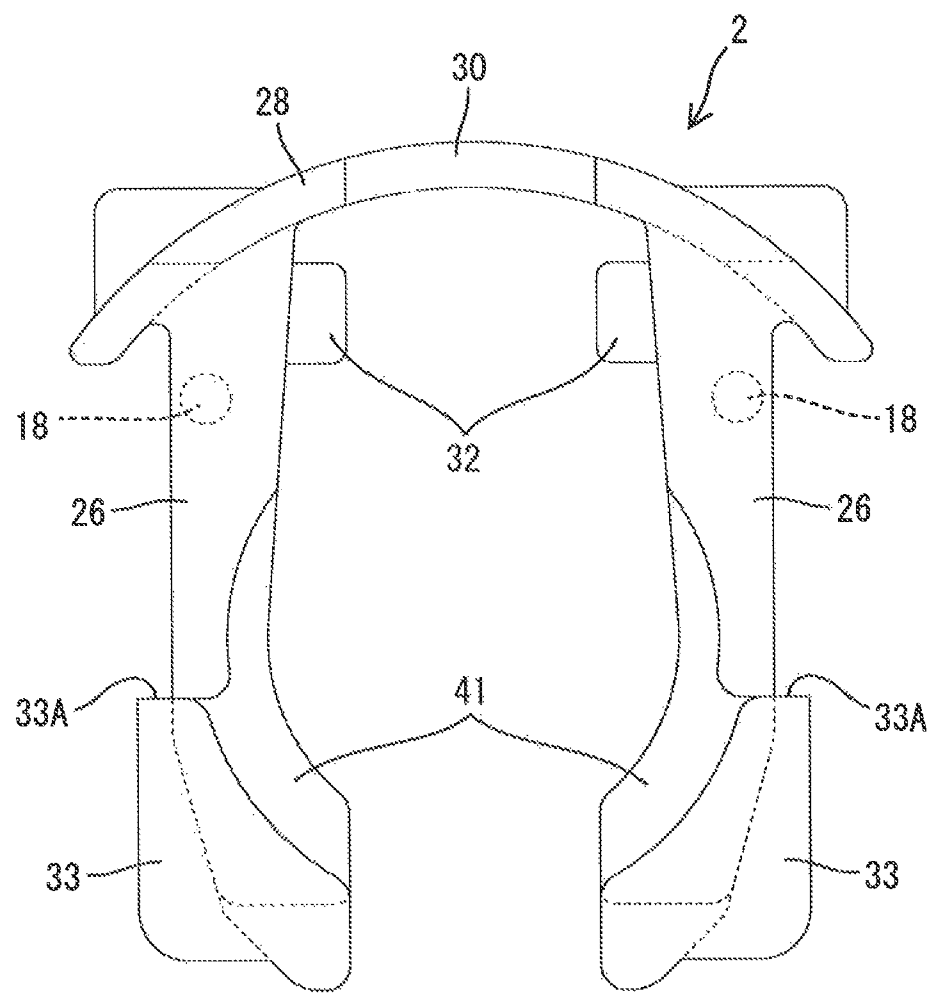
FIG. 10 is a rear view of a retainer.
Figure 12:
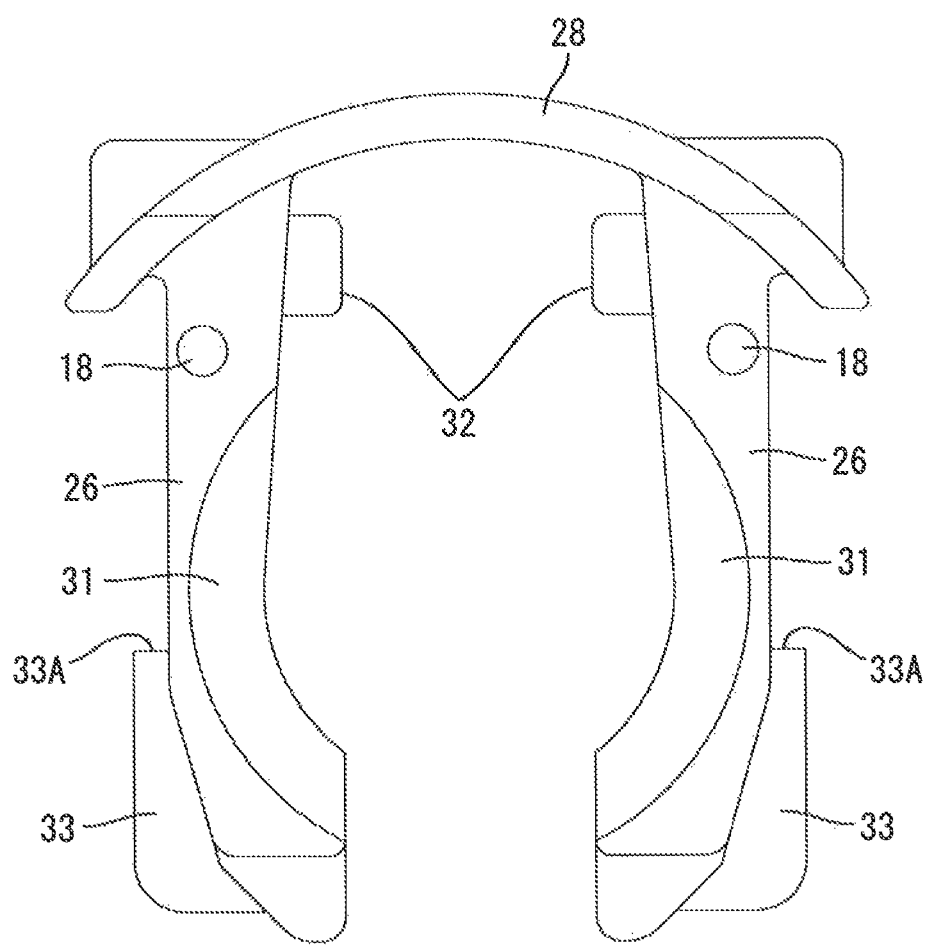
FIG. 12 is a front view of the retainer.

A pair of retaining protrusions 32 protrude from root portions of the locking legs 26 so as to face each other in the right-left direction, respectively, as shown in FIGS. 10 and 12. The retaining protrusions 32 are adapted to be located at opposite sides of the partitioning piece 16 respectively when the retainer 2 is attached to the connector body 1, whereby the retaining protrusions 32 prevent the upper part of the retainer 2 from being inclined in the right-left direction, as shown in FIG. 18 and the like. A pair of positioning protrusions 18 (serving as locking portions in the invention) protrude frontward from portions of the front sides of the locking legs 26 located slightly lower than retaining protrusions 32, respectively. The positioning protrusions 18 are fitted into the respective locking recesses 17 of the connector body 1 thereby to prevent the retainer 2 from being detached and displaced, as described above. However, the locking recesses 17 are each formed into the shape of a hole elongate in the right-left direction, whereupon the positioning protrusions 18 are allowed to be freely moved during operation of the locking legs 26 so that the spreading and closing of the locking legs 26 are not prevented.

The locking legs 26 include rear side lower ends serving as protrusions 33 which are formed so as to protrude rearward and outward in the right-left direction, respectively. The protrusions 33 include portions protruding from the locking legs 26 and having upper surfaces formed with locking steps 33A, respectively. When the checker 3 assumes the preliminary holding position, the locking steps 33A are rendered lockable to the rear leg 38 sides of the checker 3, thereby preventing the checker 3 from inadvertently falling to the detection position, at the rear leg 38 sides.

Guide arc surfaces 41 are formed by deeply gouging regions of the rear surfaces of the locking legs 26 leading to the protrusions 33, respectively. The guide arc surfaces 41 are formed into curved shapes so that the locking legs 26 can be smoothly spread when the pipe P is inserted. In the state where the retainer 2 is attached in the connector body 1, main parts of the locking legs 26 are adapted to be opposed to the second open region 20, and the protrusions 33 are adapted to be opposed to the third open region 21, as shown in FIG. 17 and the like. When the locking legs 26 are spread, the main parts of the locking legs 26 and the protrusions 33 are allowed to protrude outward from the respective open regions. In the state where the pipe P is inserted into the insertion hole 6 to reach the normal position, the locking legs 26 and the protrusions 33 are located at the rear side of the flange 10 while the outer periphery of the pipe P is held between the locking legs 26 and the protrusions 33, and the locking legs 26 and the protrusions 33 overlap a part of the flange 10 as viewed at the rear. This can achieve retention of the pipe P.

(Checker 3: Mainly See FIGS. 14 to 16)

The checker 3 is held at two positions differing from each other in the height position relative to the connector body 1, whereby the checker 3 is displaceable between, the positions. One of the positions is the preliminary holding position (see FIGS. 1, 17 and the like) where the checker 3 is held while projecting upward from the connector body 1, and the other is the detection position (see FIGS. 29, 33 and the like) where the checker 3 is held in proximity to the connector body 1.

The checker 3 has a cover 34 on an upper part thereof. The cover 34 is formed into the shape of a flat plate and, is sized so that when the checker 3 assumes the detection position, the cover 34 covers the release operation portion 28 of the retainer 2 with the result that the entire release operation portion 28 is not externally exposed in a planar view. The cover 34 has a bulging portion 35 which is formed in a central part of the cover 34 in the right-left direction so as to bulge upward along the front-back direction. The bulging portion 35 has an underside recessed upward, so that the bulging portion is prevented from interference with the release operation portion 28 of the retainer 2 when the checker 3 assumes the detection position. The cover 34 has a rear end having a notch 36 formed in a central part thereof in the right-left direction. The postural maintenance piece 12 of the first flange 11 is fitted into the notch 36 when the checker 3 assumes the detection position, whereby the interference is avoided.

A pair of right and left legs L are formed on the right and left side edges of the cover 34 so as to droop, respectively. The legs L are flexible in the spreading direction. Each leg L is bifurcated into front and rear legs 37 and 38. Both legs L are disposed so as to be biased rearward relative to the cover 34, whereupon the cover 34 has a part protruding frontward from the legs L. The protruding part serves to enlarge an upper surface of the cover 34 thereby to render the pressing operation of the checker 3 easier and to reliably cover the release operation portion 28 when the checker 3 assumes the detection position.

Figure 29:
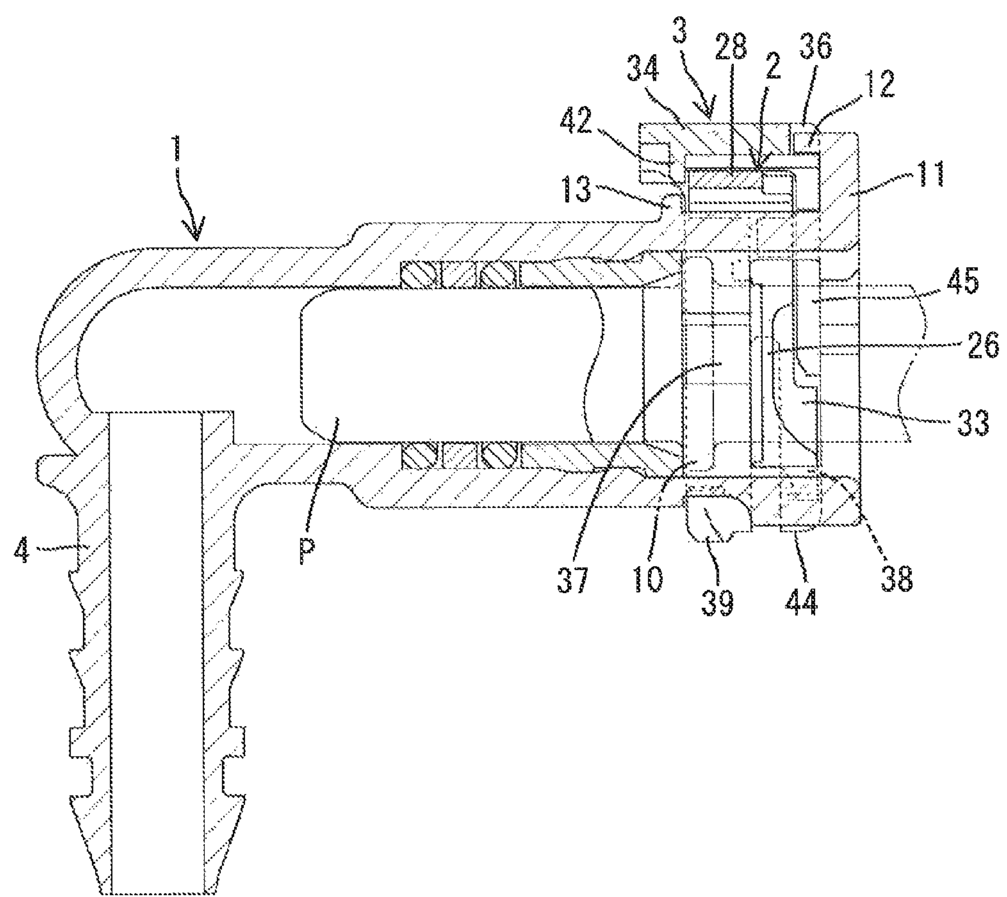
FIG. 29 is a sectional view of the pipe connector when the checker assumes the detection position.

The protruding part of the cover 34 has a cover wall 42 which is formed in the central part of the underside thereof in the right-left direction so as to be spaced away from a front edge slightly rearward and so as to be directed downward. As shown in FIG. 29, the cover wall 42 is located above the second flange 13 so as to be opposed to the second flange 13 with a slight gap therebetween when the checker 3 assumes the detection position. As a result, the cover wall blocks a line of sight from obliquely forward thereby to conceal the release operation portion 28.

Figure 33:
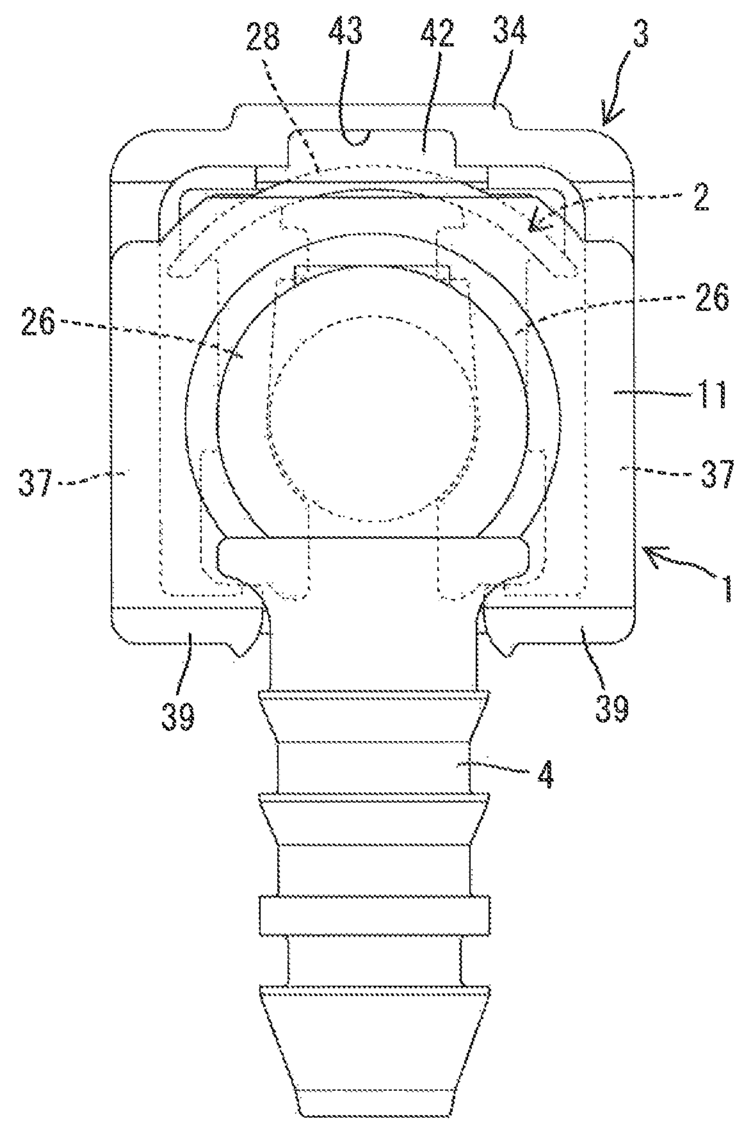
FIG. 33 is a front view of the pipe connector.
Figure 34:
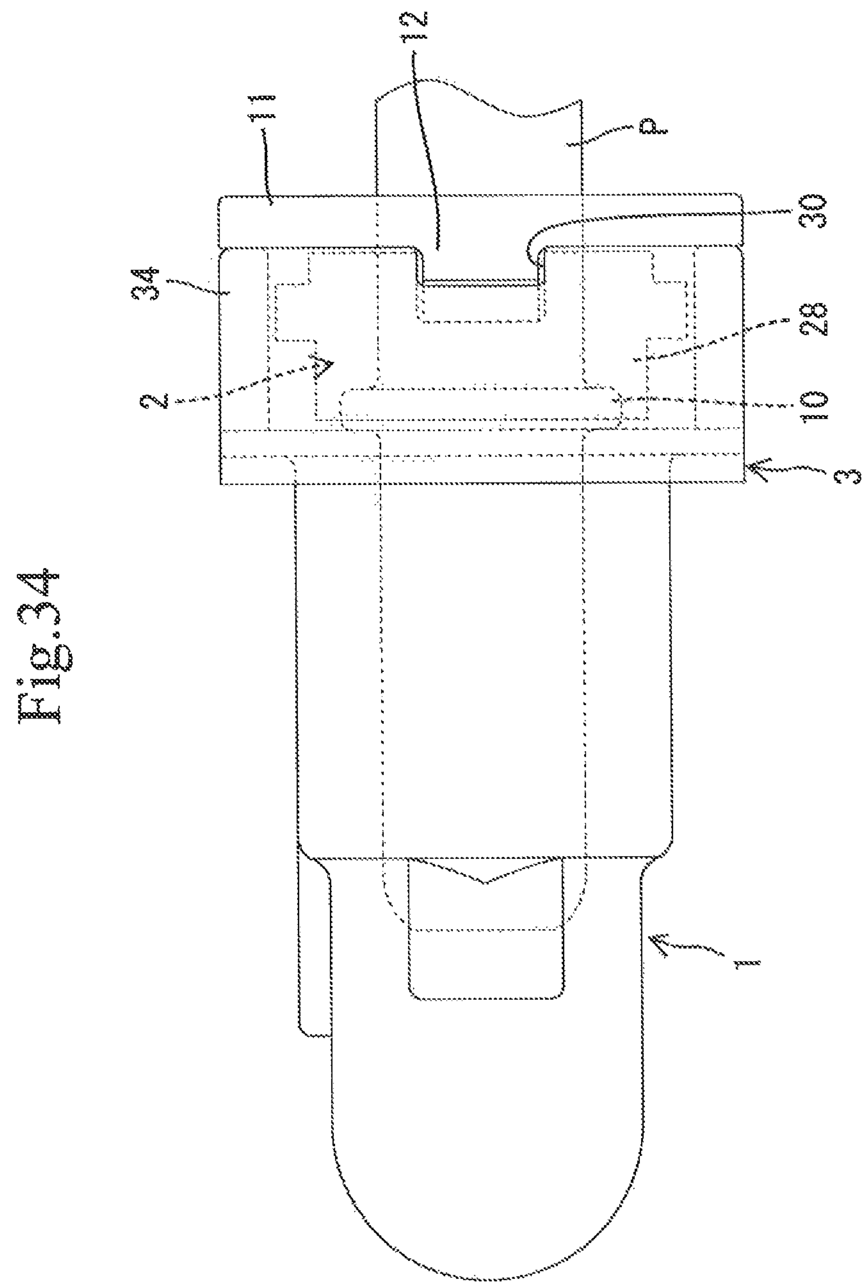
FIG. 34 is a plan view of the pipe connector.

An opening 43 defined at the front end side of the bulging portion 35 of the cover 34 is configured so as to be wholly exposed above the first flange 11 when the checker 3 assumes the detection position, as shown in FIG. 33. A releasing jig (not shown) can be inserted into the opening 43 so that the checker 3 can be raised.

The legs L of the checker 3 are bent at the right and left side edges of the cover 34 substantially at right angles, extending downward. Each leg L has a front-rear width slightly smaller than the groove width of the guide groove 14 of the connector body 1. Each leg L is formed with a slit 40 extending from a lower end in the central portion of each leg L in the front-back direction substantially to a half height position, whereby each leg L is bifurcated into front and rear parts.

Each front leg 37 is located in front of the locking legs 26 of the retainer 2 as viewed in a side view and at the outer side of the first open region 19 of the connector body 1 in the right-left direction, as shown in FIG. 1. Each front leg 37 is formed so as to have substantially the same front-back width as the first open region 19. Each front leg 37 has a lower end which is bent inward substantially at right angles thereby to be formed into a detection portion 39. Each detection portion 39 has a distal end extending through the first open region 19 into the interior of the connector body 1.

Each detection portion 39 has a tapered spreading guide surface 39A formed on the rear side of the distal end thereof. Each guide surface 39A abuts against the flange 10 of the pipe P thereby to be capable of guiding the spreading operation of each front leg 37. The distal end of each detection portion 39 protrudes both upward and downward. When the checker 3 assumes the preliminary holding position, the upper protrusion gets inside the front retaining edges 22 thereby to be loosely locked to the edges 22, whereby the checker 3 is prevented from inadvertently coming off outward in the right-left direction. When the checker 3 assumes the preliminary holding position and the pipe P is not inserted into the connector body 1 to the normal position, the lower protrusion also gets inside the drop preventing edges 23 but is located slightly above the drop preventing edges 23. When the checker 3 assumes the preliminary holding position and the pipe P is inserted into the connector body 1 to the normal position, the distal end surfaces of the detection portions 39 abut against the circumferential surface of the flange 10 thereby to be pressed out in the right-left direction. In this case, the lower protrusions of the detection portions 39 are set to be located outside the drop preventing edges 23, respectively.

Figure 28:
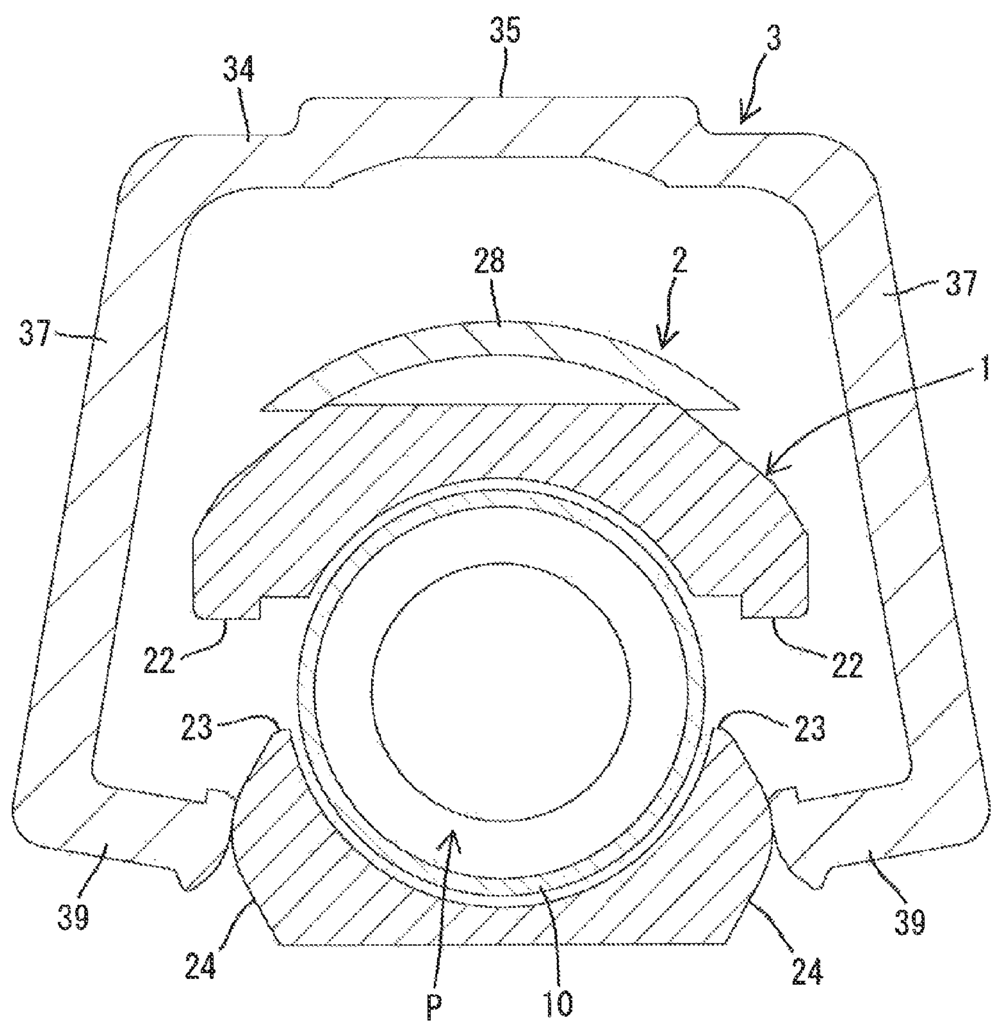
FIG. 28 is a sectional view taken along line F-F in FIG. 1.

As shown in FIG. 28, in the course of the checker 3 moving from the preliminary holding position to the detection position, the detection portions 39 slidingly contact on the resistance imparting surfaces 24 while spreading. When the checker 3 reaches the detection position, the detection portions 39 are returned to the natural state to be engaged with and locked to the underside of the connector body 1. As a result, the checker 3 is rendered unable to be removed upward from the connector body 1.

On the other hand, the rear legs 38 have narrower front-back widths than the front legs 37 and accordingly, the rear legs 38 have lower flexural rigidity than the front legs 37. Thus, the fulcrums of flexure in the case where the flange 10 of the pipe P reaches the rear legs 38 thereby to spread the rear legs 38 are located lower than the fulcrums of flexure in the case where the flange 10 of the pipe P reaches the front legs 37 thereby to spread the front legs 37, respectively. More specifically, the flexure fulcrums are located substantially at the height positions of roots of the slits 40 when the rear legs 38 are spread. Accordingly, since the rear legs 38 are spread independently, the front legs 37 are not almost influenced by the flexure of the rear legs 38 (see FIGS. 21 and 22). However, when the front legs 37 are spread by the flange 10 of the pipe P, the flexure fulcrums are located higher than the upper ends of the slits 40 and portions connecting the front and rear legs 37 and 38, the rear legs 38 are influenced by the spreading of the front legs 37. Accordingly, the rear legs 38 are spread in tandem with the spreading of the front legs 37 (see FIGS. 27 and 28).

Figure 21:
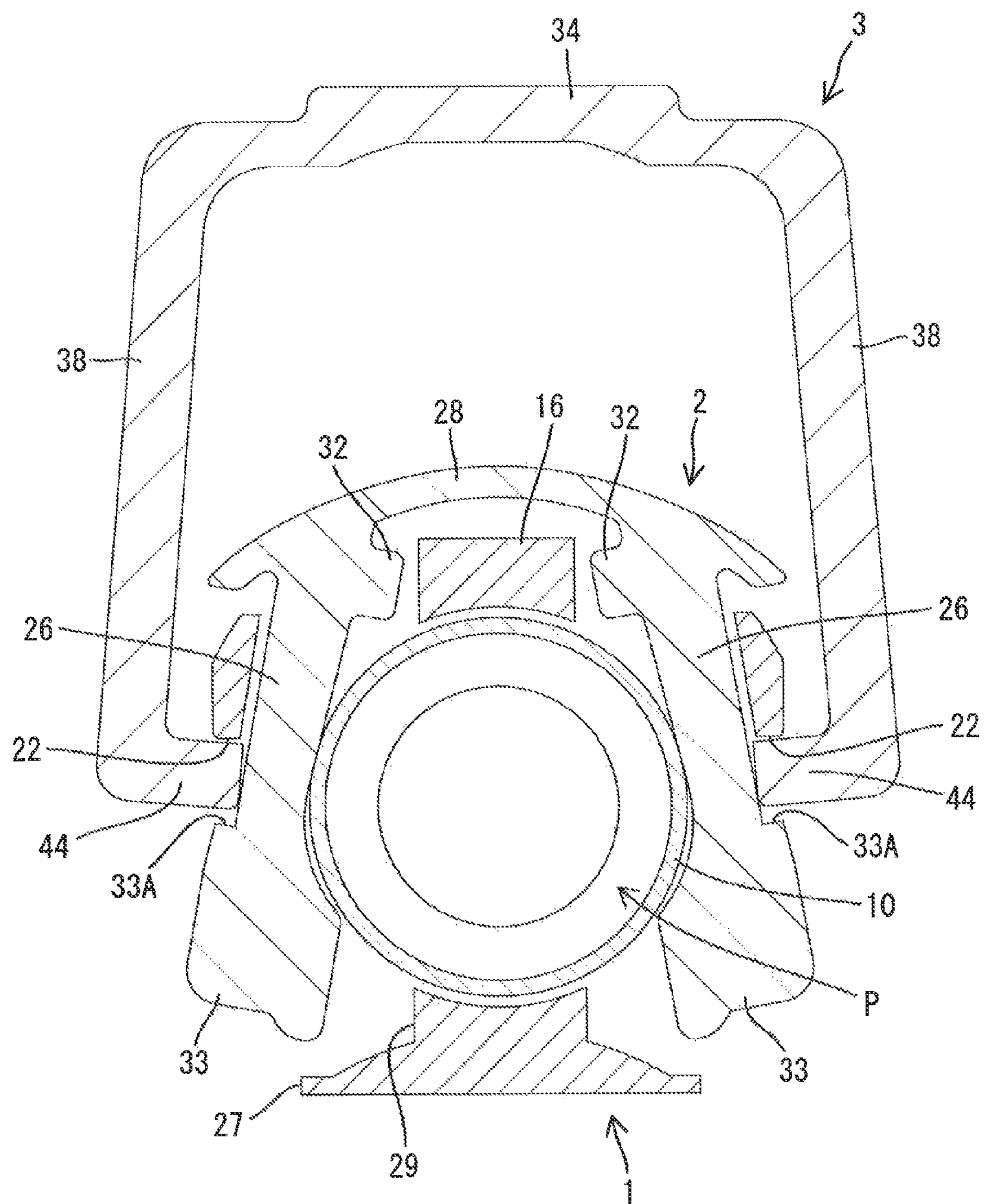
FIG. 21 is a sectional view taken along line E-E in FIG. 1.
Figure 22:
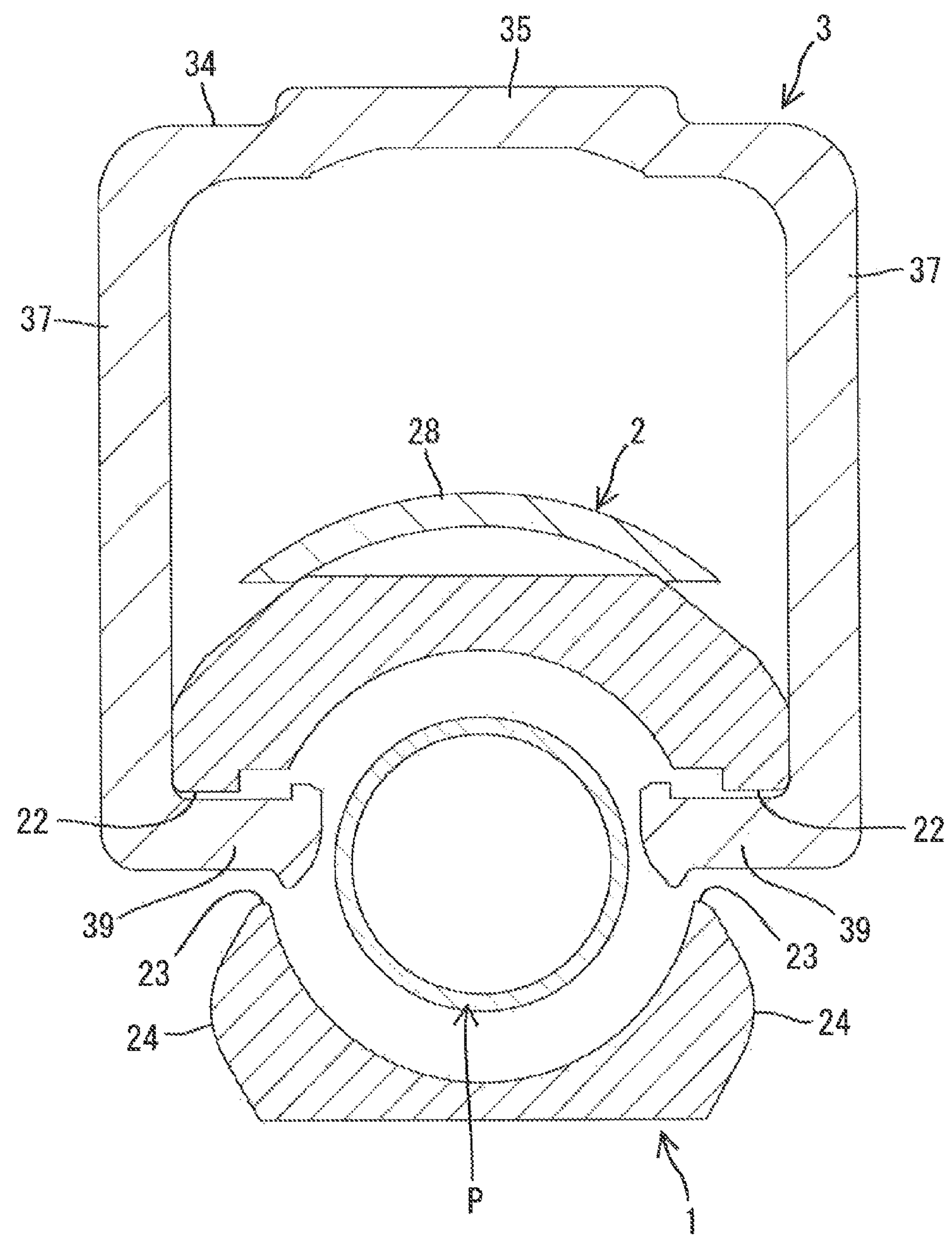
FIG. 22 is a sectional view taken along line F-F in FIG. 1.

The rear legs 38 have such a positional relationship that the rear legs 38 overlap partial rears of the locking legs 26 of the retainer 2 in a side view. More specifically, the rear legs 38 have front-back widths extending from the rear side of the second open regions 20 to a substantially full width of the third open regions 21, respectively. The rear legs 38 have distal ends which are bent inward substantially at right angles thereby to be formed into abutment portions 44, respectively. The abutment portions 44 extend so as to abut against the side surfaces of the locking legs 26 when the checker 3 assumes the preliminary holding position. When the locking legs 26 are spread, the rear legs 38 are also spread in tandem with the locking legs 26, respectively, as shown in FIG. 21. As a result, pass resistance of the pipe P is increased since an operating force necessary to spread the rear legs 38 is added to an operating force necessary to spread the locking legs 26 when the flange 10 of the pipe P passes. However, when the pipe P is released from the pass resistance of the flange 10 immediately after the flange 10 has passed the locking legs 26 and the rear legs 38, the operator gets a feeling of click suggestive of completion of the pipe insertion from a sudden drop of the pass resistance.

Figure 30:
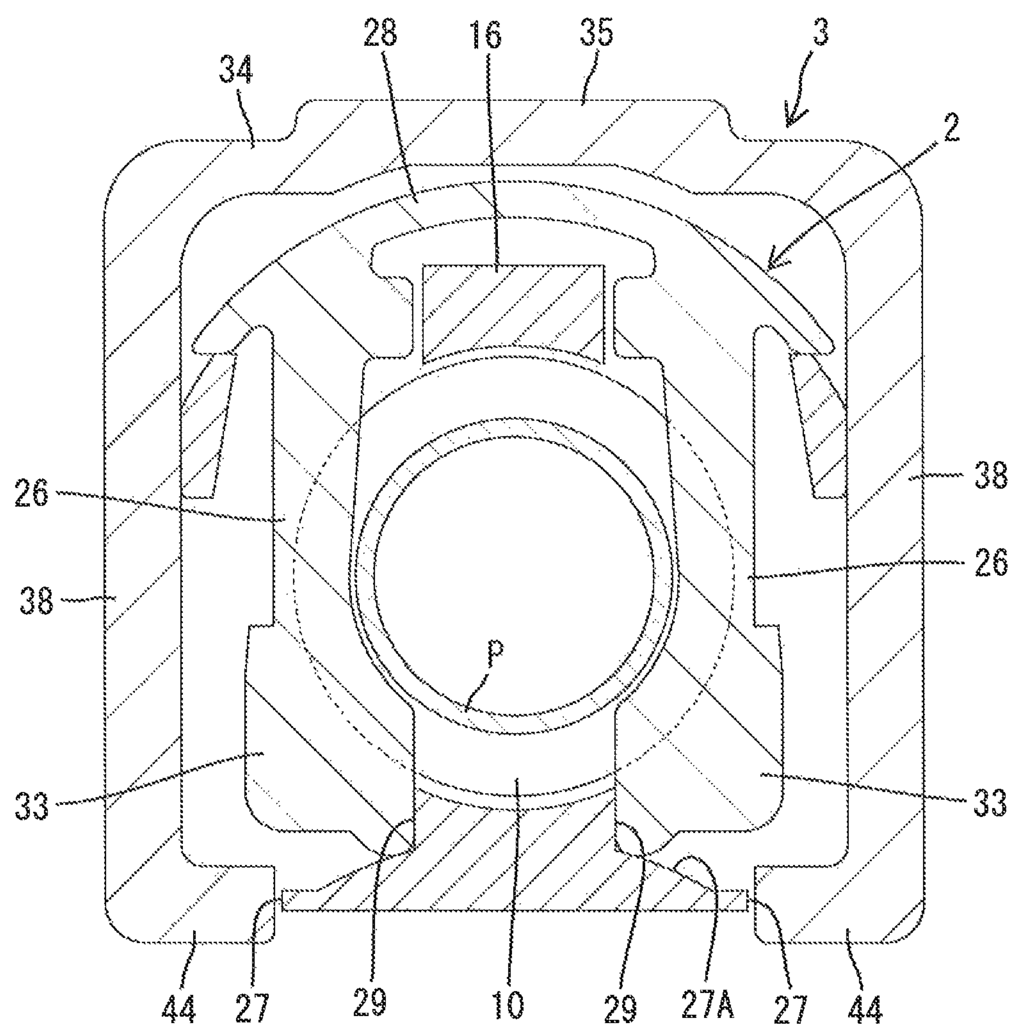
FIG. 30 is a sectional view taken along line E-E in FIG. 1.
Figure 31:
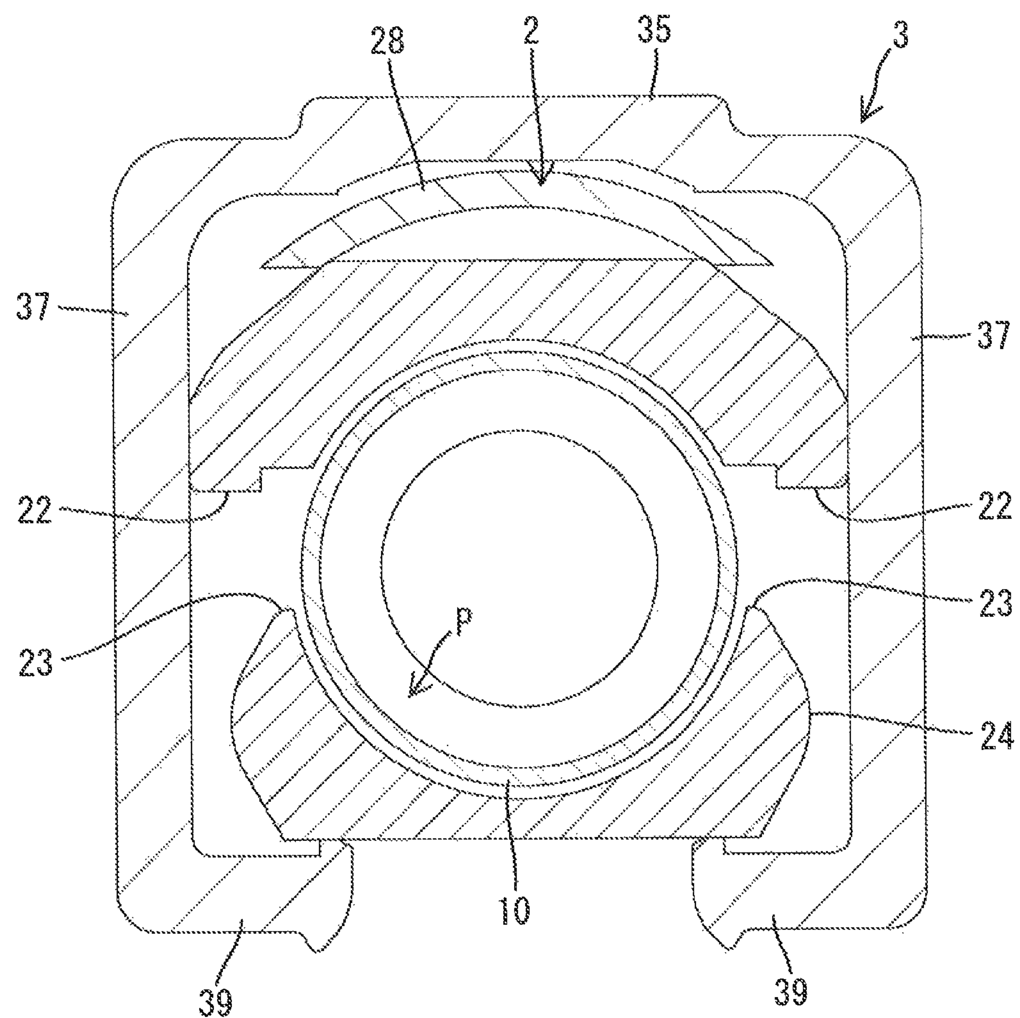
FIG. 31 is a sectional view taken along line F-F in FIG. 1.
Figure 32:
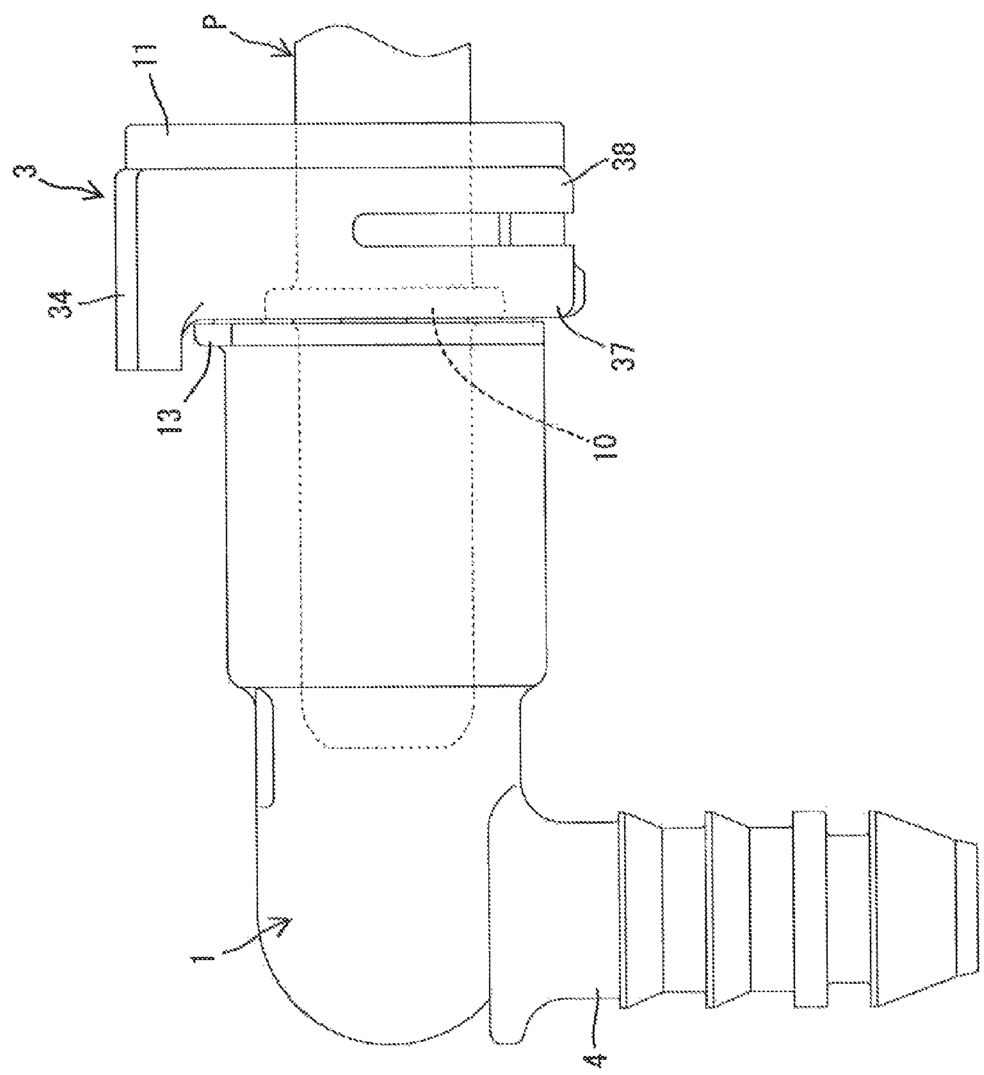
FIG. 32 is a side view of the pipe connector.

The rear legs 38 are also spread with the spreading of the front legs 37 (the state as shown in FIG. 28) during the movement of the checker 3 from the preliminary holding position to the detection position after the normal insertion of the pipe P, whereby the abutment portions 44 and the locking steps 33A of the retainer 2 are disengaged from each other respectively. When the checker 3 has reached the detection position, distal ends of the abutment portions 44 are adapted to be struck by the checker lock receiving surfaces 27 of the connector body 1 as shown in FIG. 30.

When the checker 3 assumes the preliminary holding position, as shown in FIG. 18, the abutment portions 44 are locked to the respective retaining edges 22 of the connector body 1 to fulfill the function of preventing the checker 3 from dropping, and the abutment portions 44 are located so as to be capable of engaging the respective locking steps 33A of the protrusions 33 of the locking legs 26, so that the abutment portions 44 also fulfill the function of preventing the checker 3 from inadvertent drop from the preliminary holding position to the detection position.

Figure 14:
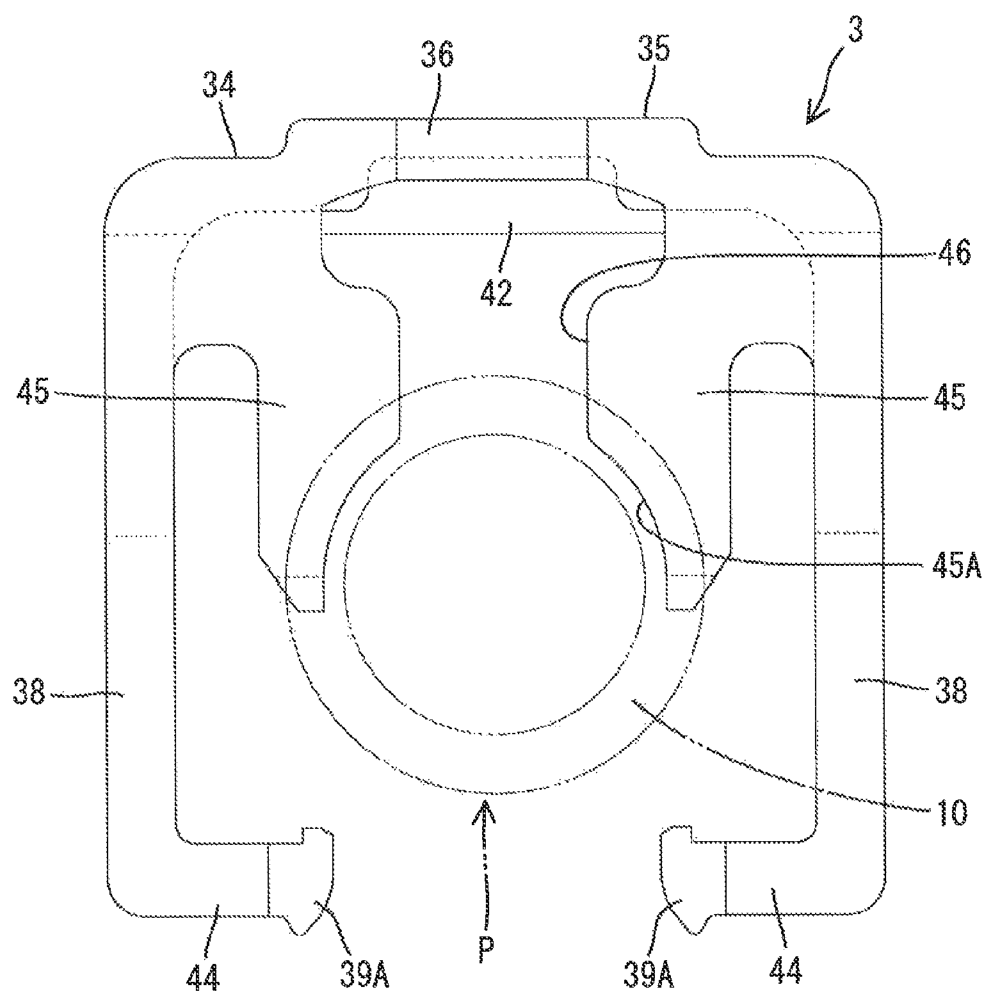
FIG. 14 is a rear view of a checker.
Figure 15:
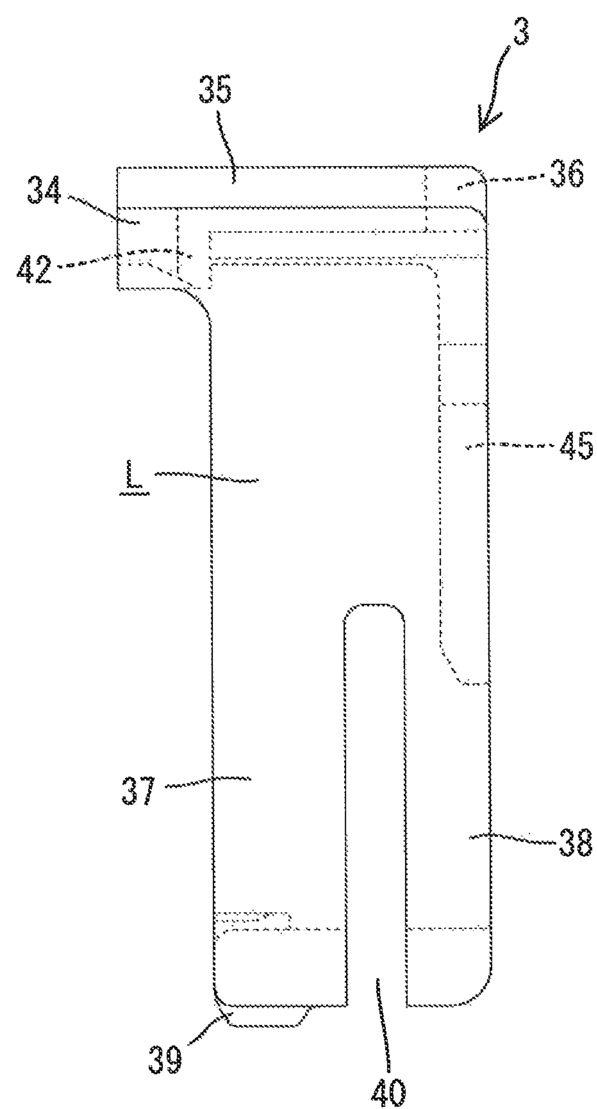
FIG. 15 is a side view of the checker.
Figure 16:
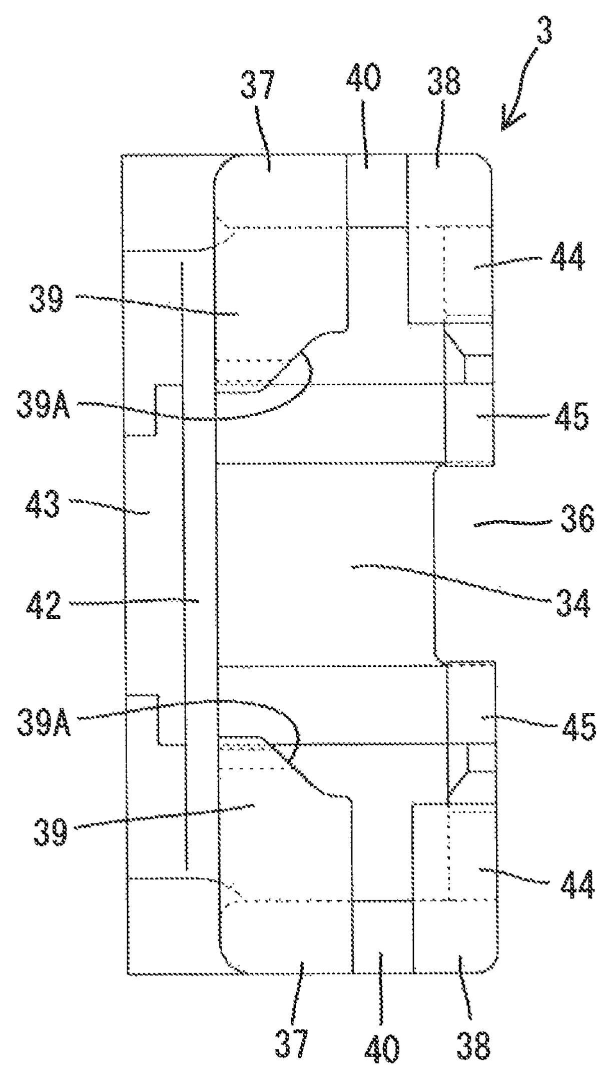
FIG. 16 is a bottom view of the checker.

The cover 34 has a rear edge from which a pair of right and left pressing pieces 45 protrude downward, as shown in FIG. 14. The pressing pieces 45 have root portions connected from the rear edge of the cover 34 to upper rear edges of the rear legs 38 respectively. The pressing pieces 45 include respective edges which are opposed to each other and are formed with respective straight portions extending straightforward in the up-down direction. A holding groove 46 is defined between the straight portions. When the checker 3 assumes the preliminary holding position, a lower end of the holding groove 46 is located slightly above the postural maintenance piece 12 of the connector body 1.

During movement of the checker 3 from the preliminary holding position to the detection position, the fitting of the postural maintenance piece 12 into the holding groove 46 serves to retain the checker 3 in an upright position.

Figure 35:
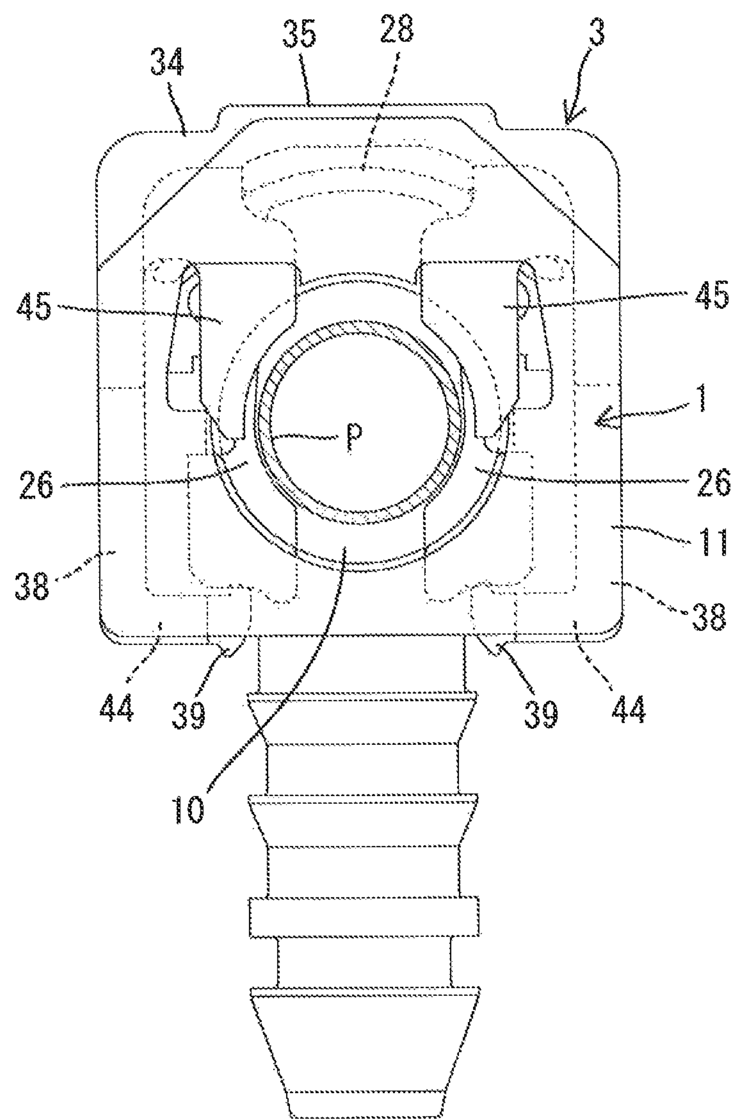
FIG. 35 is a rear view of the pipe connector.
Figure 36:
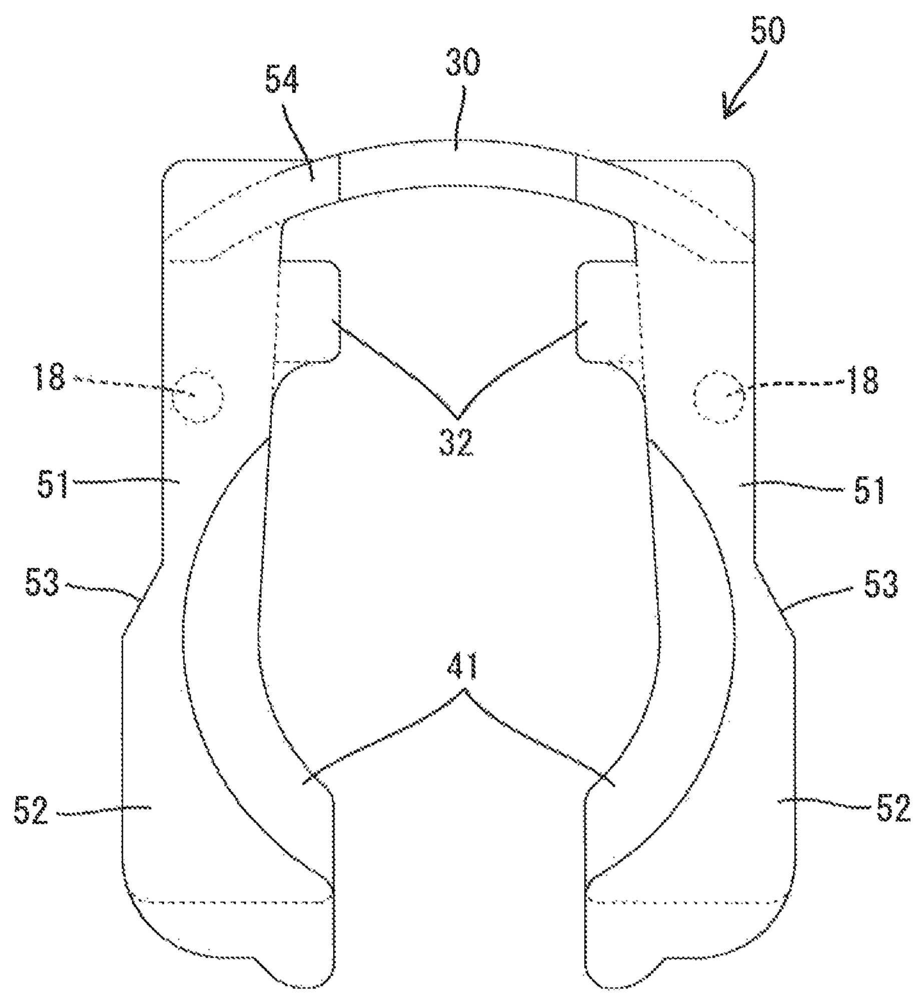
FIG. 36 is a rear view of a retainer according to embodiment 2.

Both pressing pieces 45 have lower ends formed with arc surfaces 45A corresponding to the outer circumferential configuration of the pipe P, respectively, so that a slight clearance is defined between the arc surfaces 45A and the outer circumferential surface of the pipe P when the checker 3 assumes the detection position, as shown in FIGS. 14 and 35. When the checker 3 assumes the preliminary holding position, distal ends of the pressing pieces 45 stand by above the insertion hole 6 and are thus retained at such height positions that the distal ends do not block insertion of the pipe P. When the checker 3 assumes the detection position, the pressing pieces 45 are inserted into the insertion hole 6 and are located at the rear sides of the locking legs 26 of the retainer 2 substantially with no gap and above the protrusions 33, as shown in FIGS. 29 and 35. The distal ends of the pressing pieces 45 are further located so as to overlap the locking legs 26 as shown in the rear view (see FIG. 35) in the above-described state. As a result, the pressing pieces 45 can prevent rearward flexure of the locking legs 26 when the locking legs 26 are subjected to force acting in the pulling direction of the pipe P thereby to be flexed rearward.

Figure 20:
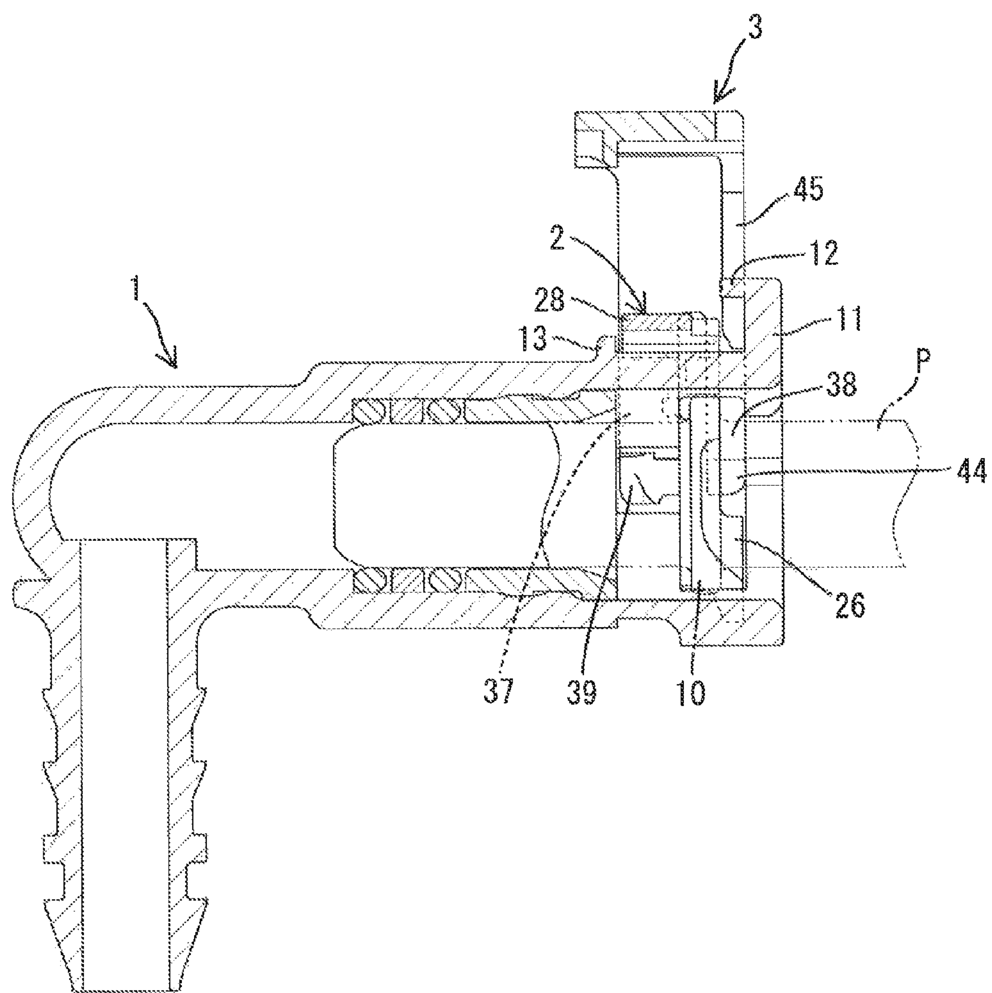
FIG. 20 is a sectional view of the pipe connector, showing the state in which a flange of the pipe passes the retainer.

The working and advantageous effects of the embodiment constructed as described above will be described concretely. The pipe P is axially inserted into the insertion hole 6 when the checker 3 assumes the preliminary holding position. When the flange 10 of the pipe P abuts against the guide arc surfaces 41 of the locking legs 26 respectively and the insertion of the pipe P further proceeds, the locking legs 26 are smoothly spread by a sliding contact between the flange 10 and the guide arc surfaces 41 (the state as shown in FIGS. 20 and 21). Since the locking legs 26 retreat outward so as to protrude from the insertion hole 6, the flange 10 of the pipe P can pass the locking legs 26 of the retainer 2.

When the locking legs 26 are spread, abutment of the locking legs 26 against the abutment portions 44 of the checker 3 also spreads the rear legs 38 in tandem with the locking legs 26 (the state as shown in FIG. 21). Accordingly, the operator needs to push the pipe P into the insertion hole 6 with an insertion force (insertion resistance) necessary for the spreading of the rear legs 38 in addition to the locking legs 26. However, when the flange 10 passes the locking legs 26 and the locking legs 26 are elastically returned, the insertion resistance suddenly drops. This serves as a feeling of click that helps the operator feel that the flange 10 has passed the locking legs 26 and the pipe P has reached the normal position.

Figure 24:
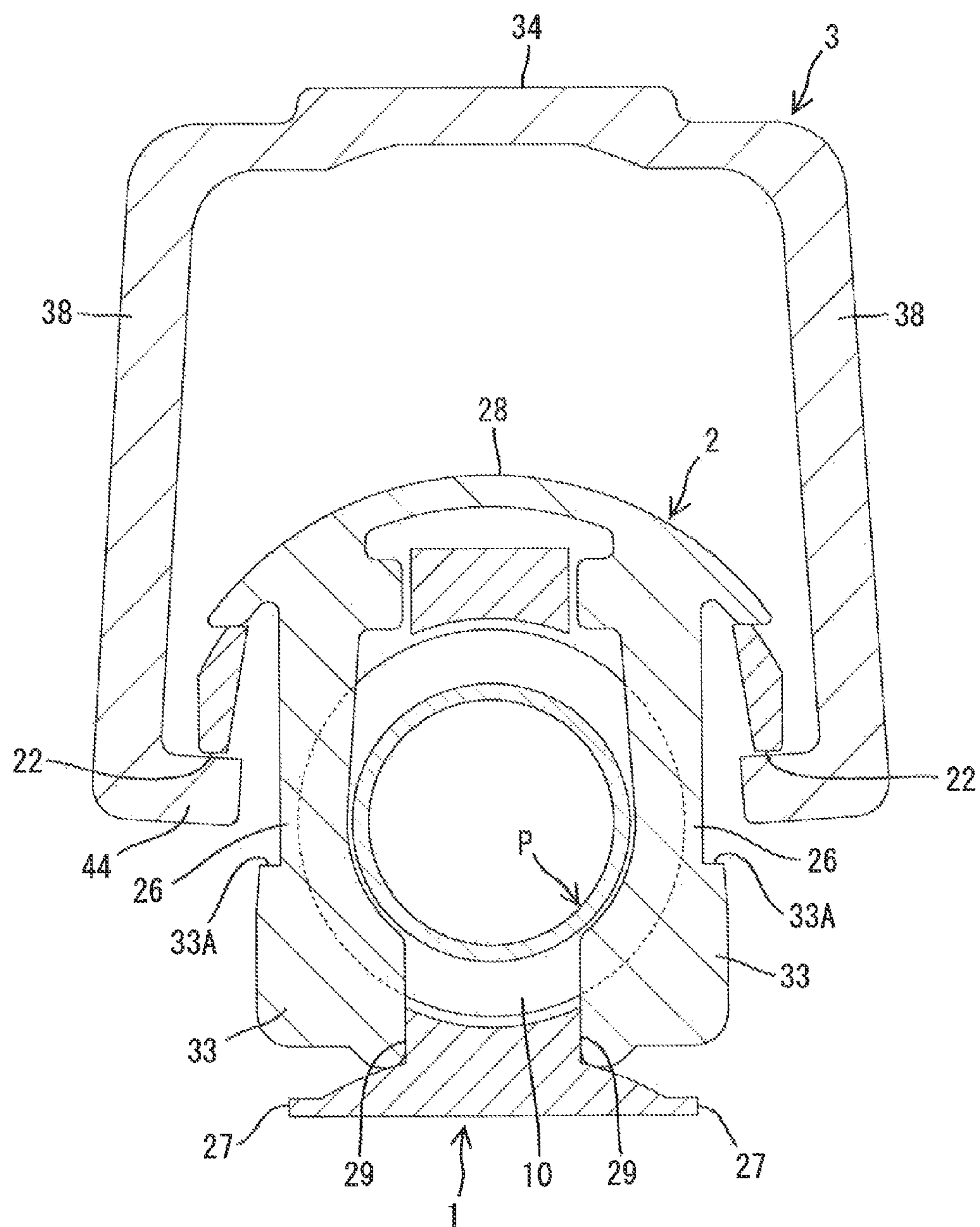
FIG. 24 is a sectional view taken along line E-E in FIG. 1.

When the pipe P reaches the normal position with respect to the connector body 1 (the state as shown in FIG. 23), the locking legs 26 of the retainer 2 are elastically returned thereby to preliminarily lock the pipe P (the state as shown in FIG. 24) In this state, the retaining protrusions 32 are located on the upper part of the retainer 2 with the partition piece 16 being interposed therebetween, and the lower ends of the locking legs 26 hold the retainer lock receiving surface 29 therebetween on a lower part of the retainer 2. As a result, the retainer 2 can be avoided from displacement in the right-left direction and the circumferential direction and is retained in the normal upright position.

Figure 25:
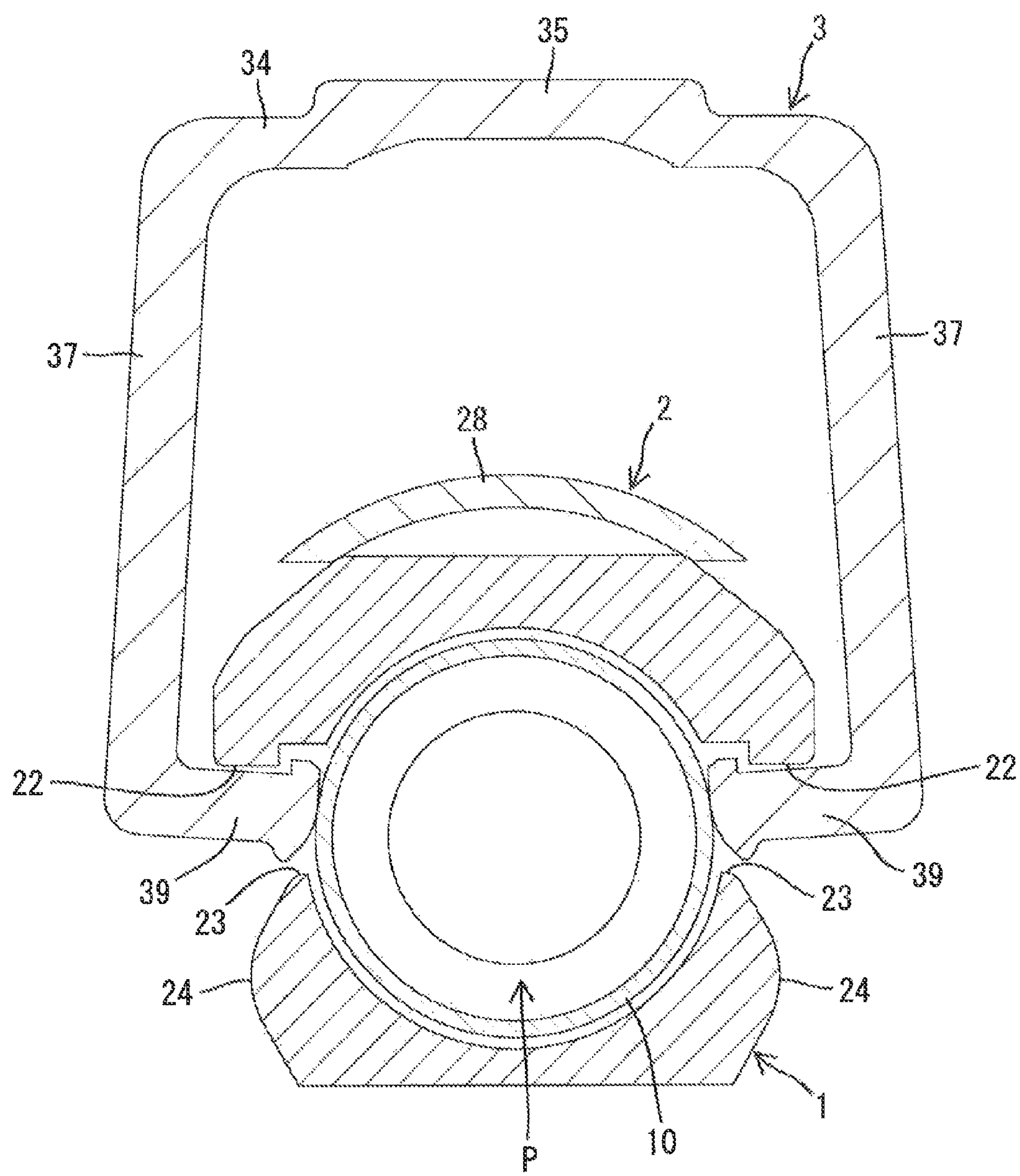
FIG. 25 is a sectional view taken along line F-F in FIG. 1.
Figure 26:
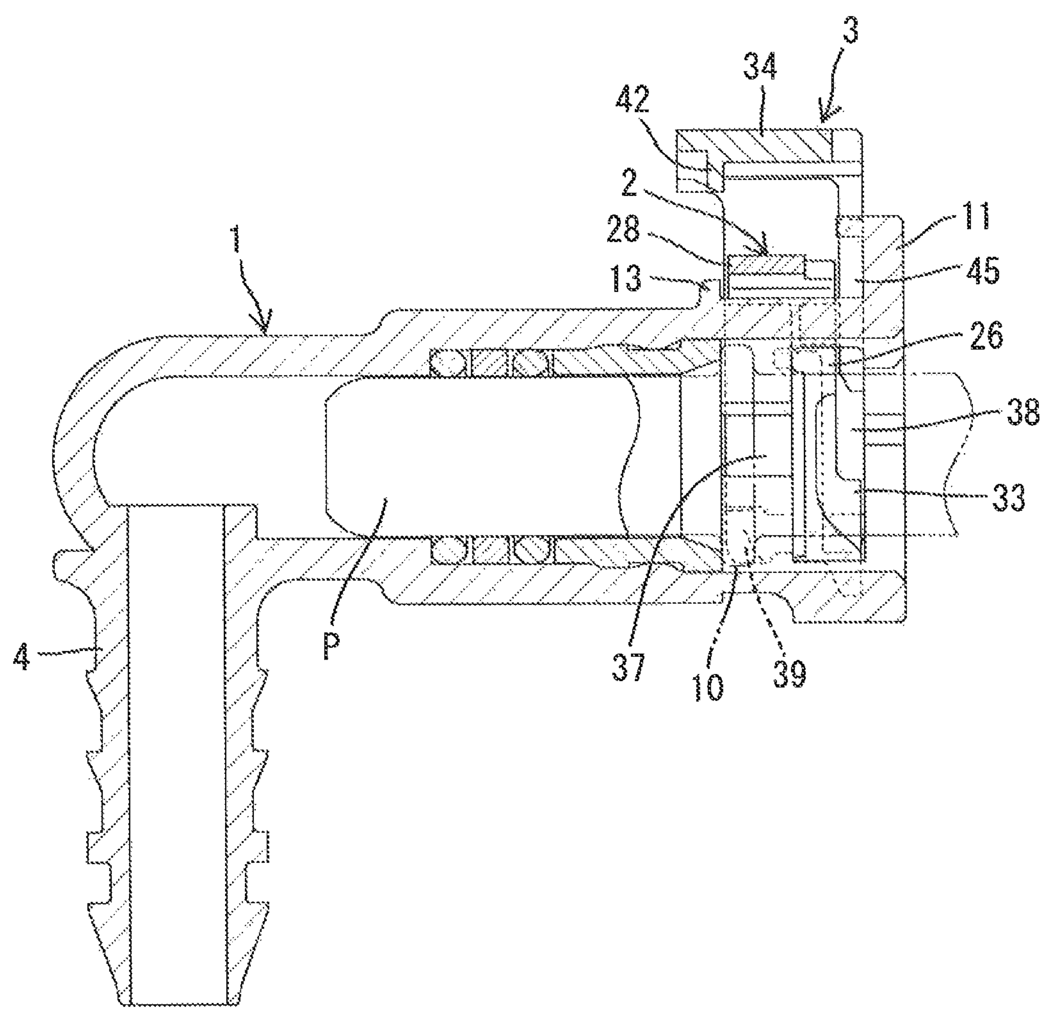
FIG. 26 is a sectional view of the pipe connector when the checker is being moved from the preliminary holding position to a detection position.
Figure 27:
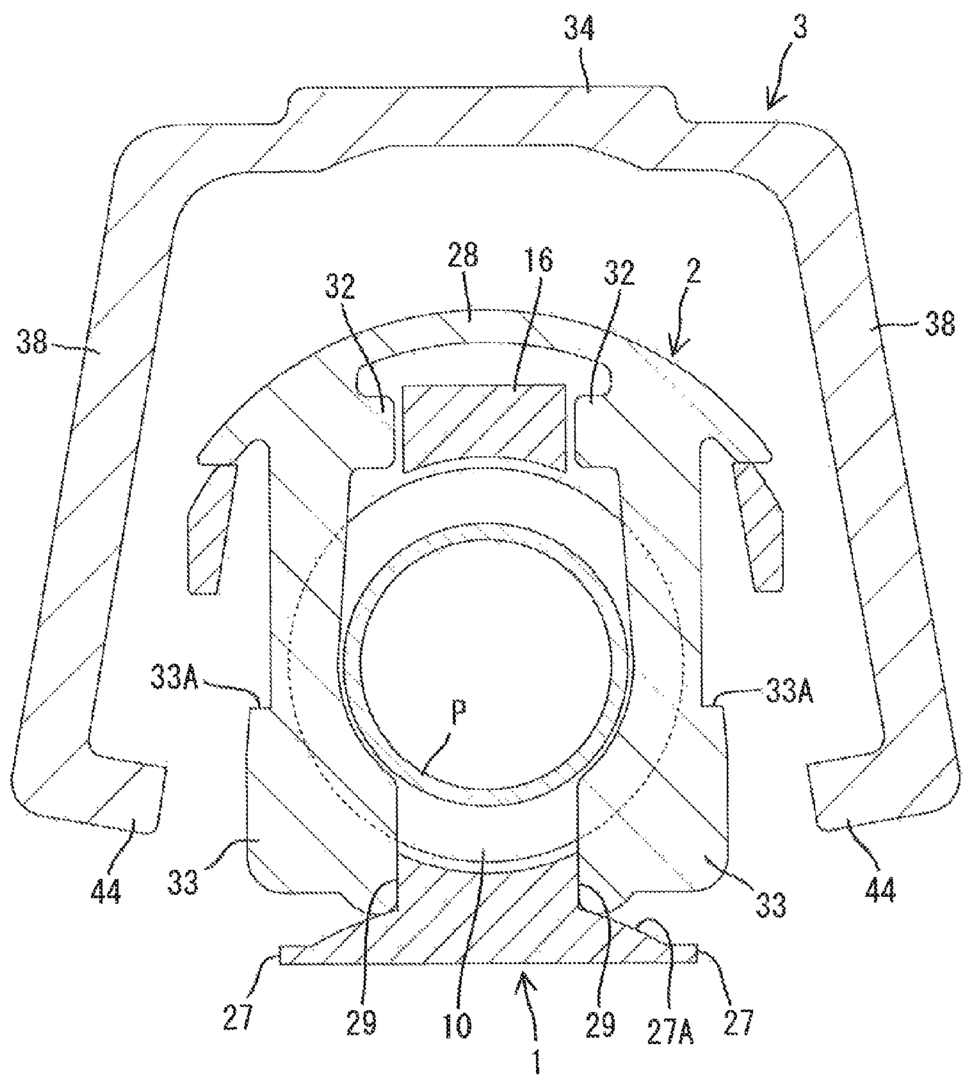
FIG. 27 is a sectional view taken along line E-E in FIG. 1.

Furthermore, when the pipe P assumes the normal position, the flange 10 abuts against the front legs 37 of the checker 3. In this case, the front legs 37 are spread by the guiding action of the spreading guide surfaces 39A of the detection portions 39 with the result that the lower protrusions of the detection portions 39 are moved outside the drop preventing edges 23 thereby to be disengaged from the drop preventing edges 23 (the state as shown in FIG. 25). Furthermore, since the rear legs 38 are influenced by the spreading of the front legs 37 thereby to be also spread as described above, the abutment portions 44 of the rear legs 38 are disengaged from the locking steps 33A of the retainer 2 respectively (the state as shown in FIG. 24).

Thus, the front and rear legs 37 and 38 of the checker 3 are released from the push-in prevented state. In this state, the upper surface of the cover 34 is pressed so that the whole checker 3 is pushed down toward the connector body 1. In this while, the detection portions 39 of the front legs 37 slide along the curved surfaces of the resistance imparting surfaces 24 respectively. Accordingly, in a first half period starting from initiation of movement of the checker 3 toward the detection position, a spread angle of the front legs 37 is increased as the detection portions 39 approach outermost located central parts of the resistance imparting surfaces 24 respectively, and a spread angle of the rear legs 38 are also increased with the increase in the spread angle of the front legs 37 (the state shown in FIGS. 27 and 28). Accordingly, a press force applied to the checker 3 is gradually increased in a first half period of pressing, reaching a peak when the detection portions 39 arrive at tops of curved surfaces, respectively. The resistance to the operation of the checker 3 is reduced after the detection portions 39 have passed the tops of curved surfaces respectively. Accordingly, the checker 3 is then pressed by inertia, so that the detection portions 39 are engaged with the underside of the connector body 1 at a stroke (the state shown in FIG. 31). As a result, the detection portions 39 can reliably be prevented from being stopped midway in the resistance imparting surfaces 24 respectively. Furthermore, the operator recognizes the change in the resistance to the operation before and after the detection portions 39 pass the respective tops of curved surfaces of the resistance imparting surfaces 24, as a feeling of click indicating that the checker 3 has reached the detection position. Thus, the operator obtains a first feel of click provided by the retainer 2 when the pipe P has been inserted into the normal position and a second feel of click provided by the checker 3 subsequent to the first feel of click when the checker 3 has reached the detection position. More specifically, since the feel of click is obtained respectively from the two-stage operation continuously carried out by the operator, a sense of ease that a series of work has been successful can be offered every time of work.

Even if the retainer 2 is located above with respect to the normal state, the cover 34 pushes the release operation portion 28 of the retainer 2 in the course of pressing the checker 3 downward from the preliminary holding position to the detection position, with the result that the retainer 2 can be corrected to a normally attached state.

On the other hand, when the pipe P is not inserted into the normal position, the aforementioned first feel of click cannot be obtained and in addition, the detection portions 39 of the front legs 37 of the checker 3 are not disengaged from the drop preventing edges 23 respectively. Accordingly, the checker 3 cannot be pushed downward from the preliminary holding position. This teaches the operator that the pipe P has been inserted incompletely or has not been inserted. Accordingly, insertion of the pipe P to the normal position can be facilitated. Furthermore, even if the checker 3 is left at the preliminary holding position, the checker 3 assuming the preliminary holding position protrudes radially outward from the connector body 1 to a large extent. Accordingly, undone operation can be found easily. Furthermore, even when the checker 3 is left in front of the detection position due to insufficiency in the push operation of the checker 3, the circumstances can also be found easily.

When the checker 3 assumes the detection position, the release operation portion 28 of the retainer 2 is covered with the cover 34. As a result, the operator can visually confirm that the checker 3 has correctly reached the detection position, that is, the pipe P is located at the normal position. Moreover, since the connector body 1, the retainer 2 and the checker 3 are colored different colors, determination by visual perception can be rendered more reliable. Furthermore, since the cover wall 42 can block the line of sight from the side of the second flange 13 lower than the first flange 11, there is no possibility that detection status would be misidentified. Furthermore, the release operation portion 28 is covered with the cover 34. This can achieve a remarkable effect that the retainer 2 can be prevented from inadvertent release operation. Still furthermore, since the checker 3 remains attached to the connector body 1 even after the checker 3 has fulfilled the function of detecting insertion of the pipe P, the checker 3 can be prevented from being disposed as a useless waste as ever.

Furthermore, even when the pipe P is subjected to force acting in the removing direction such that the flange 10 abuts against the front sides of the locking legs 26 when the checker 3 assumes the detection position, the front sides of the locking legs 26 have no such guide arc surfaces 41 as formed on the rear sides respectively with the result that the locking legs 26 can be prevented from being guided into displacement in the spreading direction. When the pipe P is subjected to the force acting in the removing direction, the locking legs 26 would be flexibly displaced rearward. In the embodiment, however, since both pressing pieces 45 are located at the rear surface sides of the locking legs 26 substantially with no gaps respectively, the locking legs 26 are prevented from rearward flexure. As a result, the locking legs 26 can retain normal upright position (normal locking). Thus, the pipe P can more reliably be prevented from removal. Additionally, the function of preventing the pipe P from removal can be added to the checker 3 without increase in the number of parts.

In the work of removing the pipe P, while the detection portions 39 are released from the locked state, a releasing jig (not shown) is inserted into the front end side opening 43 of the bulging portion 35 of the cover 34 to be hitched in the releasing direction, and the checker 3 assuming the detection position is returned to the preliminary holding position. Subsequently, when an upper surface of the release operation portion 28 is pressed, the lower ends of the locking legs 26 slide on the inclined surface 27A extending from the retainer lock receiving surface 29 to the checker lock receiving surface 27 in the connector body 1, whereby the locking legs 26 are guided into deformation in the spreading direction. As a result, the pipe P can be pulled out of the connector body 1 since the locking legs 26 are released from the removal prevented state with respect to the flange 10.

Furthermore, the pipe P may also be pulled in the following manner as mentioned above. More specifically, after the checker 3 has been pulled out of the connector body 1 or otherwise removed from the connector body 1, a releasing jig (not shown) is inserted into the front underside of the release operation portion 28 of the retainer 2 to be pried with the upper edge of the second flange 13 serving as a fulcrum. As a result, the positioning protrusions 18 of the retainer 2 are released from the engagement with the respective locking recesses 17, whereby the retainer 2 can be pulled out of the connector body 1. Thereafter, the pipe P may be pulled out of the connector body 1.

Embodiment 2

FIGS. 36 to 59 illustrate embodiment 2. In embodiment 1, the legs L of the checker 3 are provided with the abutment portions 44, which are caused to abut against the locking legs 26 of the retainer 2, respectively. Thus, elastic reactive forces of the legs L are added as well as those of the locking legs 26 during insertion of the pipe P, whereby the resistance to insertion is increased. In embodiment 2, however, rigidities of the locking legs 51 of the retainer 50 are increased so that the resistance to insertion is ensured only by the elastic reactive forces of the locking legs 51.

Components in embodiment 2 will first be described. Since the connector body 1 in embodiment 2 has the same construction as that in embodiment 1, the components of the connector body 1 are labeled by the same reference symbols as those in embodiment 1 and the description of these components will be eliminated.

(Retainer 50: Mainly See FIGS. 36 to 39)

Figure 11:
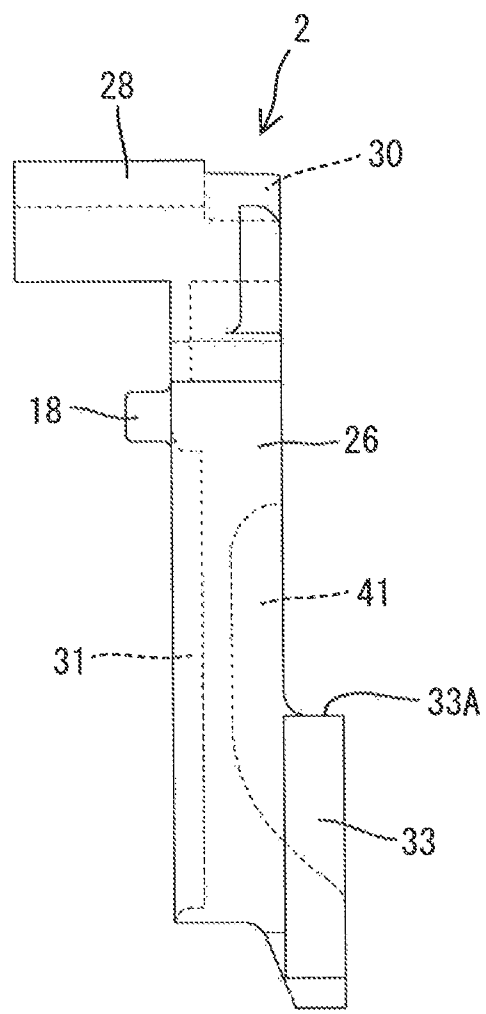
FIG. 11 is a side view of the retainer.
Figure 37:
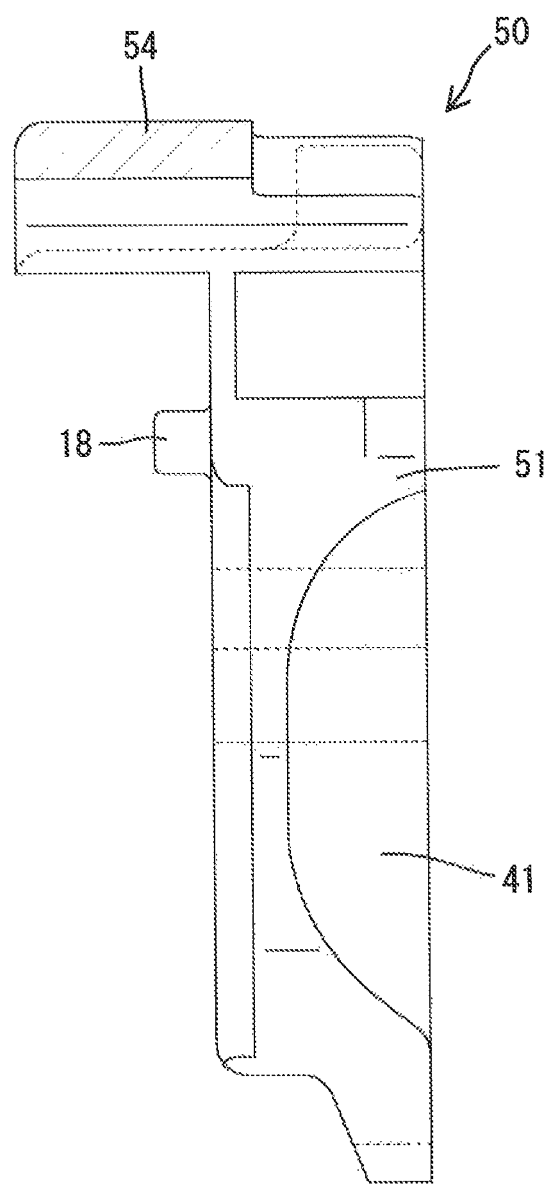
FIG. 37 is a sectional side view of the retainer.
Figure 38:
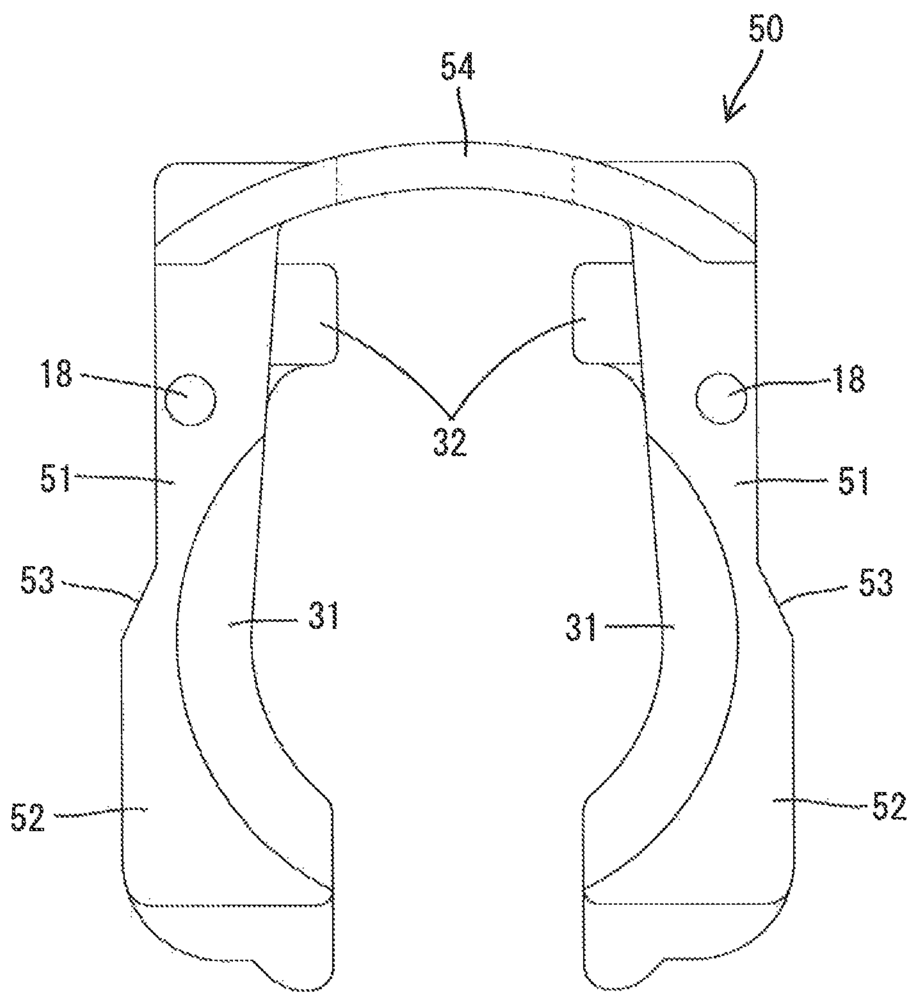
FIG. 38 is a front view of the retainer.
Figure 39:
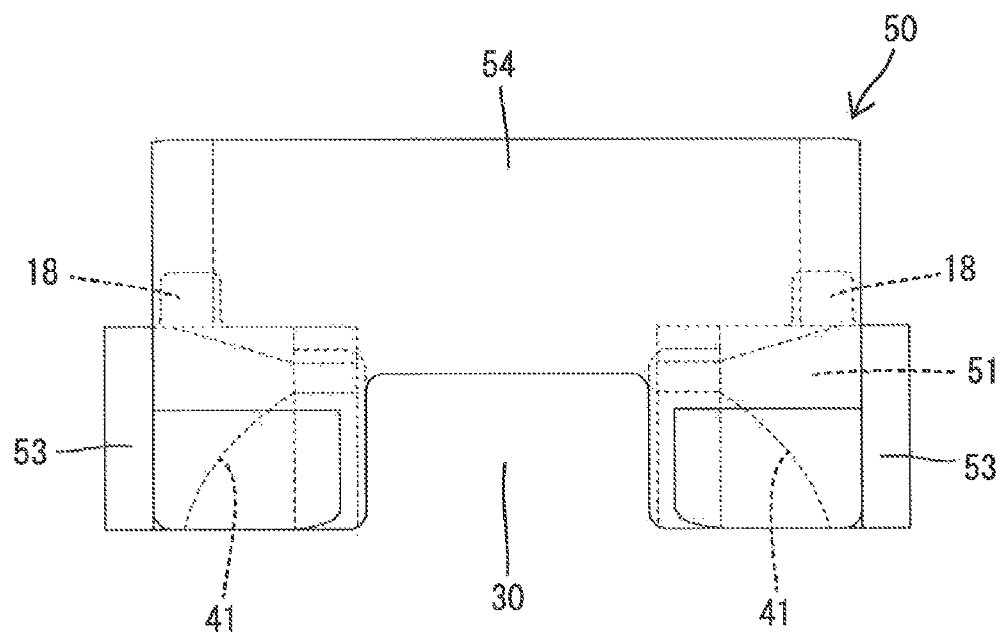
FIG. 39 is a plan view of the retainer.
Figure 40:
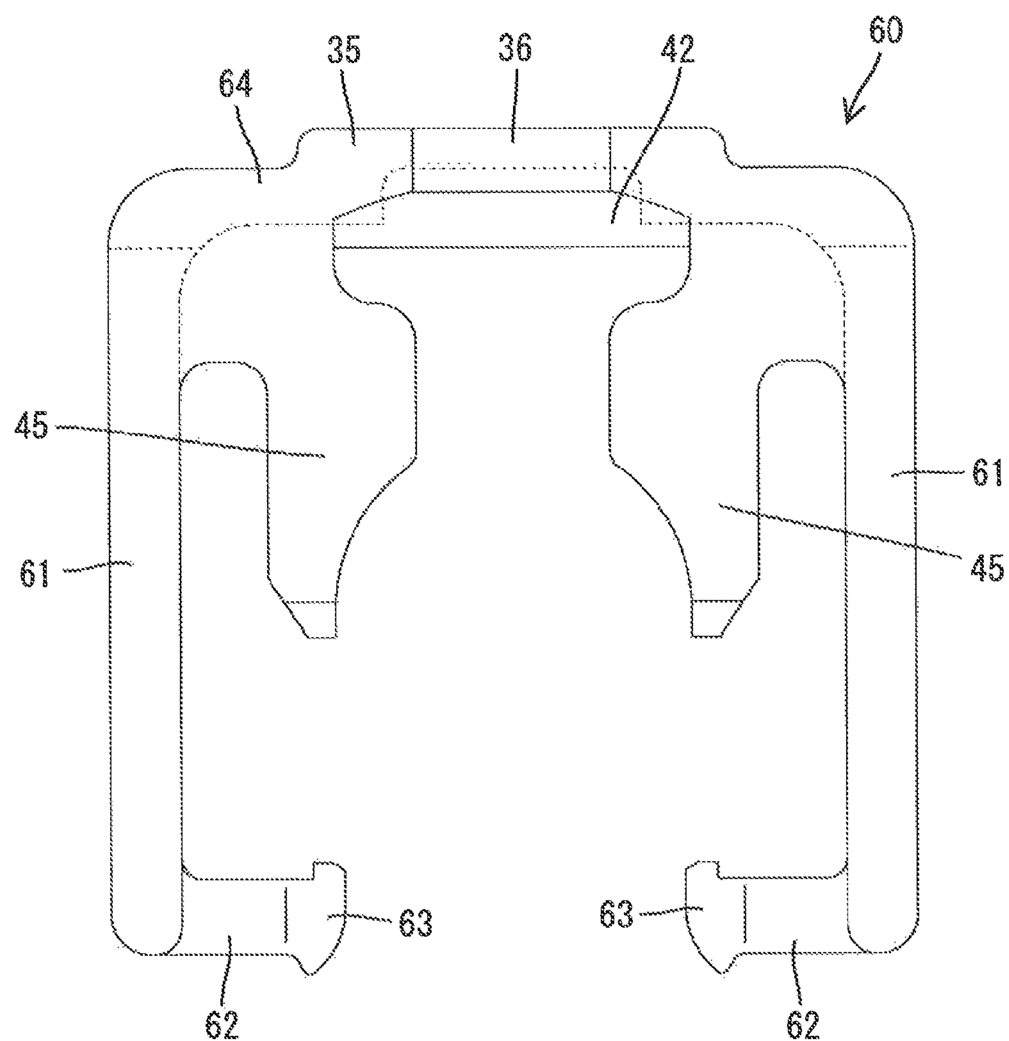
FIG. 40 is a rear view of a checker.
Figure 41:
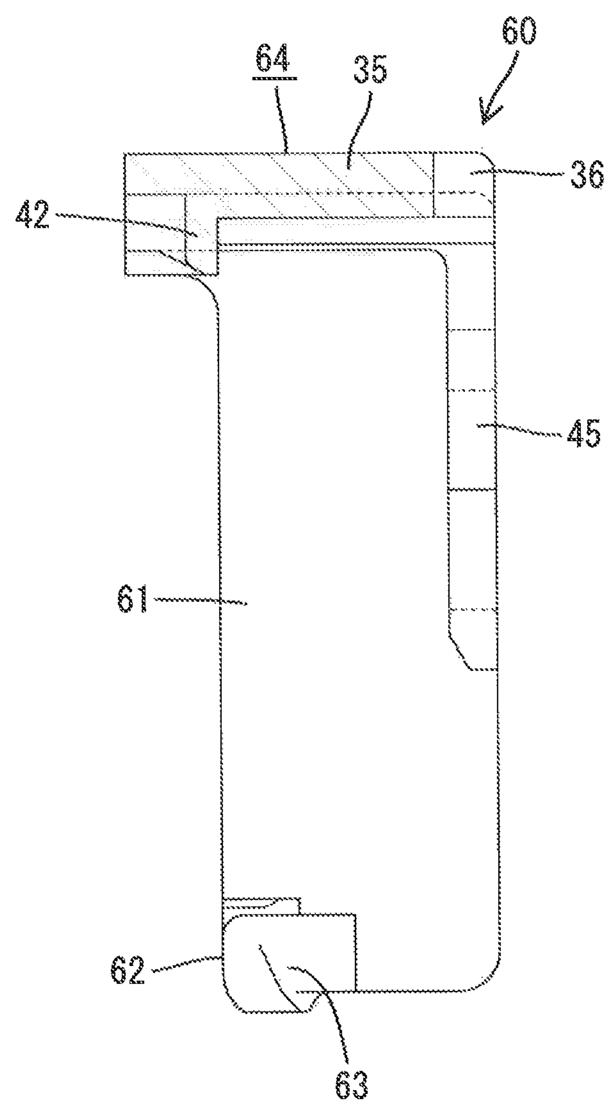
FIG. 41 is a sectional side view of the checker.
Figure 42:
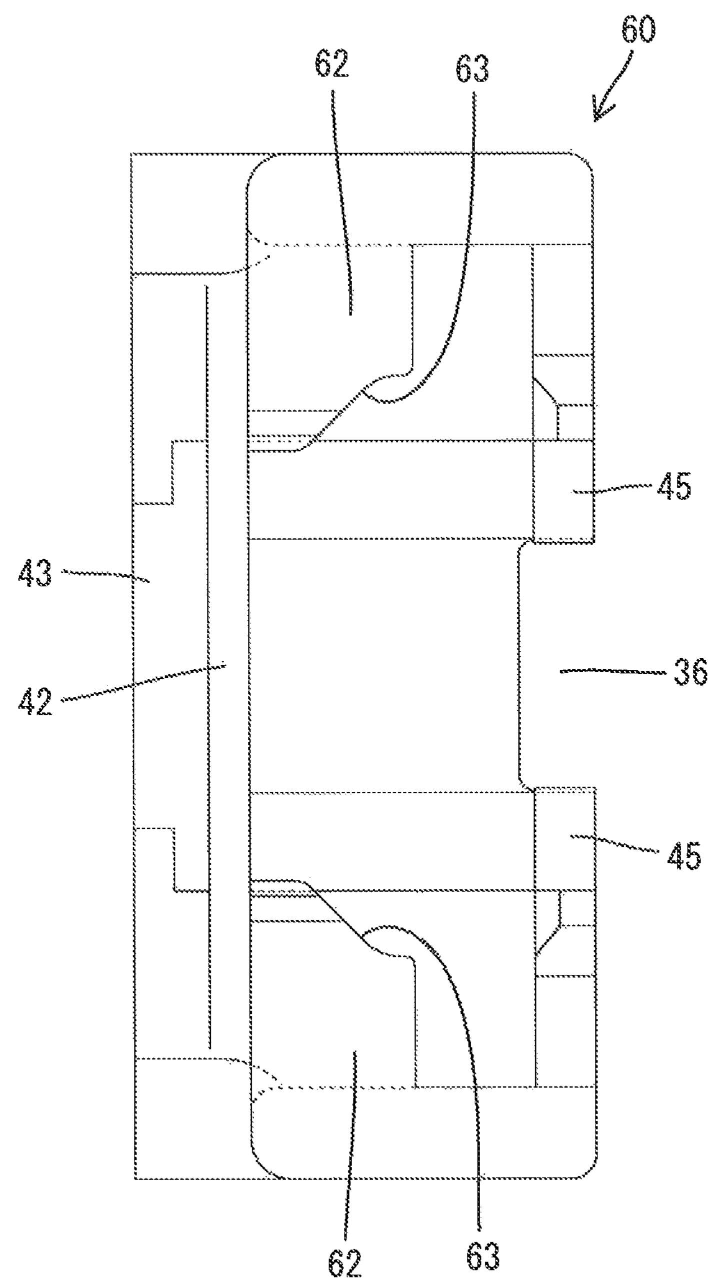
FIG. 42 is a bottom view of the checker.
Figure 43:
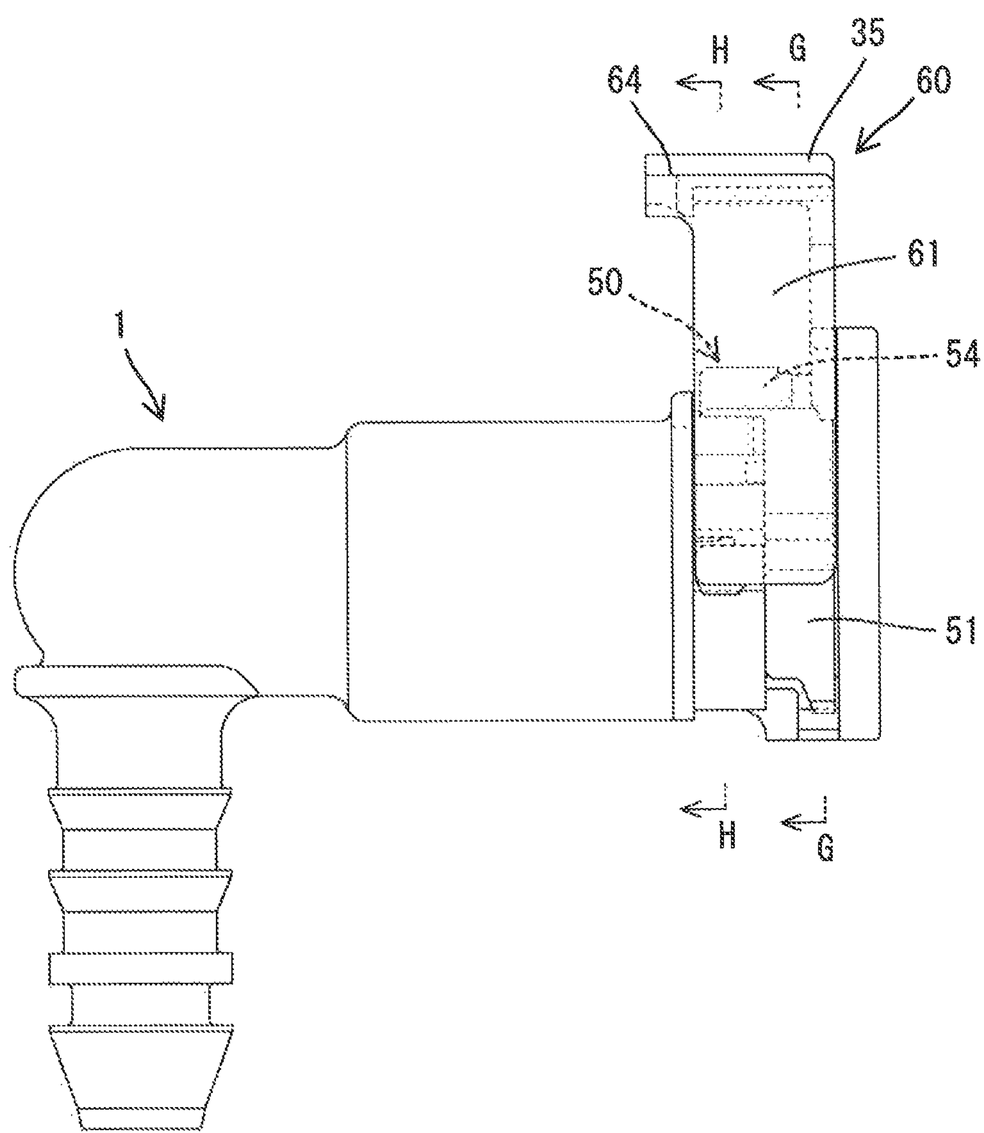
FIG. 43 is a side view of the pipe connector when the checker assumes the preliminary holding position.
Figure 44:
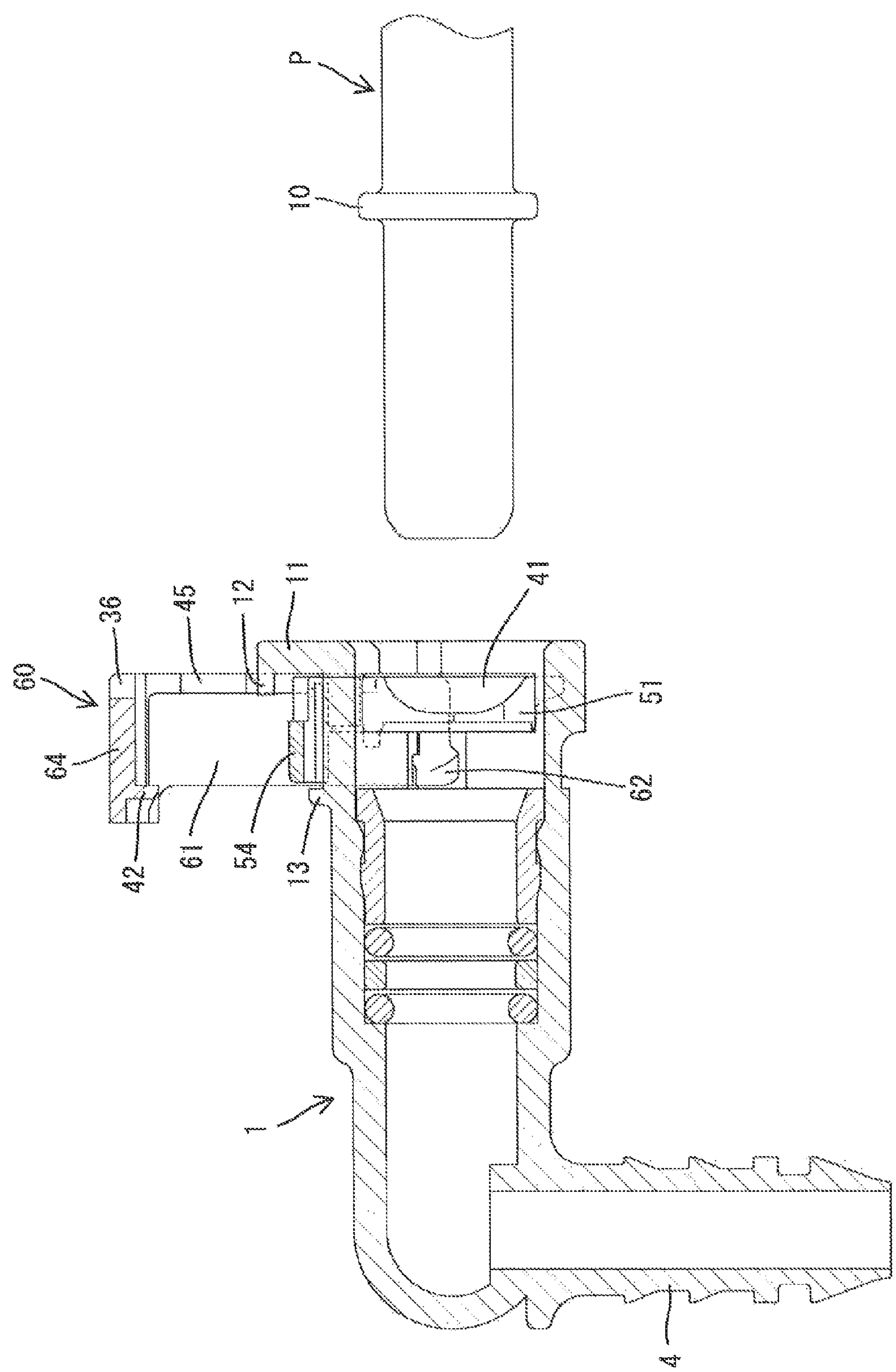
FIG. 44 is a sectional side view of the pipe connector.

The retainer 50 in embodiment 2 has a release operation portion 54 and thus has the same basic structure as in embodiment 1. The retainer 50 differs from the retainer 2 in the following respects. In embodiment 1, the rear lower ends of the locking legs 26 serve as the respective protrusions 33, which are formed so as to protrude rearward and outward in the right-left direction, as shown in FIGS. 11 and 12. However, the protrusions 52 in embodiment 2 do not protrude rearward and the locking legs 51 have respective front-back widths which are substantially uniform and larger than those of the locking legs 26 in embodiment 1, whereby the rigidities of the locking legs 51 are enhanced, as shown in FIG. 37. Furthermore, the protrusions 52 are formed so as to protrude outward in the right-left direction through inclined surfaces 53 with a descending slope but not through the locking steps 33A with horizontal upper surfaces as in embodiment 1.

The other construction of the retainer 50 in embodiment 2 is the same as in embodiment 1, and the identical or similar construction is labeled by the same reference symbols as those in embodiment 1 and the description of the construction will be eliminated.

(Checker 60: Mainly See FIGS. 40 to 42)

The checker in embodiment 2 differs from that in embodiment 1 in that the legs 61 in embodiment 2 are not bifurcated into the front and rear parts as the legs L in embodiment 1 and that the abutment portions 44 are not provided.

In embodiment 2, the legs 61 formed on both sides of the cover 64 have no slits 40 formed by cutting out the lower ends as in embodiment 1 (see FIGS. 41 and 43) but are each formed into a flat shape with substantially uniform front-back widths respectively. The detection portions 62 are formed on the front lower ends of the inner surfaces of the legs 61 respectively. No abutment portions 44 as in embodiment 1 are formed in the rear of the detection portions 62. Tapered spread guide surfaces 63 are formed on the rears of the distal ends of the detection portions 62 respectively. The guide surfaces 63 abut against the flange 10 of the pipe P thereby to be capable of guiding the spreading operations of the legs 61.

The other construction of the checker 60 is identical with that in embodiment 1 and the components of the identical construction are labeled by the same reference symbols as those in embodiment 1 and the description of these components will be eliminated.

Figure 45:
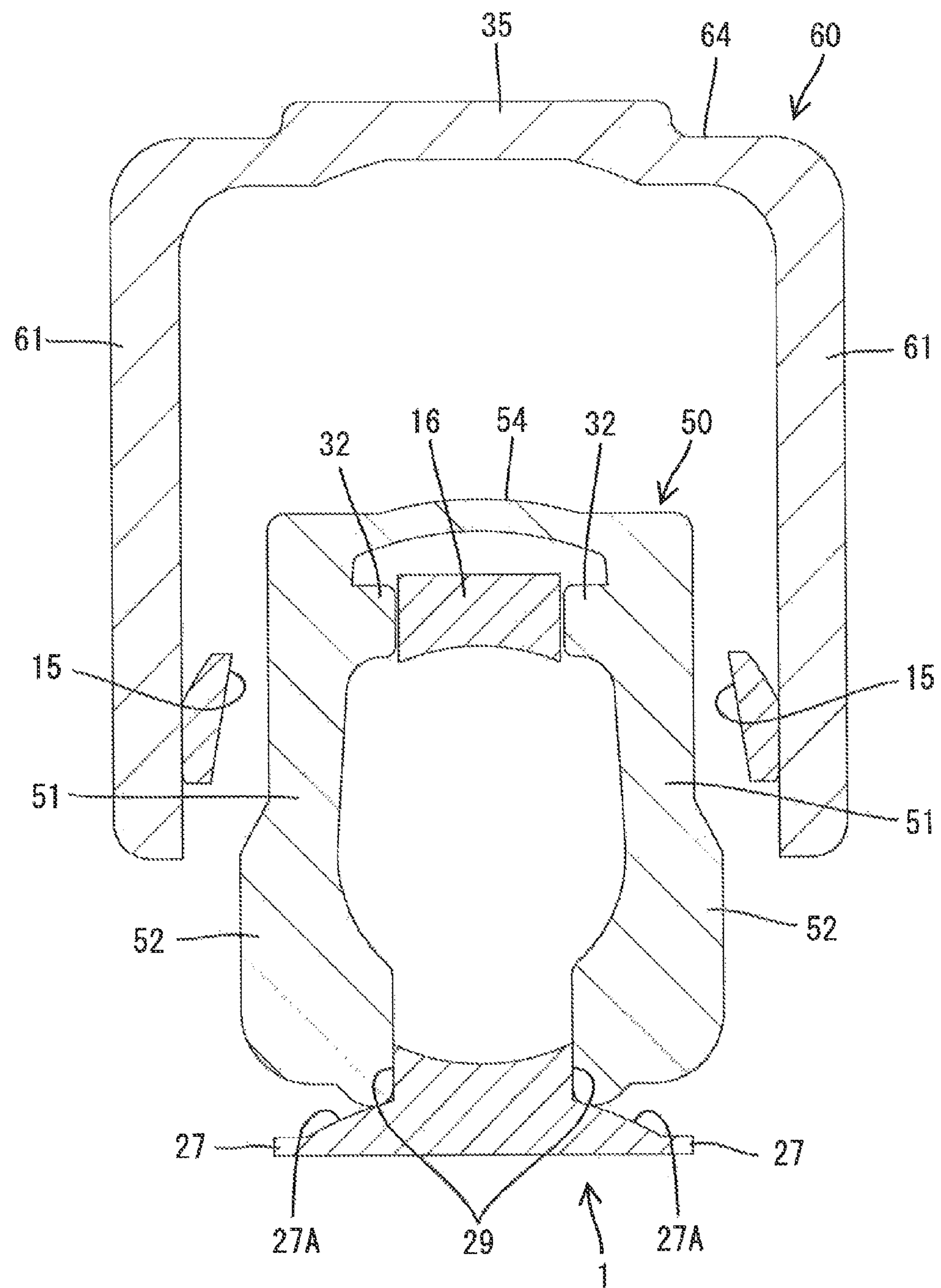
FIG. 45 is a sectional view taken along line G-G in FIG. 43.
Figure 46:
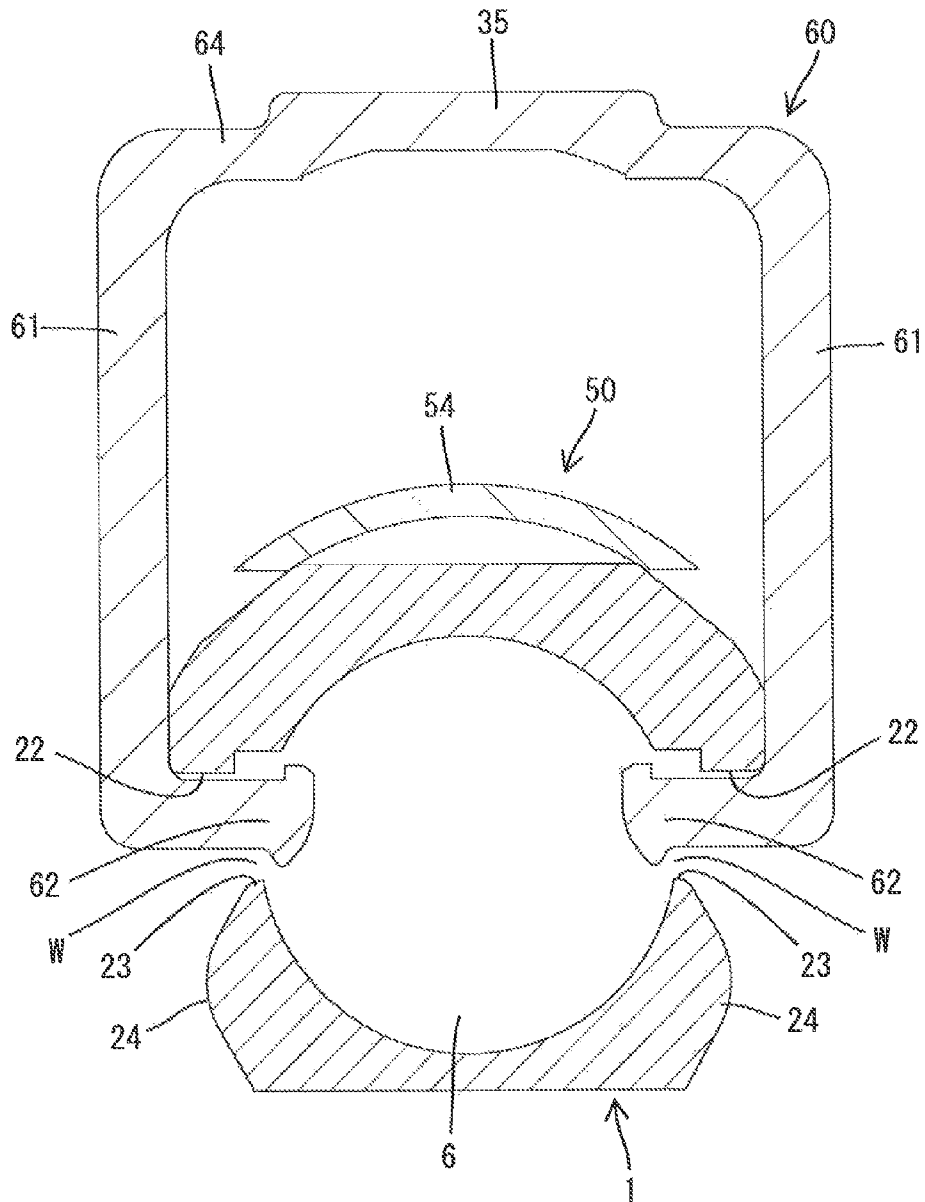
FIG. 46 is a sectional view taken along line H-H in FIG. 43.

The operation and advantageous effect of embodiment 2 will now be described. FIGS. 43 to 46 show the state of the pipe connector before insertion of the pipe P with the checker 60 assuming the preliminary holding position. The difference between embodiments 1 and 2 resides in that the rears of the legs 61 are located outside the connector body 1 and not inserted into the interior of the connector body 1 since the rears of the legs 61 have no abutment portions, as shown in FIG. 45. The detection portions 62 are formed on the fronts of the legs 61 as in embodiment 1 and inserted through the window holes W of the connector body 1 into the insertion holes 6.

Figure 47:
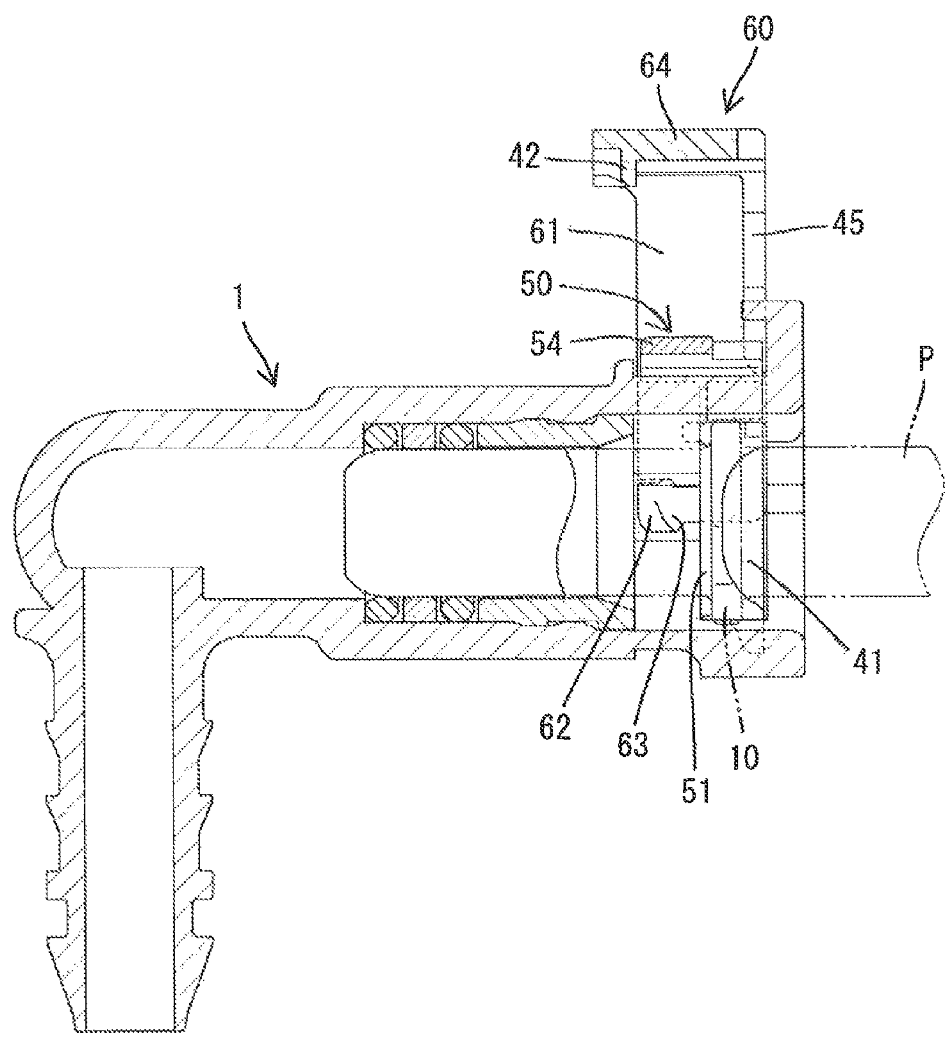
FIG. 47 is a sectional side view of the pipe connector, showing the state in which a flange of the pipe is in abutment with a locking leg of the retainer.
Figure 48:
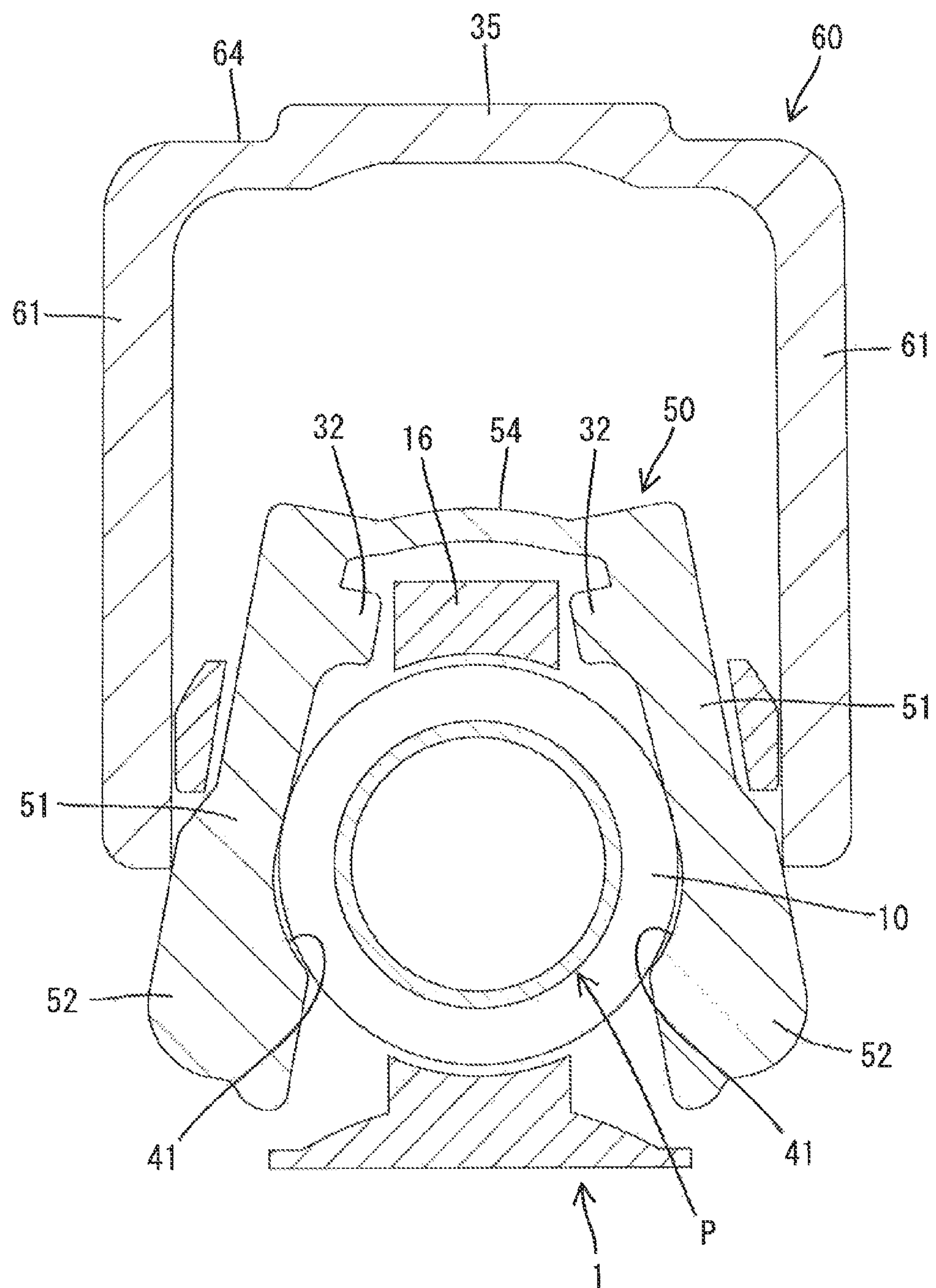
FIG. 48 is a sectional view taken along line G-G in FIG. 43.
Figure 49:
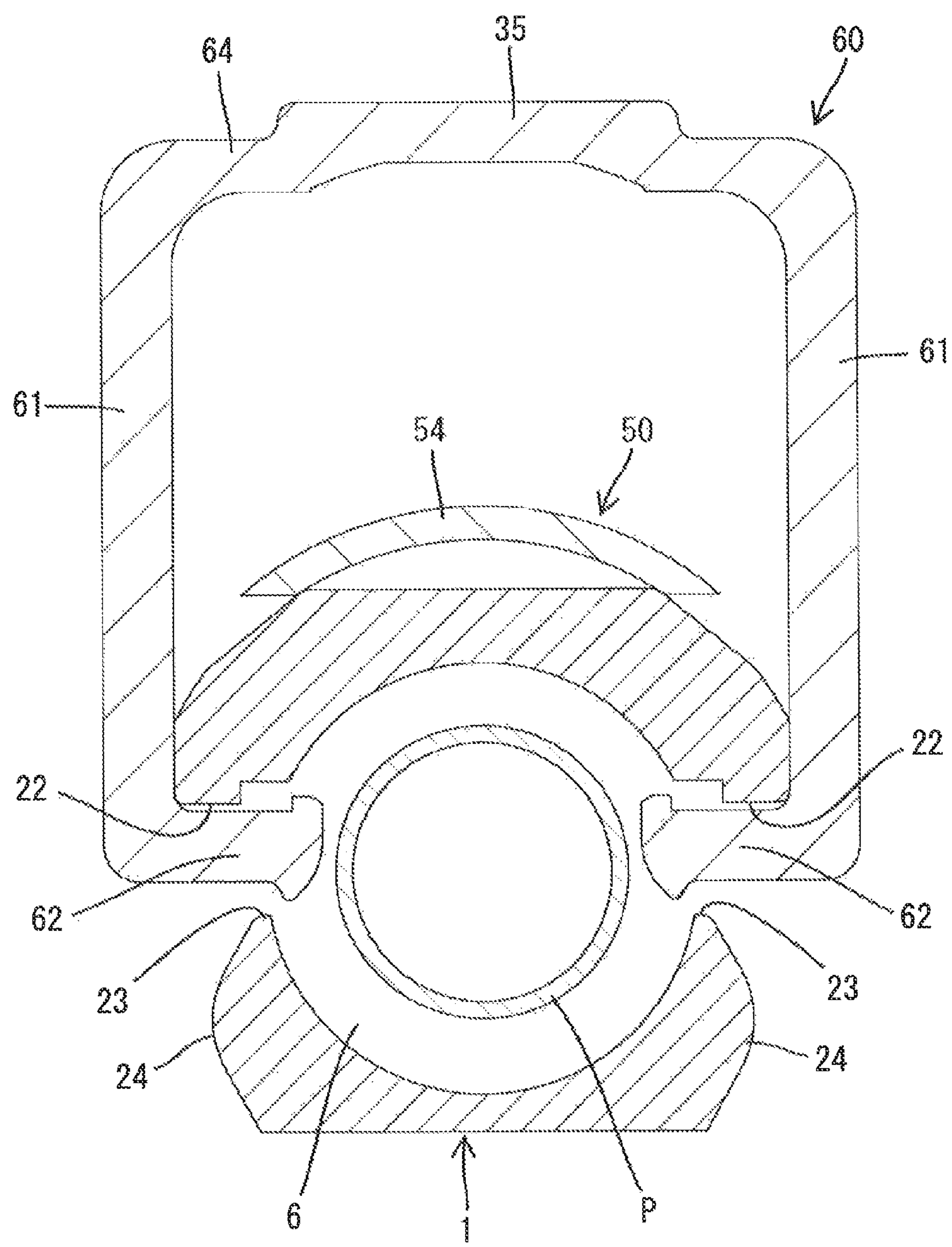
FIG. 49 is a sectional view taken along line H-H in FIG. 43.

FIGS. 47 to 49 show the state in which the pipe P is inserted into the connector body 1 and the flange 10 reaches the depth position where the flange 10 abuts against the guide arc surfaces 41 of the locking legs 51 of the retainer 50. In this case, both locking legs 51 are spread by sliding contact between the flange 10 and the guide arc surfaces 41, thereby protruding out of the connector body 1 to retreat. Thus, the flange 10 of the pipe P is passable between the locking legs 51. In this case, only the locking legs 51 of the retainer 50 are spread but the legs 61 of the checker 60 are not spread (compare FIG. 21 with FIG. 48). Embodiment 2 differs from embodiment 1 in this respect. Accordingly, resistance to the insertion of the pipe P results from only the elastic reactive force of the locking legs 51 reinforced as compared with embodiment 1. Since the insertion resistance rapidly drops when the flange 10 has passed the locking legs 51, the operator can push the pipe P into the normal position by inertia. The rapid drop in the insertion resistance serves as a feeling of click, by which the operator can recognize that the pipe insertion has been completed.

Figure 50:
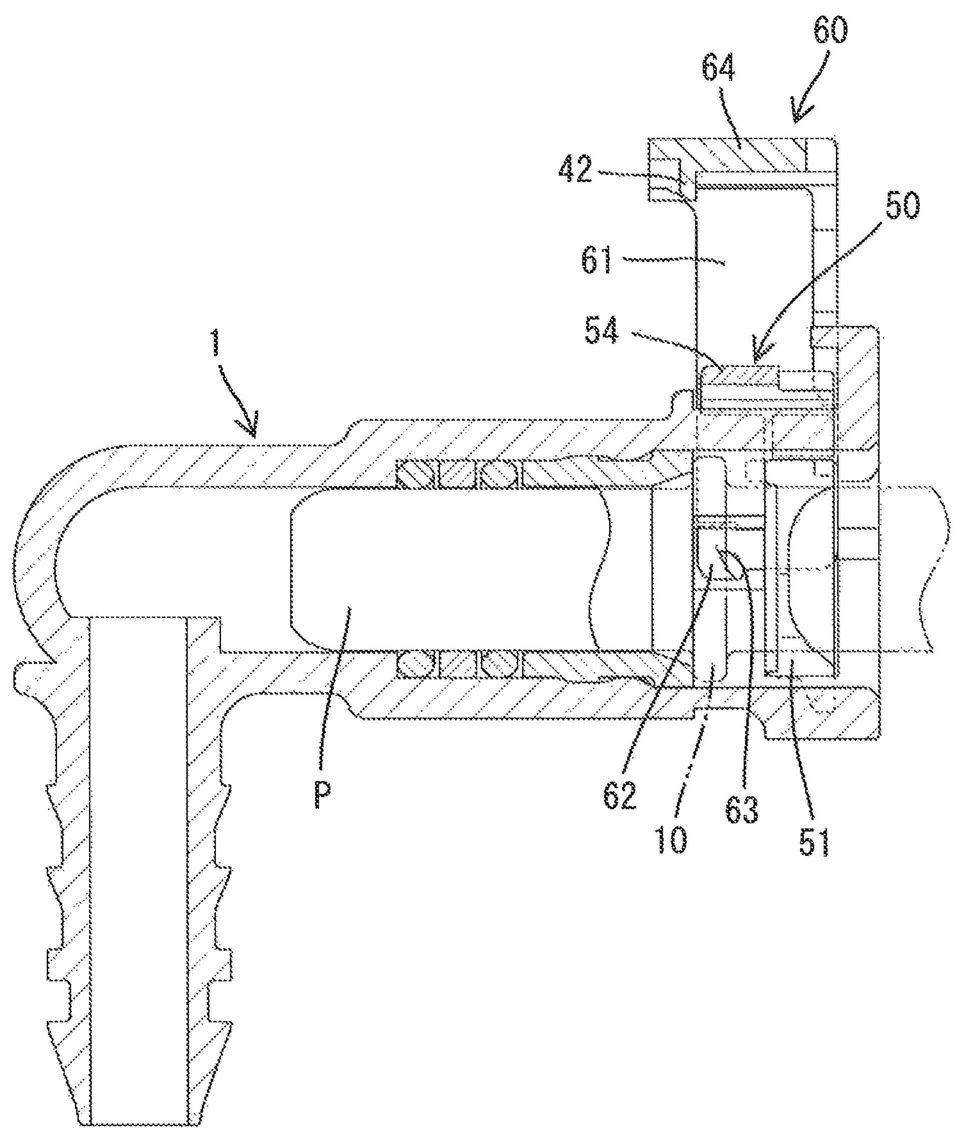
FIG. 50 is a sectional side view of the pipe connector, showing the state in which the flange of the pipe has passed the locking leg so that the pipe reaches a normal depth.
Figure 51:
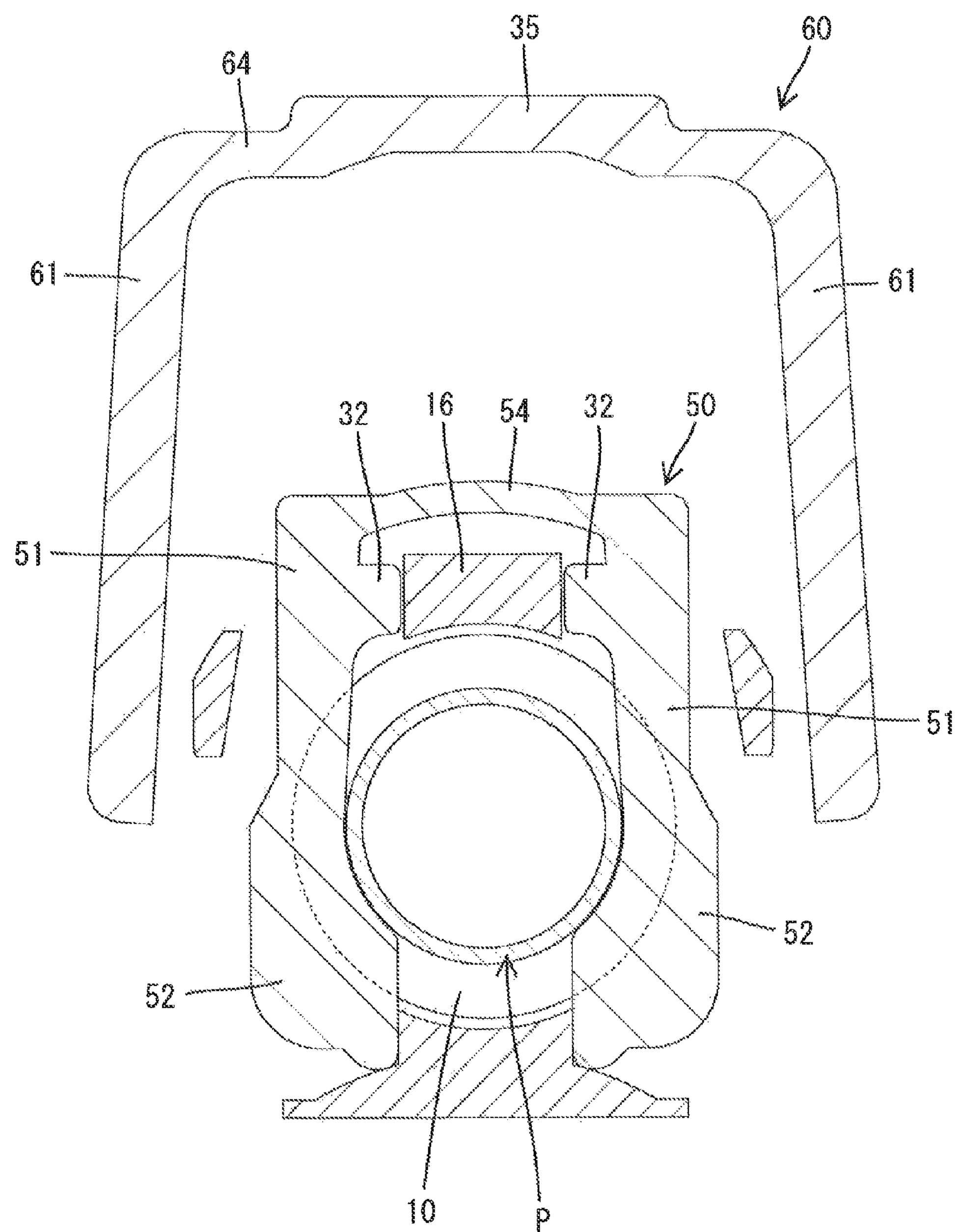
FIG. 51 is a sectional view taken along line G-G in FIG. 43.
Figure 52:
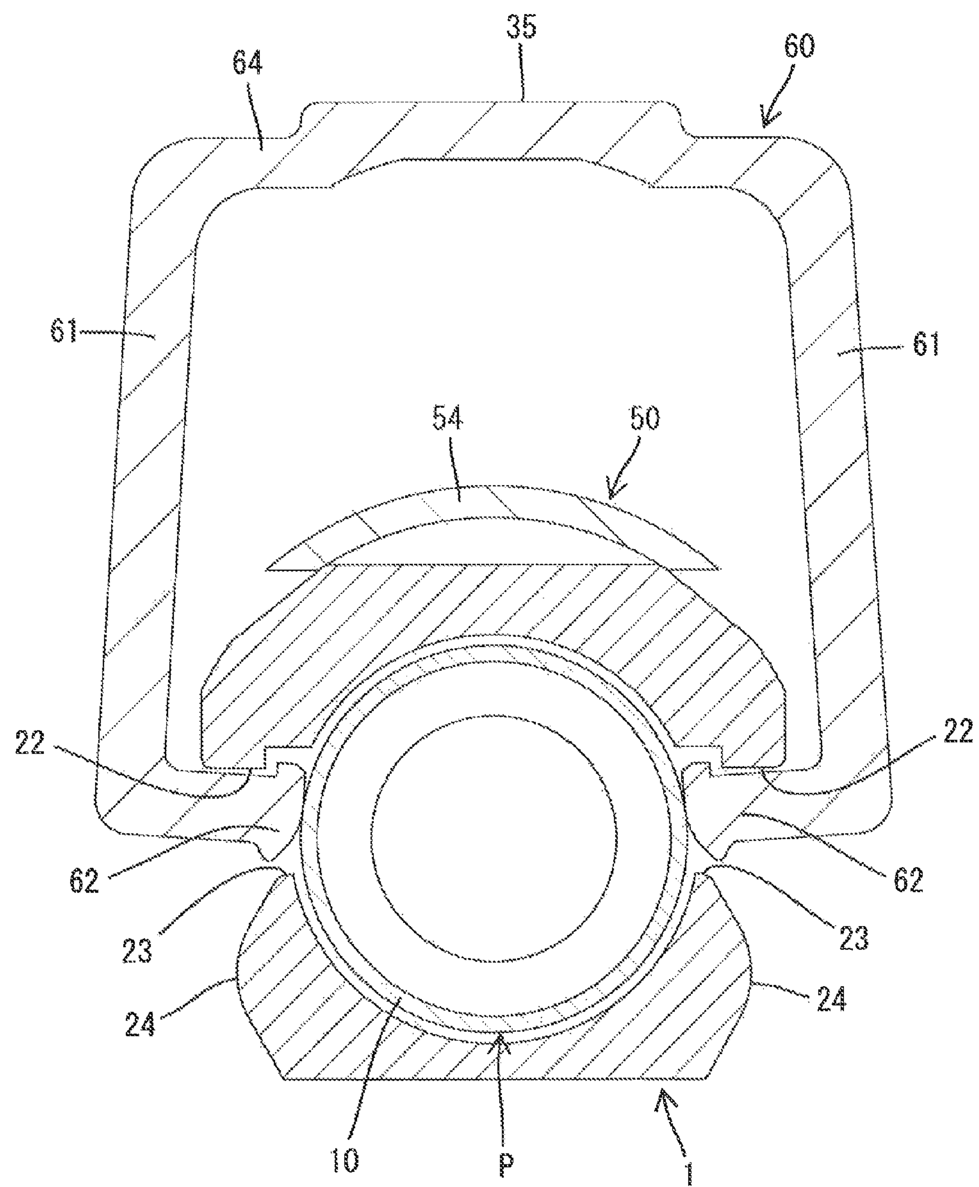
FIG. 52 is a sectional view taken along line H-H in FIG. 43.

FIGS. 50 to 52 show the state in which the pipe P is inserted to the normal depth. In this state, since the elastically returned locking legs 51 lock the flange 10 from the rear surface side, the pipe P is prevented from dropping out of the connector body 1. At the same time, the overall legs 61 are spread with sliding contact of the flange 10 on the spread guide surfaces 63 of the detection portions 62 with the result that the lower protrusions of the detection portions 62 are moved outside the drop preventing edges 23 thereby to be disengaged from the edges 23, respectively (the state as shown in FIG. 52).

Figure 53:
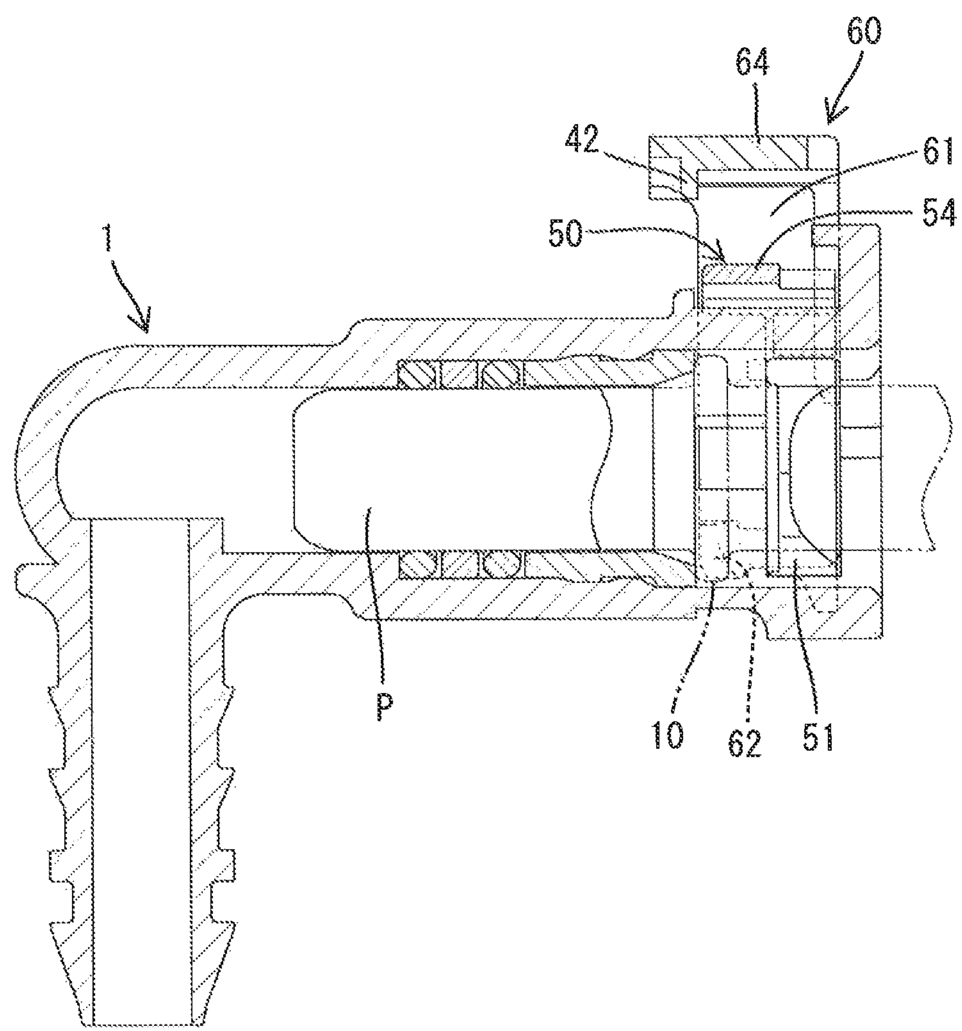
FIG. 53 is a sectional side view of the pipe connector when the checker is being moved from the preliminary holding position to the detection position.
Figure 54:
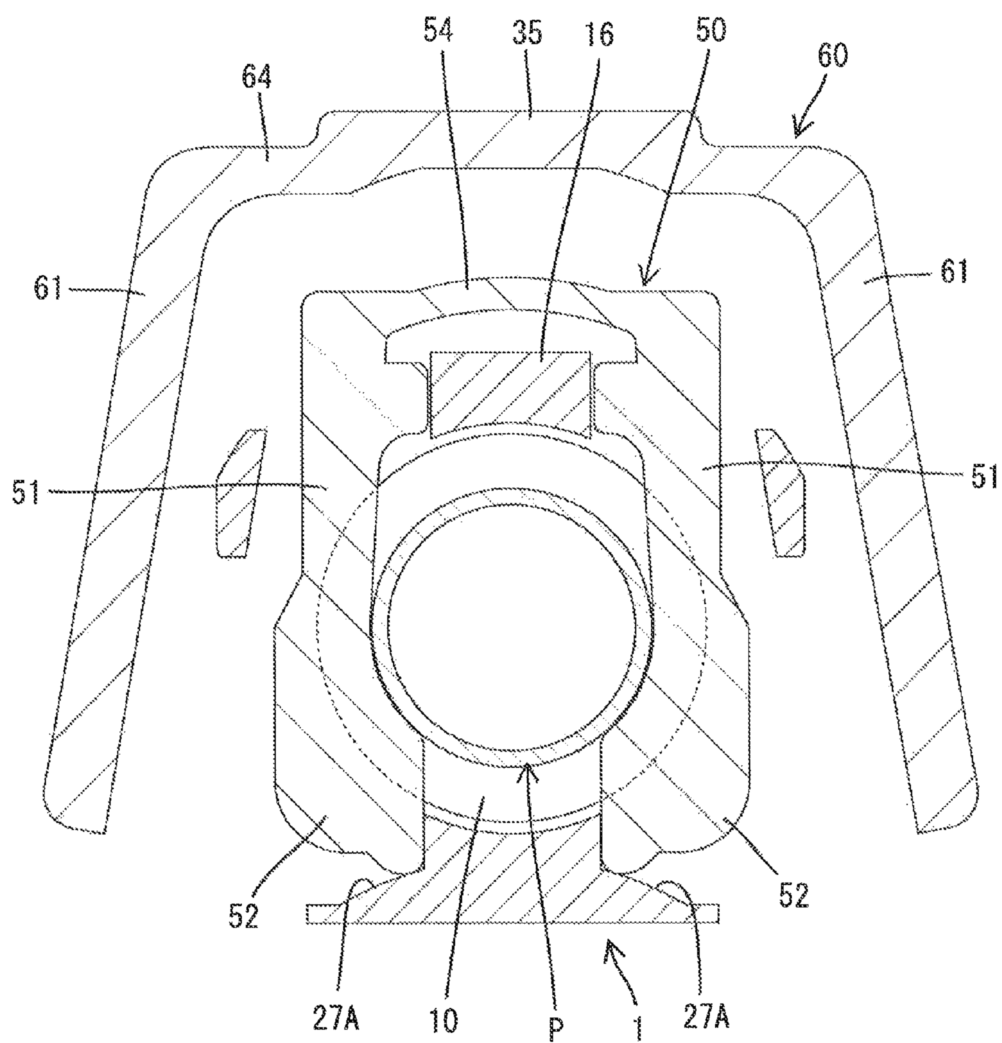
FIG. 54 is a sectional view taken along line G-G in FIG. 43.
Figure 55:
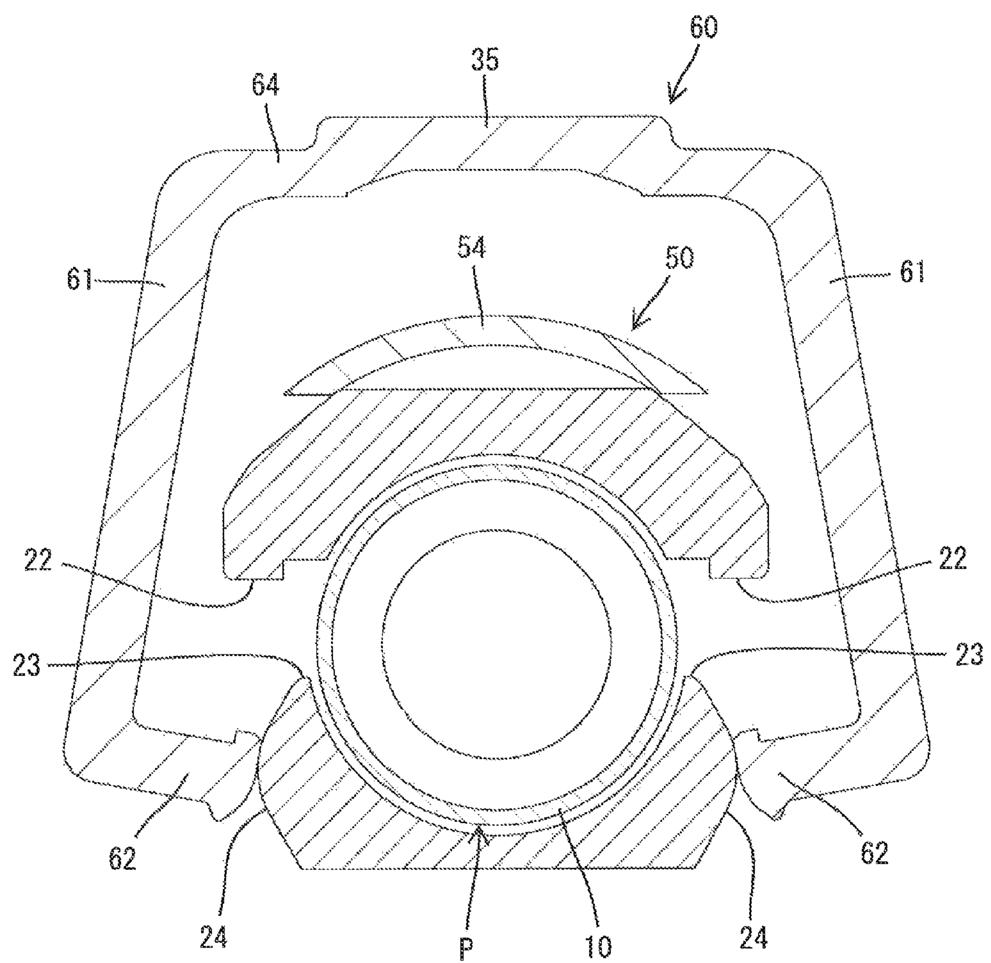
FIG. 55 is a sectional view taken along line H-H in FIG. 43.

FIGS. 53 to 55 show the process of moving the checker 60 from the preliminary holding position to the detection position. When the upper surface of the cover 64 of the checker 60 is pressed, the detection portions 62 slidingly contact with the side surfaces of the resistance imparting surfaces 24 respectively. Accordingly, the spreading angle between the overall legs 61 including the rears is gradually increased until the detection portions 62 reach the tops of the resistance imparting surfaces 24 (outermost bulging portions) respectively.

Figure 56:
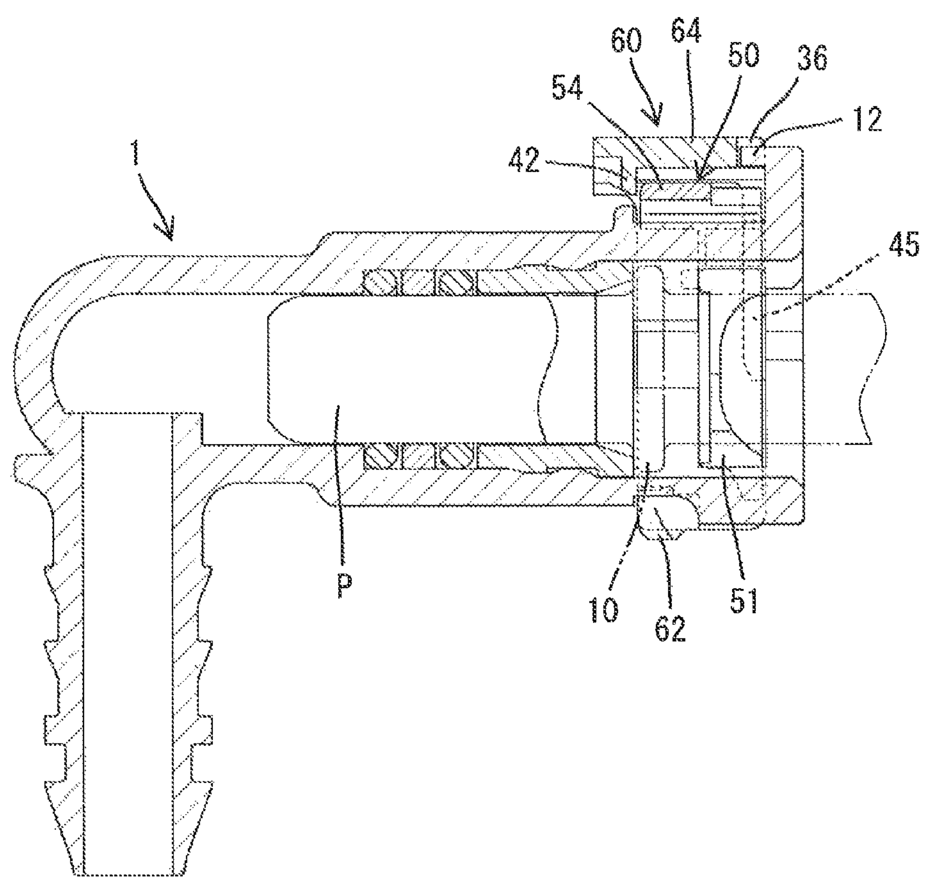
FIG. 56 is a sectional side view of the pipe connector when the checker assumes the detection position.
Figure 57:
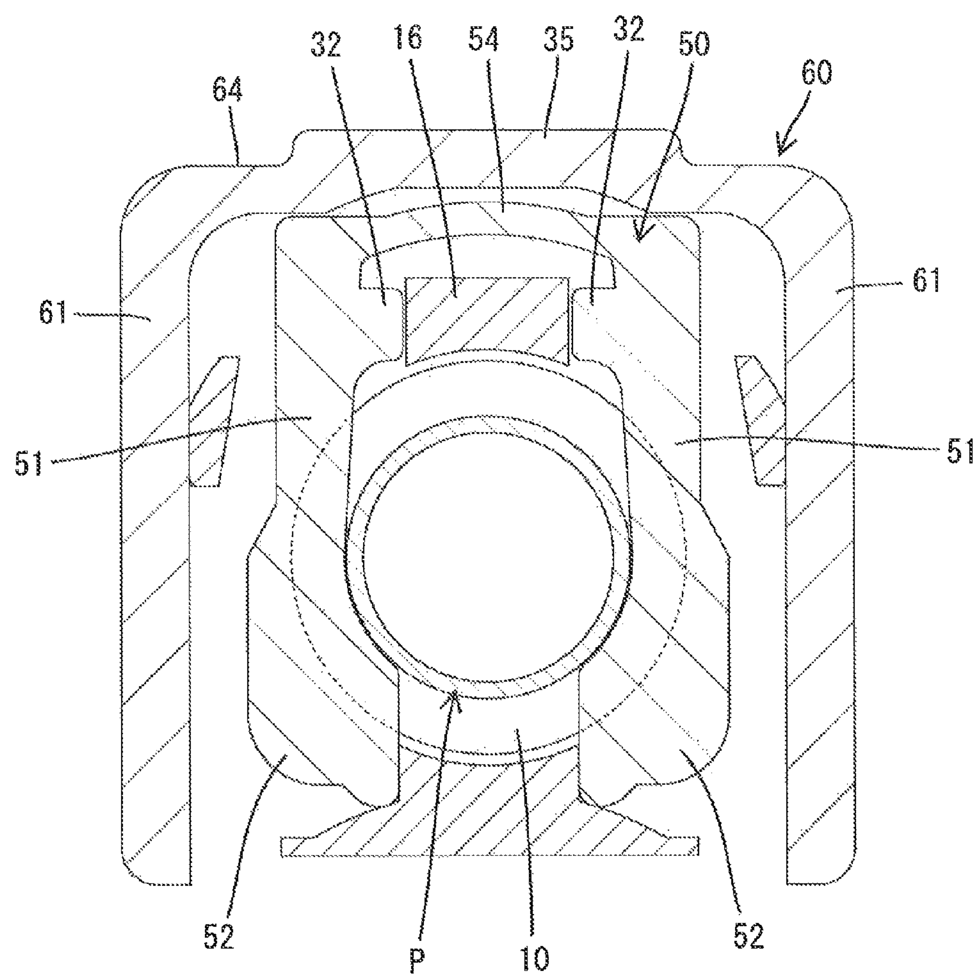
FIG. 57 is a sectional view taken along line G-G in FIG. 43.
Figure 58:
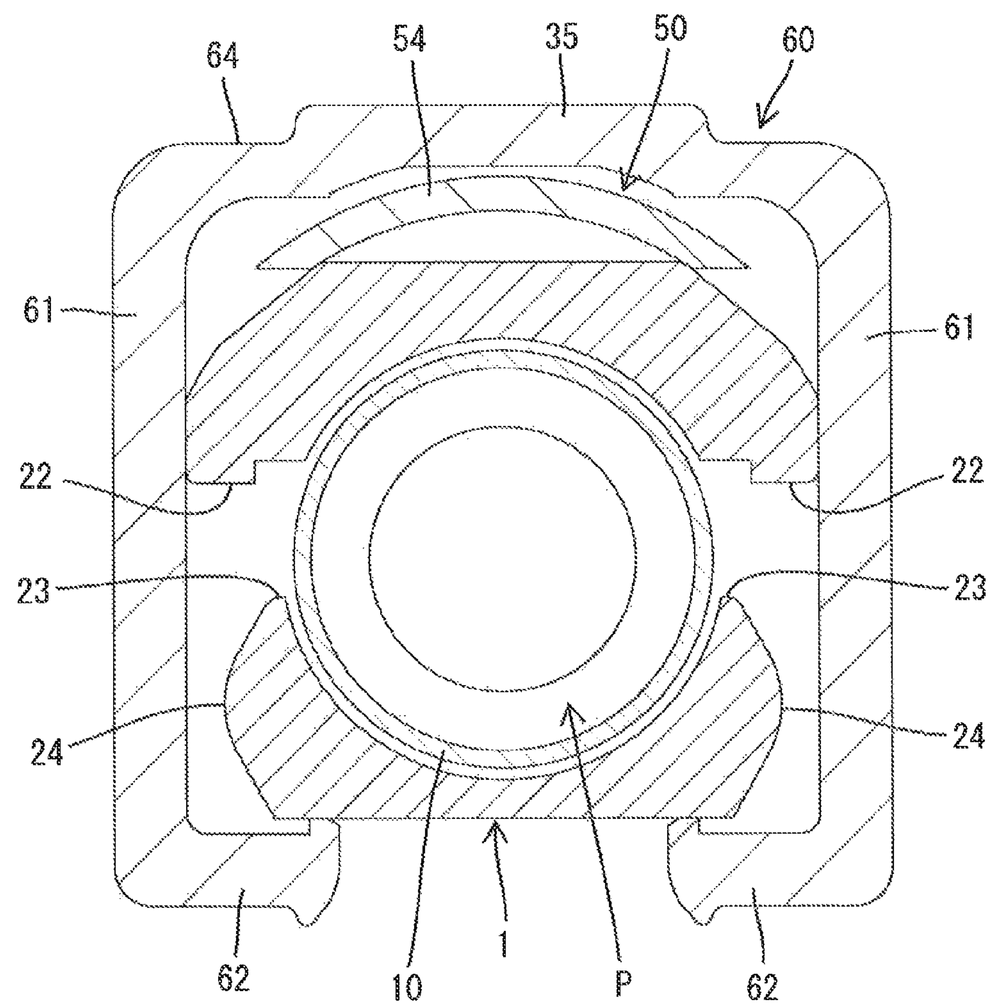
FIG. 58 is a sectional view taken along line H-H in FIG. 43.

FIGS. 56 to 58 show the state in which the checker 60 has reached the detection position. After the detection portions 62 of the checker 60 have passed the tops of the resistance imparting surfaces 24, the spreading angle between the overall legs 61 including the rears is gradually reduced. And after the detection portions 62 of the checker 60 have passed the resistance imparting surfaces 24, the overall legs 61 are elastically returned and the detection portions 62 are locked to the underside of the connector body 1. Consequently, the checker 60 is held at the detection position.

Figure 59:
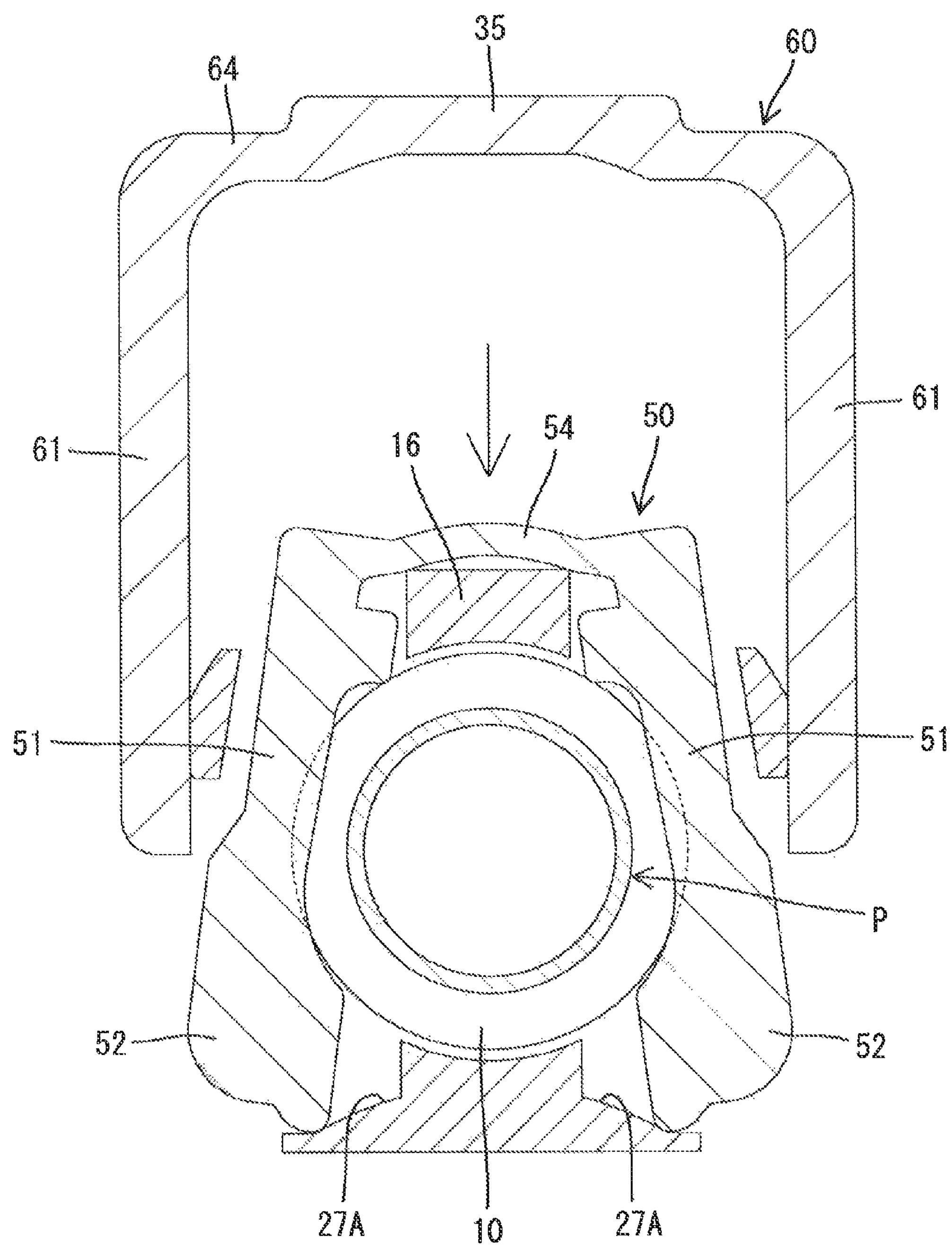
FIG. 59 is a sectional view taken, along line G-G, showing the state in which the retainer is released when the checker assumes the preliminary holding position.

FIG. 59 shows an exemplified operation of pulling the pipe P out of the connector body 1. The checker 60 is returned from the detection position to the preliminary holding position by this operation. Subsequently, when the upper surface of the release operation portion 54 of the retainer 50 is pressed, the overall retainer 50 is allowed to be pushed downward since a gap is defined between the release operation portion 54 and the partition piece 16 of the connector body 1. The lower ends of the locking legs 51 slidingly contact with the inclined surfaces 27A of the connector body 1 with downward push of the retainer 50 respectively. Since this spreads the locking legs 51 such that the flange 10 is allowed to pass the locking legs 51, the pipe P can be pulled out of the connector body 1.

As described above, embodiment 2 achieves an advantageous effect that when the checker 60 assumes the detection position, the release operation portion 54 of the retainer 50 is covered with the cover 64, thereby preventing an inadvertent releasing operation and other advantageous effects. Embodiment 2 thus achieves substantially the same advantageous effects as embodiment 1.

Other Embodiments

The invention should not be limited to the foregoing embodiments described above with reference to the drawings, but the technical scope of the invention covers the following embodiments, for example.

(1) Although the checkers 3 and 60 are moved radially with respect to the connector body 1 between the preliminary holding position and the detection position in the foregoing embodiments, the checkers 3 and 60 may be moved axially on the outer periphery of the connector body 1, instead. Or the checkers 3 and 60 may be moved by a circumferential angular displacement operation.

(2) Although the checkers 3 and 60 are moved from the preliminary holding position to the detection position by pushing the covers 34 and 64 in the foregoing embodiments, the covers 34 and 64 may be pulled from the opposite side of the connector body 1, instead.

(3) In the foregoing embodiments, the release operation portions 28 and 54 are pressed so that the locking legs 26 and 51 are forced to spread, whereby the pipe P can be pulled out of the connector body 1 without pulling the retainers 2 and 50 out of the connector body 1. Instead of this releasing manner, the release operation portions 28 and 54 may be raised by a jig so that the retainers 2 and 50 are forcibly released from the lock to the connector body 1 and so that the overall retainers 2 and 50 are lifted upward from or pulled out of the connector body 1 and the pipe P is pulled out of the connector body 1. In other words, the release operation portions 28 and 54 may be any portions which are operated so that the pipe P can be pulled out of the connector body 1.

EXPLANATION OF REFERENCE SYMBOLS

1 . . . connector body
2, 50 . . . retainer
3, 60 . . . checker
6 . . . insertion hole
10 . . . flange
15 . . . retainer insertion hole
18 . . . positioning protrusions (locking portions)
19 to 21 . . . open regions
26, 51 . . . locking legs
28, 54 . . . release operation portion
34, 64 . . . cover
37 . . . front legs
38 . . . rear legs
39, 62 . . . detection portions
42 . . . cover wall
44 . . . abutment portions
45 . . . pressing pieces
L, 61 . . . legs
P . . . pipe

The invention claimed is:

1. A pipe connector, comprising:

a connector body having an insertion hole into which a pipe is insertable, the pipe having an outer periphery having an end side formed with a flange;

a retainer having a locking portion configured to be attached to the connector body, a pair of locking legs which are deformable to be spread and closed and are moved into the insertion hole of the connector body in a direction intersecting an axial direction of the connector body, the locking legs being positioned in the insertion hole so as to protrude, before insertion of the pipe, into an approach path of the pipe, the locking legs being elastically flexible so as to retreat outward from the insertion hole upon passage of the flange thereby to allow the flange to pass through the insertion hole, the locking legs being elastically returned to lock a rear part of the flange, thereby retaining the pipe, and a release operation portion being operable to displace the locking legs in a direction such that the pipe is releasable from a retained state; and a checker which is formed separately from the retainer and lockable to the connector body so as to assume a preliminary holding position, the checker being releasable from a locked state at the preliminary holding position to thereby be movable to a detection position when the pipe is inserted into the insertion hole to a normal position, wherein the checker is provided with a cover configured to cover the release operation portion of the retainer when the checker assumes the detection position; and wherein the checker is formed with pressing pieces located rearward, in the insertion direction of the pipe, relative to the locking legs when the checker assumes the detection position, to thereby prevent the locking legs from being flexed rearward.

2. The pipe connector according to claim 1, wherein:

the connector body has two sides formed with open regions communicating with the insertion hole;

the checker is provided with a pair of legs which are formed so as to straddle the connector body from two side edges of the cover, the legs being flexible in a spreading direction and having distal ends formed with detection portions bent inward respectively;

when the checker assumes the preliminary holding position, the detection portions protrude from a first pair of open regions into the insertion hole to thereby be locked by an opening edge of the open regions with a result that the checker is rendered immovable from the preliminary holding position to the detection position; and when the pipe is inserted into the insertion hole to reach a normal depth, the detection portions are retreated outward from the open regions while slidingly contacting with the flange and deforming the legs so that the legs are spread, thereby being released from a locked state to opening edges of the open regions, whereby the checker is rendered movable from the preliminary holding position to the detection position.

3. The pipe connector according to claim 2, wherein when the checker assumes the detection position, the detection portions are locked to the connector body, thereby holding the checker at the detection position.

4. The pipe connector according to claim 2, wherein:

the legs of the checker are bifurcated to front legs and rear legs in a front-back direction with respect to an insertion direction of the pipe;

the front legs have distal ends formed with the detection portions, and the rear legs have distal ends formed with abutment portions which pass through a second pair of open regions and protrude into the insertion hole, the distal ends of the rear legs being bent inward; and the abutment portions abut against outer surfaces of the locking legs of the retainer when the checker assumes the preliminary holding position, whereby the rear legs are flexible in conjunction with a spreading action of the locking legs.

5. The pipe connector according to claim 4, wherein:

the connector body has side surfaces formed with resistance imparting surfaces having resistance peaks located midway along a movement direction of the checker;

the detection portions of the checker are configured to slidingly contact with the resistance imparting surfaces during movement of the checker from the preliminary holding position to the detection position;

the resistance imparting surfaces increase a spreading angle of the legs until the detection portions reach the resistance peaks of the resistance imparting surfaces, thereby increasing resistance to press against the checker, the legs being elastically returned to thereby decrease the resistance to press against the checker after the detection portions pass the resistance peaks of the resistance imparting surfaces to reach the detection position.

6. The pipe connector according to claim 2, wherein:

the connector body has side surfaces formed with resistance imparting surfaces having resistance peaks located midway along a movement direction of the checker;

the detection portions of the checker are configured to slidingly contact with the resistance imparting surfaces during movement of the checker from the preliminary holding position to the detection position;

the resistance imparting surfaces increase a spreading angle of the legs until the detection portions reach the resistance peaks of the resistance imparting surfaces, thereby increasing resistance to press against the checker, the legs being elastically returned to thereby decrease the resistance to press against the checker after the detection portions pass the resistance peaks of the resistance imparting surfaces to reach the detection position.

7. The pipe connector according to claim 2, wherein:

the connector body has at least one retainer insertion hole which communicates with the insertion hole and into which the locking legs are insertable;

both locking legs have respective ends connected to each other by the release operation portion, and the retainer is displaceable in a depressing direction by pressing the release operation portion;

the connector body is formed with inclined surfaces which slidingly contact with distal ends of the locking legs with depression of the retainer to deform the locking legs so that the locking legs are spread, thereby releasing the locking legs from a locked state to the flange.

8. The pipe connector according to claim 2, wherein the checker protrudes from the connector body radially outward when assuming the preliminary holding position, and a direction in which the checker is displaced between the preliminary holding position and the detection position intersects the axial direction of the connector body.

9. The pipe connector according to claim 2, wherein the cover is formed with a cover wall which covers a front edge of the release operation portion from a front side when the checker assumes the detection position.

10. The pipe connector according to claim 9, wherein the connector body has a flange which is formed so as to overhang and has such a height as to cover a rear edge of the release operation portion from a rear side.

11. The pipe connector according to claim 2, wherein the release operation portion and the cover are colored different colors.

12. The pipe connector according to claim 1, wherein:

the connector body has at least one retainer insertion hole which communicates with the insertion hole and into which the locking legs are insertable;

both locking legs have respective ends connected to each other by the release operation portion, and the retainer is displaceable in a depressing direction by pressing the release operation portion;

the connector body is formed with inclined surfaces which slidingly contact with distal ends of the locking legs with depression of the retainer to deform the locking legs so that the locking legs are spread, thereby releasing the locking legs from a locked state to the flange.

13. The pipe connector according to claim 1, wherein the checker protrudes from the connector body radially outward when assuming the preliminary holding position, and a direction in which the checker is displaced between the preliminary holding position and the detection position intersects the axial direction of the connector body.

14. The pipe connector according to claim 1, wherein the cover is formed with a cover wall which covers a front edge of the release operation portion from a front side when the checker assumes the detection position.

15. The pipe connector according to claim 14, wherein the connector body has a flange which is formed so as to overhang and has such a height as to cover a rear edge of the release operation portion from a rear side.

16. The pipe connector according to claim 1, wherein the release operation portion and the cover are colored different colors.

17. The pipe connector according to claim 1, wherein the pressing pieces are positioned such that forward surfaces of the pressing pieces oppose rearward surfaces of the locking legs.

* * * * *